United States Patent
Satomi et al.

(10) Patent No.: US 6,747,755 B1
(45) Date of Patent: Jun. 8, 2004

(54) CODE GENERATION METHOD, TERMINAL APPARATUS, CODE PROCESSING METHOD, ISSUING APPARATUS, AND CODE ISSUING METHOD

(75) Inventors: Hiroshi Satomi, Yokohama (JP); Akihiro Masukawa, Kawasaki (JP); Kenji Kasai, Tokyo (JP); Shinji Fukunaga, Kawasaki (JP); Atsushi Inoue, Tokyo (JP); Kosuke Ito, Tokyo (JP); Jiro Izumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/547,399

(22) Filed: Apr. 11, 2000

(30) Foreign Application Priority Data

Apr. 10, 1999 (JP) .......................... 11-283461
Apr. 14, 1999 (JP) .......................... 11-107236

(51) Int. Cl.$^7$ .............................................. G06K 15/00
(52) U.S. Cl. ........................................ 358/1.15; 358/1.6
(58) Field of Search ................................ 358/1.15, 1.6, 358/1.13, 1.14, 402, 403, 405, 440, 442; 709/217, 218, 219, 378; 710/8, 9, 10, 11, 20, 62, 64

(56) References Cited

U.S. PATENT DOCUMENTS

| | | | |
|---|---|---|---|
| 5,297,042 A | 3/1994 | Morita | 364/419.19 |
| 5,592,375 A | 1/1997 | Salmon et al. | 395/207 |
| 5,708,627 A | 1/1998 | Gormley | 368/10 |
| 5,712,787 A | 1/1998 | Yeung | 364/478.09 |
| 5,721,827 A | 2/1998 | Logan et al. | 395/200.47 |
| 5,835,087 A | 11/1998 | Herz et al. | 345/327 |
| 5,890,152 A | 3/1999 | Rapaport et al. | 707/6 |
| 6,009,383 A | 12/1999 | Mony | 704/270 |
| 6,212,550 B1 | 4/2001 | Segur | 709/206 |
| 6,297,819 B1 | 10/2001 | Furst | 345/329 |
| 6,304,904 B1 | 10/2001 | Sathyanarayan et al. | 709/224 |
| 6,343,484 B1 | 2/2002 | Hong et al. | 62/428 |

FOREIGN PATENT DOCUMENTS

| | | |
|---|---|---|
| JP | 1-183950 | 7/1989 |
| JP | 4-266163 | 9/1992 |
| JP | 5-081549 | 4/1993 |
| JP | 6-208682 | 7/1994 |
| JP | 6-236408 | 8/1994 |
| JP | 7-021069 | 1/1995 |
| JP | 7-038648 | 2/1995 |
| JP | 07044567 A | 2/1995 |

(List continued on next page.)

OTHER PUBLICATIONS

PC Work!, 1998, 9, pp. 177–179. (Comments in English provided).

"Net–surfing School, For smoother operation", MYCOM BASIC Magazine, Japan, Sep. 1, 1996, vol. 15, No. 9, pp. 20–23 (in Japanese).

Sumiya, K., et al. "A Temporal Link Mechanism for Hypermedia Broadcasting", Systems and Computers in Japan, vol. 32, No. 14, 2001, pp. 54–66 (in English), translated from Denshi Joho Tsushin Gakkai Ronbunshi, vol. J82–D–I, No. 1, Jan. 1999, pp. 291–302 (in Japanese).

*Primary Examiner*—Arthur G. Evans
(74) *Attorney, Agent, or Firm*—Fitzpatrick, Cella, Harper & Scinto

(57) ABSTRACT

This invention is to make it unnecessary for a user to input all codes for identifying information, and reduce cumbersomeness and input error in code input. For example, to generate a code that means predetermined processing such as acquisition of specific information or acquisition of specific mail data, a user inputs, through a service terminal, a number section predetermined for the information to be acquired. The service terminal automatically generates the code of a classification section and attaches it to the number section input by the user. The number section and classification section, which are integrated, are output to a service server as a code.

32 Claims, 119 Drawing Sheets

FOREIGN PATENT DOCUMENTS

| | | |
|---|---|---|
| JP | 8-097854 | 4/1996 |
| JP | 8-163173 | 6/1996 |
| JP | 8-223206 | 8/1996 |
| JP | 8-256256 | 10/1996 |
| JP | 8-294156 | 11/1996 |
| JP | 9-034902 | 2/1997 |
| JP | 9-050441 | 2/1997 |
| JP | 9-090831 | 4/1997 |
| JP | 9-090832 | 4/1997 |
| JP | 9-101933 | 4/1997 |
| JP | 9-102790 | 4/1997 |
| JP | 9-114755 | 5/1997 |
| JP | 9-130573 | 5/1997 |
| JP | 9-134371 | 5/1997 |
| JP | 9-153054 | 6/1997 |
| JP | 9-204389 | 8/1997 |
| JP | 9-212051 | 8/1997 |
| JP | 9-305514 | 11/1997 |
| JP | 9-311749 | 12/1997 |
| JP | 9-321633 | 12/1997 |
| JP | 9-321894 | 12/1997 |
| JP | 10-051751 | 2/1998 |
| JP | 10-078928 | 3/1998 |
| JP | 10-083241 | 3/1998 |
| JP | 10-105184 | 4/1998 |
| JP | 10-133982 | 5/1998 |
| JP | 10-150523 | 6/1998 |
| JP | 10-155038 | 6/1998 |
| JP | 10-164137 | 6/1998 |
| JP | 10-171818 | 6/1998 |
| JP | 10-187953 | 7/1998 |
| JP | 10-207908 | 8/1998 |
| JP | 10-240760 | 9/1998 |
| JP | 10-243364 | 9/1998 |
| JP | 10-257401 | 9/1998 |
| JP | 10-301946 | 11/1998 |
| JP | 10-301955 | 11/1998 |
| JP | 10-319801 | 12/1998 |
| JP | 10-320314 | 12/1998 |
| JP | 10-320410 | 12/1998 |
| JP | 10-327307 | 12/1998 |
| JP | 10-334017 | 12/1998 |
| JP | 10-336346 | 12/1998 |
| JP | 10-336349 | 12/1998 |
| JP | 11-041566 | 2/1999 |
| JP | 11-053388 | 2/1999 |
| JP | 11-069024 | 3/1999 |
| WO | WO 9519593 A1 * | 7/1995 ........... G06F/01/00 |

* cited by examiner

FIG. 7

| IP INFORMATION REGISTRATION TABLE | | | | 220 |
|---|---|---|---|---|
| P-CODE | IDENTIFICATION SECTION | PARENT CODE SECTION | | |
| | | FLAG REPRESENTING WHETHER Sub-code IS PRESENT | | |
| | | Sub-code SECTION | | |
| | | LINK | | LINKED P-CODE |
| | BASIC PROPERTIES | OWNER ID | | |
| | | TITLE | | |
| | | SUBTITLE (SUMMARY) | | |
| | | STATUS | | REGISTERED, USABLE, SUSPENDED, ABOLISHED |
| | | PRICE OF INFORMATION | | |
| | | SIZE | | |
| | | ADVERTISEMENT INSERTION ENABLE / DISABLE CONDITION | | |
| | | PASSWORD FOR INFORMATION | | |
| | | DATA OF START OF INFORMATION INSERTION | | |
| | | TERM OF INFORMATION | | |
| | | VALID DATES OF CODE | | |
| | | MINIMUM ENLARGEMENT LIMIT VALUE | | |
| | | MINIMUM REDUCTION LIMIT VALUE | | |
| | | GENRE | | |
| | | SUBGENRE | | |
| | | REGION CODE | | FOR INFORMATION WITH REGIONAL CHARACTERISTICS |
| | | KEYWORD LIST | | |
| | | KEYWORD WEIGHT LIST | | |
| FRAME INFORMATION | | P-CODE | | |
| NONLINK INFORMATION | | P-CODE LINKED TO THIS INFORMATION | | |
| ENTITY FILE INFORMATION | | NUMBER OF FILES | | |
| | | FILE NAME (LIST CORRESPONDING TO NUMBER OF FILES) | | |

FIG. 8

| ADVERTISEMENT INFORMATION TABLE | | |
|---|---|---|
| P-CODE | OWNER ID | |
| | ADVERTISEMENT PROPERTIES | DATE OF START OF ADVERTISEMENT INSERTION<br>TERM OF ADVERTISEMENT<br>LINK INFORMATION TO IP INFORMATION |
| | | SIZE OF ADVERTISEMENT<br>PORTRAIT/LANDSCAPE<br>ADVERTISEMENT SIZE ADJUSTMENT METHOD<br>SETTING OF ADVERTISEMENT INSERTION POSITION<br>UPPER LIMIT OF AMOUNT<br>ADVERTISEMENT PRICE INFORMATION (UNIT PRICE)<br>UPPER LIMIT OF PRINTING COUNT<br>CURRENT PRINTING COUNT |
| | LINK | TYPE OF LINK METHOD<br>TARGET KEYWORD LIST<br>TARGET KEYWORD WEIGHT LIST |
| P-CODE | ENTITY FILE INFORMATION | NUMBER OF FILES<br>FILE NAME (LIST CORRESPONDING TO NUMBER OF FILES) |

FIG. 9

| USER INFORMATION TABLE | | | |
|---|---|---|---|
| P-CODE OF USER (TELEPHONE NUMBER) | USER PROFILE | POSTAL CODE<br>ADDRESS<br>TYPE OF SERVICE TO USE<br>NAME OF COMPANY<br>BUSINESS CATEGORY ID<br>BUSINESS CATEGORY (OTHERS)<br>NAME OF DEPARTMENT/SECTION<br>POST<br>JOB<br>PRINTING PAPER INFORMATION | PRIORITY FOR LAYOUT<br>PAPER SIZE<br>DIRECTION OF PAPER<br>AMOUNT OF ADVERTISEMENT<br>(e.g., USE OF LOWER SURFACE) |
| | PERSONAL INFORMATION TABLE | BIRTHDAY/BLOOD TYPE/SEX<br>FINAL SCHOOL CARRIER/OCCUPATION ID<br>/OCCUPATION (OTHERS)<br>MARRIED/SINGLE/NUMBER OF FAMILY MEMBERS<br>/INCOME/AMOUNT OF SAVING<br>HOUSE IN POSSESSION OR NOT/CAR<br>/PISTON DISPLACEMENT/MODEL<br>MOTORCYCLE/PISTON DISPLACEMENT/MODEL<br>CURRENT PET/DESIRED PET<br>HOBBY/MUSIC/MOVIE<br>SPECTATOR SPORTS/SPORTS/FISHING<br>GENRE OF INTEREST<br>(DESIRED INFORMATION) (ID LIST)<br>TO ANOTHER DB | |
| | MAIL SERVICE INFORMATION | NUMBER OF MAIL MESSAGES<br>MAXIMUM ENLARGEMENT LIMIT VALUE<br>MINIMUM REDUCTION LIMIT VALUE<br>P-CODE LIST (NUMBER CORRESPONDING TO NUMBER OF MAIL MESSAGES) | |
| | DISTRIBUTION SERVICE INFORMATION | NUMBER OF REGISTERED DATA<br>P-CODE LIST (NUMBER CORRESPONDING TO NUMBER OF DISTRIBUTED DATA) | |
| | PERSONAL INFORMATION SERVICE INFORMATION | NUMBER OF FRAME DATA<br>P-CODE LIST (NUMBER CORRESPONDING TO NUMBER OF FRAME DATA) | |

FIG. 10

MAIL SERVICE P-CODE TABLE

| P-CODE (TELEPHONE NUMBER#NUMBER) | PROPERTIES OF MAIL | SUBJECT<br>SENDER<br>DATE AND TIME OF TRANSMISSION |
|---|---|---|
| | ENTITY FILE INFORMATION | NUMBER OF FILES<br>(INCLUDING ATTACHED FILE)<br>FILE NAME<br>(LIST CORRESPONDING TO NUMBER OF FILES) |

FIG. 11

DISTRIBUTION SERVICE P-CODE TABLE

| P-CODE (TELEPHONE NUMBER-NUMBER) | PROPERTIES OF REGISTERED INFORMATION | TITLE * <br> DATE OF INFORMATION REGISTRATION <br> VALID DATES OF INFORMATION <br> PASSWORD (PASSWORD) FOR INFORMATION |
|---|---|---|
| | ENTITY FILE INFORMATION | NUMBER OF FILES <br> (INCLUDING ATTACHED FILE) <br> FILE NAME <br> (LIST CORRESPONDING TO NUMBER OF FILES) |

FIG. 12

| PERSONAL INFORMATION SERVICE P-CODE TABLE | | |
|---|---|---|
| P-CODE (TELEPHONE NUMBER##NUMBER) | PROPERTIES OF PERSONAL P-CODE INFORMATION | TITLE<br>DATE OF FINAL PRINTING<br>PRINTING PAPER INFORMATION | PRIORITY FOR LAYOUT<br>PAPER SIZE<br>DIRECTION OF PAPER<br>AMOUNT OF ADVERTISEMENT<br>(e.g., USE OF LOWER SURFACE) |
| | REGISTERED P-CODE INFORMATION | NUMBER OF REGISTERED P-CODES<br>P-CODE LIST (INDICATING FRAME) |

FIG. 13

| PERSONAL INFORMATION TABLE | | |
|---|---|---|
| USER-ID | PHONETIC TRANSCRIPTION (FIRST NAME) <br> PHONETIC TRANSCRIPTION (FAMILY NAME) <br> NAME (FAMILY NAME) <br> NAME (FIRST NAME) <br> NAME (MIDDLE NAME) <br> POSTAL CODE <br> ADDRESS <br> TELEPHONE NUMBER <br> FAX NUMBER <br> PORTABLE TELEPHONE NUMBER <br> E-MAIL ADDRESS <br> PASSWORD <br> NAME OF COMPANY <br> BUSINESS CATEGORY ID <br> BUSINESS CATEGORY (OTHERS) <br> NAME OF DEPARTMENT/SECTION <br> POST <br> JOB <br> POSTAL CODE OF COMPANY <br> ADDRESS OF COMPANY <br> TELEPHONE NUMBER OF COMPANY <br> FAX NUMBER OF COMPANY <br> PAYER INFORMATION <br><br> USE DISK AREA INFORMATION <br> CHARGE RECORD | CREDIT CARD COMPANY FOR SETTLEMENT <br> CARD NUMBER <br> VALID DATES OF CARD <br><br> PRIORITY FOR LAYOUT <br> PAPER SIZE <br> DIRECTION OF PAPER <br> AMOUNT OF ADVERTISEMENT <br> (e.g., USE OF LOWER SURFACE) |

FIG. 14

| OWNER INFORMATION TABLE | | |
|---|---|---|
| USER-ID | SAME AS PERSONAL INFORMATION TABLE | |
| | NAME OF COMPANY/NAME<br>POSTAL CODE OF COMPANY<br>ADDRESS OF COMPANY<br>TELEPHONE NUMBER OF COMPANY<br>FAX NUMBER OF COMPANY<br>E-MAIL ADDRESS OF PERSON IN CHARGE<br>PASSWORD<br>BUSINESS CATEGORY ID<br>BUSINESS CATEGORY (OTHERS)<br>NAME OF DEPARTMENT/SECTION<br>PAYER INFORMATION | BANK OF PAYER<br>BANK ACCOUNT OF PAYER<br>CONTRACT TERM |
| | USE DISK AREA INFORMATION<br>CHARGE RECORD | |

FIG. 15

| TERMINAL INFORMATION TABLE | | |
|---|---|---|
| TERMINAL ID | OWNER ID | |
| | REGION INFORMATION | COUNTRY |
| | TYPE OF TERMINAL | ADDRESS |
| | REGION INFORMATION | |
| | VERSION OF TERMINAL | |
| | VERSION OF TERMINAL SOFTWARE | |
| | TERMINAL INPUT DEVICE INFORMATION | |
| | CAPACITY OF TERMINAL STORAGE DEVICE | |
| | TERMINAL OUTPUT DEVICE INFORMATION | |
| | LANGUAGE | |
| | PRINTING ABILITY | PAPER SIZE |
| | | DOUBLE SIDE / ONE SIDE |
| | | COLOR / MONOCHROME |
| | | PRINTING SPEED |
| | | FONT |
| | TERMINAL STATE INFORMATION | PRINTING SPOOL STATE |
| | | INFORMATION OF REMAINING CAPACITY OF STORAGE DEVICE |
| | | P-CODE CACHE STATE |

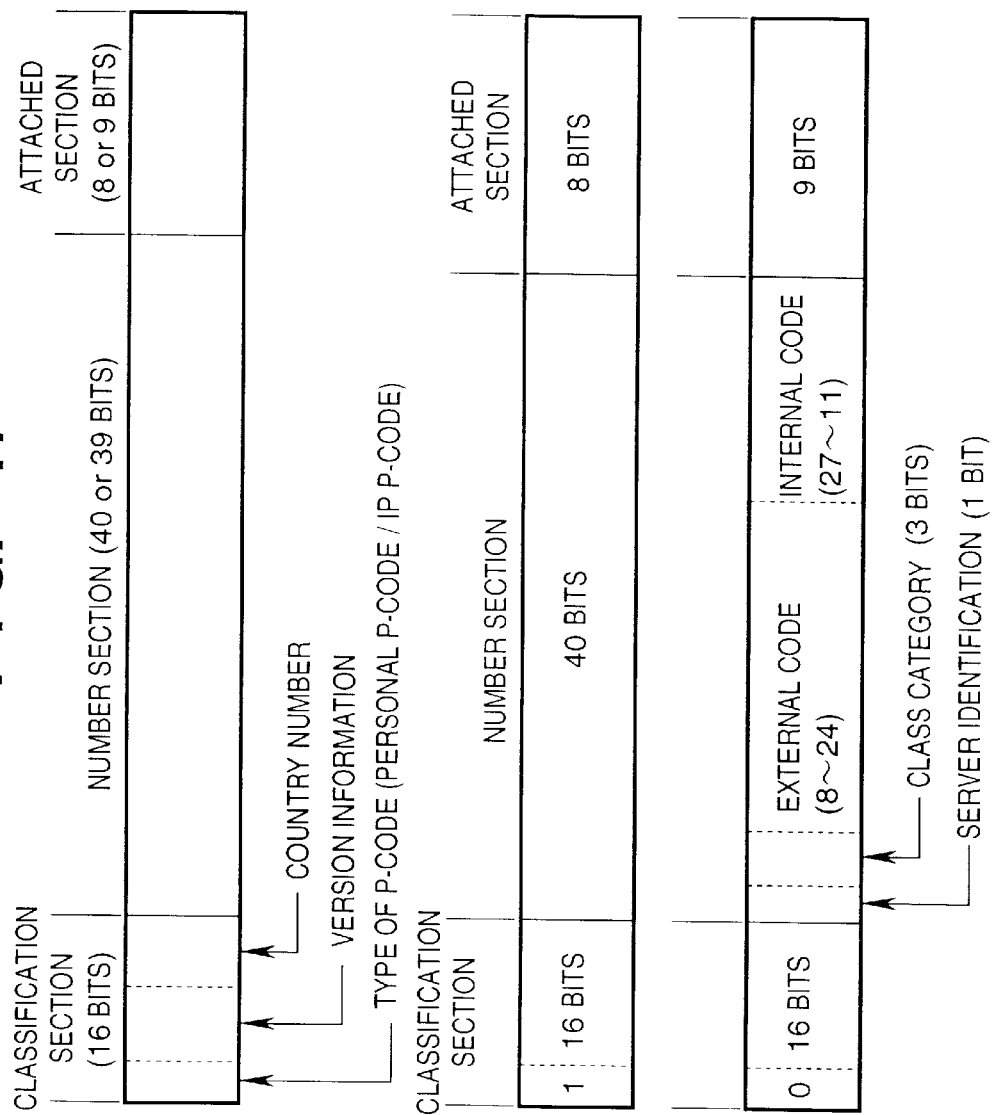

FIG. 18

| Bit | CONTENTS OF P-CODE | |
|---|---|---|
| 1 | 0 : INFORMATION P-CODE (BIT REPRESENTING WHETHER P-CODE IS TELEPHONE CODE) | 1 : PERSONAL USER P-Code |
| 2 ~ 8 | VERSION BITS (7 BITS) | VERSION BITS (7 BITS) |
| 9 ~ 16 | COUNTRY NUMBER IDENTIFICATION BITS (8 BITS) (NORMALLY NOT INPUT BY USER) | COUNTRY NUMBER IDENTIFICATION BITS (8 BITS) (NORMALLY NOT INPUT BY USER) |
| 17 | CanDI SERVER IDENTIFICATION BIT (= 1 : CanDI SERVER) | TELEPHONE NUMBER (INTEGER HAVING 12 DIGITS AT MAXIMUM) (40 BITS) |
| 18 19 20 | IP SCALE IDENTIFICATION BITS (3 BITS) (=1: MINIMAL SCALE, = 2 : SMALL SCALE, = 3 : MEDIUM SCALE, = 4 : LARGE SCALE, = 5 : MAXIMAL SCALE) | |
| 21 ~ 28 | SITE IDENTIFICATION BITS (24 BITS) (FOR IP IN MINIMAL SCALE), NUMBER OF REGISTERABLE IPS IS 16,000,000 / SITE IDENTIFICATION BITS (20 BITS) (FOR IP IN SMALL SCALE), NUMBER OF REGISTERABLE IPS IS 1,048,575 / SITE IDENTIFICATION BITS (16 BITS) (FOR IP IN MEDIUM SCALE), NUMBER OF REGISTERABLE IPS IS 65,535 / SITE IDENTIFICATION BITS (12 BITS) (FOR IP IN LARGE SCALE), NUMBER OF REGISTERABLE IPS IS 2,047 / SITE IDENTIFICATION BITS (8 BITS) (FOR IP IN MAXIMAL SCALE AND CanDI SERVER), THE MAXIMUM NUMBER OF REGISTERABLE IPS IS 256 | |
| 29 ~ 32 | | |
| 33 ~ 36 | | INDIVIDUAL INFORMATION ID BITS (27 BITS), EACH IP CAN REGISTER UP TO ABOUT 130,000,000 PIECES OF INFORMATION |
| 37 ~ 40 | | |
| 41 ~ 44 | | INDIVIDUAL INFORMATION ID BITS (23 BITS), EACH IP CAN REGISTER UP TO ABOUT 8,000,000 PIECES OF INFORMATION |
| 45 ~ 55 | INDIVIDUAL INFORMATION ID BITS (11 BITS), EACH IP CAN REGISTER UP TO ABOUT 2,047 PIECES OF INFORMATION / INDIVIDUAL INFORMATION ID BITS (15 BITS), EACH IP CAN REGISTER UP TO ABOUT 32,767 PIECES OF INFORMATION / INDIVIDUAL INFORMATION ID BITS (19 BITS), EACH IP CAN REGISTER UP TO ABOUT 500,000 PIECES OF INFORMATION | |
| 56 57 58 59 | SURFIX (9 BITS), 512 PIECES AT MAXIMUM | TYPE OF SURFIX (3 BITS), 7 TYPES AT MAXIMUM |
| 60 61 62 63 64 | | SURFIX (5 BITS), 31 PIECES AT MAXIMUM |

FIG. 22

USER ID : NEW REGISTRATION

| 1000 NAME / ADDRESS (N) | 1010 PASSWORD (P) |
| 1020 PLACE OF EMPLOYMENT (A) | 1030 CREDIT CARD (C) |
| 1040 SERVICE (S) | 1050 PERSONAL INFORMATION (U) |
| 1060 PERSONAL INFORMATION 2 (D) | 1070 DESIRED INFORMATION (T) |
| 1080 PRINTING PAPER (Q) | 1090 FAVORITE INFORMATION REGISTRATION (R) |

OK    CANCEL

FIG. 23

| | | |
|---|---|---|
| PHONETIC TRANSCRIPTION (K): | KOSUGI | TARO |
| NAME (N): | KOSUGI | TARO |

HOME

POSTAL CODE (Z): 211 - 0000

ADDRESS (A): 10-2, 5-CHOME, KAWASAKI-SHI, TOKYO

TELEPHONE NUMBER (T): ☐ - ☐ - ☐

FAX NUMBER (F): ☐ - ☐ - ☐

PORTABLE TELEPHONE NUMBER (C): 090 - 0289 - 2345

E-MAIL ADDRESS (E): kosugi@canon

OK    CANCEL

FIG. 25

```
┌─────────────────────────────────────────────────────────────┐
│                                                          ⊠  │
├─────────────────────────────────────────────────────────────┤
│ ┌─PLACE OF EMPLOYMENT──────────────────────────────────────┐│
│ │ NAME OF                                                   ││
│ │ COMPANY (C):     │CANON INC.                       │     ││
│ │ BUSINESS                                                  ││
│ │ CATEGORY (K):    │MANUFACTURING▼│ OTHERS⟩│        │     ││
│ │ NAME OF DEPARTMENT │MA PROJECT    │                       ││
│ │ / SECTION (D):                                            ││
│ │ POST (&P):       │SECTION MANAGER│ JOB (B): │TECHNICAL EMPLOYEE│
│ │ POSTAL CODE (Z): │ 211 │ - │ 0000 │                      ││
│ │ ADDRESS (A):     │1-2-5, YAMASHITA-CHO, CHUO-KU, KAWASAKI-SHI│
│ │ TELEPHONE                                                 ││
│ │ NUMBER (T):      │044│ - │   │ - │   │                   ││
│ │ FAX NUMBER (F):  │   │ - │   │ - │   │                   ││
│ └───────────────────────────────────────────────────────────┘│
│                              │   OK   │   │  CANCEL  │      │
└─────────────────────────────────────────────────────────────┘
```

FIG. 26

```
┌─────────────────────────────────────────────────┐
│                                              ⊠  │
│ ┌─ CREDIT CARD INFORMATION ─────────────────┐   │
│ │ CARD COMPANY                              │   │
│ │      ○ VISA (V)   ○ MasterCard (M)   ○ AmericanExpress (A) │
│ │      ○ JCB (J)    ⊙ DC (D)                │   │
│ │                                           │   │
│ │ CARD NUMBER (N): [0000]-[0000]-[0000]-[0000] │
│ │ VALID DATES (P): [99] / [4]               │   │
│ └───────────────────────────────────────────┘   │
│                            [  OK  ]  [ CANCEL ] │
└─────────────────────────────────────────────────┘
```

FIG. 28

| | | |
|---|---|---|
| DATE OF BIRTH (B): | 99/04/01 ▼ | BLOOD TYPE (L): A ▼ |
| SEX (S): | ⊙ MALE ○ FEMALE | |
| FINAL SCHOOL CARRIER (G): | UNIVERSITY/GRADUATE SCHOOL ▼ | |
| OCCUPATION (O): | TECHNICAL EMPLOYEE ▼ | OTHERS⟩ |
| MARRIED/SINGLE (M): ⊙ SINGLE ○ MARRIED | NUMBER OF FAMILY MEMBERS (A): | ONE ▼ |
| INCOME (I): ¥3,000,000 TO ¥5,000,000 ▼ | AMOUNT OF SAVING (F): | ¥1,000,000 OR LESS ▼ |

OK    CANCEL

FIG. 29

| | | | | |
|---|---|---|---|---|
| HOUSE (P) | ○ DETACHED HOUSE | ⊙ APARTMENT HOUSE | ○ RENTAL HOUSE | |
| | ○ COMPANY HOUSE / DORMITORY | ○ HOUSE OWNED BY RELATIVE | | |
| CAR etc. (C) | ☑ PRIVATE CAR | PISTON DISPLACEMENT 1500~2000 ▼ | MODEL RV ▼ | |
| | ☐ MOTORCYCLE | PISTON DISPLACEMENT ▼ | MODEL ▼ | |
| PET (P) | ☐ PET | TYPE ▼ | | |
| | ☑ DESIRED PET | TYPE DOG ▼ | | |
| HOBBY (H) | ☑ MUSIC LISTENING | FAVORITE GENRE | ROCK-'N'-ROLL ▼ | |
| | ☑ MOVIEGOING | FAVORITE GENRE | SF ▼ | |
| | ☑ SPECTATOR SPORTS | FAVORITE GENRE | PROFESSIONAL BASEBALL ▼ | |
| | ☑ SPORTS | FAVORITE GENRE | SANDLOT BASEBALL ▼ | |
| | ☐ FISHING | FAVORITE PLACE | ▼ | |

OK    CANCEL

FIG. 35

ARE YOU A MEMBER?

⊙ YES (Y)    MEMBERSHIP NUMBER (C): [CAI-00023|]
○ NO (N)

[NEXT (F)]    [CANCEL (C)]

FIG. 37

IT IS NECESSARY FOR A NONMEMBER TO REGISTER ADDRESS WHERE THE INFORMATION PROVIDER CAN CONTACT YOU. INPUT NECESSARY MATTERS AND PRESS "NEXT"

POSTAL CODE (Z): 211 - 8909

ADDRESS (A): DAINI-TANAKA BLDG. 2F, 2-12-3 HIGASHIKANAMACHI, CHUO-KU, KAWASAKI-SHI

TELEPHONE NUMBER (T): 04 - 23 - 2020

NAME OR NAME OF COMPANY (N): CANDY INFORMATION SERVICE (K.K)

E-MAIL ADDRESS (E): candiinf@candi.co.jp

NEXT (F) | BACK (B) | CANCEL REGISTRATION (C)

FIG. 38

WE RECOMMENDED YOU TO BE A MEMBER.

DO YOU REGISTER FOR MEMBERSHIP?

YES (Y)   NO (N)

FIG. 39

WILL YOU CHARGE FOR THIS INFORMATION?

☑ CHARGE FOR PRINTING (C)

CHARGE (P) ¥20 PER PRINTING

NEXT (F) | BACK (B) | CANCEL REGISTRATION (C)

FIG. 44

SET STARTING DATE OF INFORMATION INSERTION (S)

[APRIL 15, 1999 ▼]

SET VALID DATES OF INFORMATION

○ INDEFINITE (I)
○ ONE WEEK (W)
○ ONE MONTH (M)
○ ONE YEAR (Y)
○ DESIGNATE DATE (D)  [APRIL 30, 1999 ▼]

☑ VALID DATES OF P-CODE IS SET INDEPENDENTLY OF THAT OF INFORMATION (F)

[MAY 31, 1999 ▼]

| NEXT (F) | BACK (B) | CANCEL REGISTRATION (C) |

FIG. 45

SIZE OF INFORMATION TO BE REGISTERED IS AS FOLLOWS

TEXT                                142 CHARACTERS

PRINTING IMAGE                4×6cm

OVERALL REGION OF INFORMATION  12×6cm

WILL YOU FIX INFORMATION SIZE IN LAYOUT?

○ FIX (D)

⊙ ALLOW CHANGE (A)

FONT SIZE IS FROM [8] Pt TO [14] Pt

MAGNIFICATION OF PRINTING IMAGE IS FROM [50] % TO [200] %

| NEXT (F) | BACK (B) | CANCEL REGISTRATION (C) |

FIG. 46

WILL YOU PERMIT ADVERTISEMENT INSERTION
INTO THE PAGE?

- ⊙ YES (Y)
- ○ PERMIT FOR LOWER SURFACE (R)
- ○ NO (N)

| NEXT (F) | BACK (B) | CANCEL REGISTRATION (C) |

FIG. 47

WILL YOU SET PASSWORD FOR ACCESS TO INFORMATION?

☑ SET PASSWORD (S)

PASSWORD (P): * * * *

| NEXT (F) | BACK (B) | CANCEL REGISTRATION (C) |

FIG. 49

SELECT GENRE OF INFORMATION TO BE REGISTERED (J)
[SPORTS ▼]

SELECT SUBGENRE OF INFORMATION TO BE REGISTERED (S)
[BASKETBALL ▼]

SET KEYWORD WHEN LINKED TO ADVERTISEMENT (K)
[NBA]                    [ADD (A)]

GAME RESULTS
PERSONAL RECORDS         [DELETE (D)]

☐ NEGATIVE LINK TO ADVERTISEMENT (N)

[NEXT (F)]  [BACK (B)]  [CANCEL REGISTRATION (C)]

FIG. 51

INPUT TITLE OF INFORMATION (T)

NBA FINAL

INPUT COMMENT (SUMMARY) FOR INFORMATION
TO BE REGISTERED (S)

| NEXT (F) | BACK (B) | CANCEL REGISTRATION (C) |

FIG. 53

PRESS REGISTER BUTTON TO END REGISTRATION

REGISTERED P-CODE IS 2010-4243-26227

FOLLOWING PROPERTIES ARE REGISTERED

REGISTERED FILE NAME :
 Top001.txt
 Top_attachi.bmp

VALID DATES :
 APRIL 26, 1999

PRINTING CHARGE :
 ¥ 10/Print

REGISTER (R)  BACK (B)  CANCEL REGISTRATION (C)

FIG. 55

```
┌─────────────────────────────────────────────────┐
│                                            [X]  │
├─────────────────────────────────────────────────┤
│  ADVERTISEMENT WILL BE REGISTERED               │
│                                                 │
│    ARE YOU AN ADVERTISEMENT REGISTRATION MEMBER?│
│                                                 │
│                                    ┌──────────┐ │
│   ○ YES (Y)   MEMBERSHIP NUMBER (C):│          │ │
│                                    └──────────┘ │
│   ○ NO (N)                                      │
│                                                 │
│                     ┌──────────┐  ┌───────────┐ │
│                     │ NEXT (F) │  │  CANCEL   │ │
│                     │          │  │REGISTRATION(C)│
│                     └──────────┘  └───────────┘ │
└─────────────────────────────────────────────────┘
```

FIG. 56

INPUT PASSWORD OF ADVERTISEMENT
REGISTRATION
MEMBER ID CA_INF_0023 (P)

*******

| NEXT (F) | BACK (B) | CANCEL REGISTRATION (C) |

FIG. 57

IT IS NECESSARY FOR AN ADVERTISEMENT REGISTRATION NONMEMBER TO REGISTER ADDRESS WHERE THE ADVERTISEMENT PROVIDER CAN CONTACT YOU. INPUT NECESSARY MATTERS AND PRESS "NEXT"

POSTAL CODE (Z): 227 - 3298

ADDRESS (A): 2-3-4 KIBOGAOKA, MINAMI-KU, YOKOHAMA-SHI, SHIZUOKA-KEN

TELEPHONE NUMBER (T): 0453 - 257 - 9802

NAME OR NAME OF COMPANY (N): CanDINET PROJECT

E-MAIL ADDRESS (E): candi@canon.co.jp

[ NEXT (F) ]   [ BACK (B) ]   [ CANCEL REGISTRATION (C) ]

FIG. 61

SET STARTING DATE OF ADVERTISEMENT INSERTION (S)

MARCH 29, 1999 ▼

SET VALID DATES OF ADVERTISEMENT TO BE REGISTERED

○ INDEFINITE (I)
○ ONE WEEK (W)
○ ONE MONTH (M)
○ ONE YEAR (Y)
⊙ DESIGNATE DATE (D)   APRIL 10, 1999 ▼

| NEXT (F) | BACK (B) | CANCEL REGISTRATION (C) |

FIG. 64

ADVERTISEMENT SIZE CALCULATED FROM TRANSFERRED FILE IS AS FOLLOWS

TEXT    142 CHARACTERS

PRINTING IMAGE    4×6cm

OVERALL REGION OF ADVERTISEMENT    12×6cm

SELECT PRINTING SIZE OF ADVERTISEMENT TO BE REGISTERED (S)

| L SIZE 6cm×12cm ▼ |    ○ PORTRAIT (P)

⦿ LANDSCAPE (L)

ADJUSTMENT OF ADVERTISEMENT SIZE

⦿ ENLARGE / REDUCE REGISTERED DATA TO FIT ADVERTISEMENT TO PRINTING SIZE (A)

○ PRINT ADVERTISEMENT AT THE CENTER WITHOUT ANY CHANGE IN SIZE OF REGISTERED DATA (R)

NEXT (F)    BACK (B)    CANCEL REGISTRATION (C)

FIG. 65

ADVERTISEMENT SIZE CALCULATED FROM
TRANSFERRED FILE IS AS FOLLOWS

| | |
|---|---|
| TEXT | 142 CHARACTERS |
| PRINTING IMAGE | 4×6cm |
| OVERALL REGION OF ADVERTISEMENT | 12×6cm |

SELECT PRINTING SIZE OF ADVERTISEMENT TO BE REGISTERED (S)

L SIZE (6cm×12cm) ▼

○ PORTRAIT (P)

○ LANDSCAPE (L)

B5 SIZE
B6 SIZE
L SIZE (6cm×12cm)
M SIZE (4cm×8cm)
S SIZE (2cm×5cm)
POSTCARD SIZE

T SIZE

STERED DATA TO FIT
ADVERTISEMENT TO PRINTING SIZE (A)

○ PRINT ADVERTISEMENT AT THE CENTER WITHOUT
ANY CHANGE IN SIZE OF REGISTERED DATA (R)

| NEXT (F) | BACK (B) | CANCEL REGISTRATION (C) |

FIG. 66

LIMITATION ON ADVERTISEMENT INSERTION POSITION
- [ ] SINGLE ADVERTISEMENT (U)
- [ ] ALWAYS TO BE PRINTED AS TOP ADVERTISEMENT (T)
- [✓] MAY BE PRINTED ON LOWER SURFACE (R)

NEXT (F) | BACK (B) | CANCEL REGISTRATION (C)

FIG. 67

CHARGE FOR REGISTERED ADVERTISEMENT PER INSERTION IS 20 YEN. ADVERTISEMENT IS CHARGED FOR ACCORDING TO NUMBER OF PRINTED PAGES

SET UPPER LIMIT OF ADVERTISEMENT CHARGE :

⊙ DESIGNATE MAXIMUM NUMBER OF TIMES OF PRINTING (V)

○ DESIGNATE UPPER LIMIT OF ADVERTISEMENT CHARGE (P)

MAXIMUM (M): 400 TIMES

NEXT (F)  BACK (B)  CANCEL REGISTRATION (C)

FIG. 68

PRESS REGISTER BUTTON TO END REGISTRATION

FOLLOWING PROPERTIES ARE REGISTERED

REGISTERED FILE NAME :
 Bargain_sale.txt
 Bargain_sale.jpg

VALID DATES :
 FROM MARCH 29, 1999 TO APRIL 10, 1999

LINK RULE TO INFORMATION
 REGION
  DESIGNATE CITIES, TOWNS, AND VILLAGES,
  KITA-KU, KAWASAKI-SHI
 KEYWORD
  EATING AND DRINKING, RESTAURANT,
  CHINESE, DISCOUNT, TASTY

| REGISTER (R) | BACK (B) | CANCEL REGISTRATION (C) |

FIG. 72

| SCALE | EXTERNAL CODE | URL |
|---|---|---|
| MINIMAL SCALE | | |
| SMALL SCALE | | |
| MEDIUM SCALE | | |
| LARGE SCALE | | |
| MAXIMUM SCALE | | |

F I G. 73

| P-CODE<br>(NUMBER SECTION = EXTERNAL CODE + INTERNAL CODE) | VALID DATES OF CODE |
|---|---|
|  |  |
|  |  |

FIG. 82

```
                                                        2038
┌─────────────────────────────────────────────────────────┐
│              PRINTING OF ADVERTISEMENT                  │
│                                                         │
│     ADVERTISER BEARS PRINTING CHARGE FOR YOU            │
│           WHEN ADVERTISEMENT IS PRINTED                 │
│                                                         │
│   PRINT IN FREE SPACE OF ARTICLE    [YES] [NO]  ⎫       │
│                                                 ⎬ 2039  │
│   PRINT ON LOWER SURFACE            [YES] [NO]  ⎪       │
│                                                 ⎭       │
│   PRINT ON ANOTHER PAGE             [YES] [NO]          │
│                                         2040   2041     │
│                                         [OK]   [CANCEL] │
└─────────────────────────────────────────────────────────┘
```

SET ORIGINAL TO UPPER LEFT CORNER OF
SCANNER AND PRESS "OK"

2111 — OK
2112 — BACK
2113 — CANCEL

FIG. 96

| REGISTERED P-CODE | 09027648234-4 |
|---|---|
| DATA PASSWORD | ✱ ✱ ✱ ✱ |
| REGISTERED DATA | IMAGE 480 KBytes |
| VALID DATES | ONE WEEK (UNTIL APRIL 10) |

FOLLOWING DATA IS RECEIVED.
PRESS "OK" TO PRINT PARTICULARS

OK   BACK   CANCEL

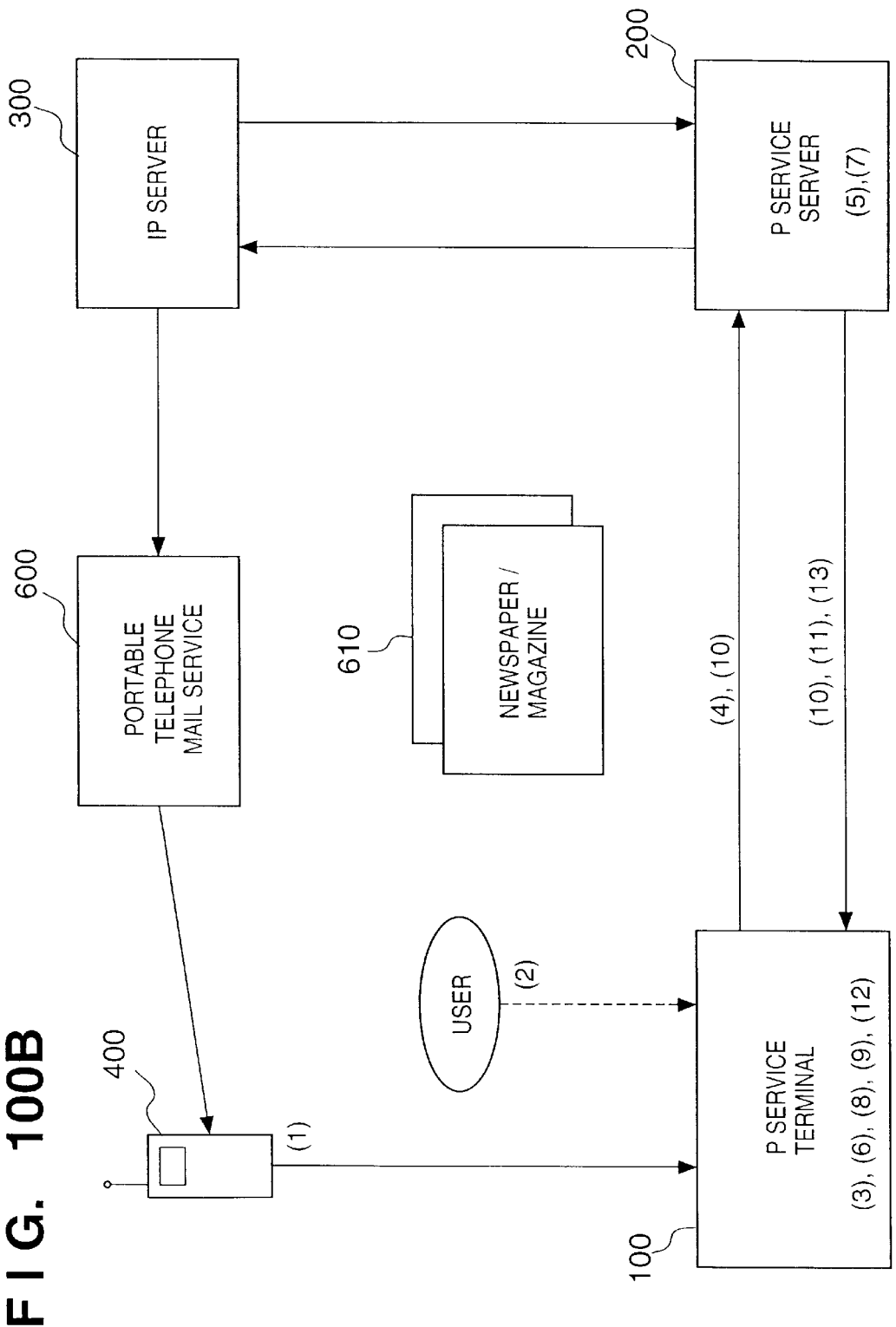

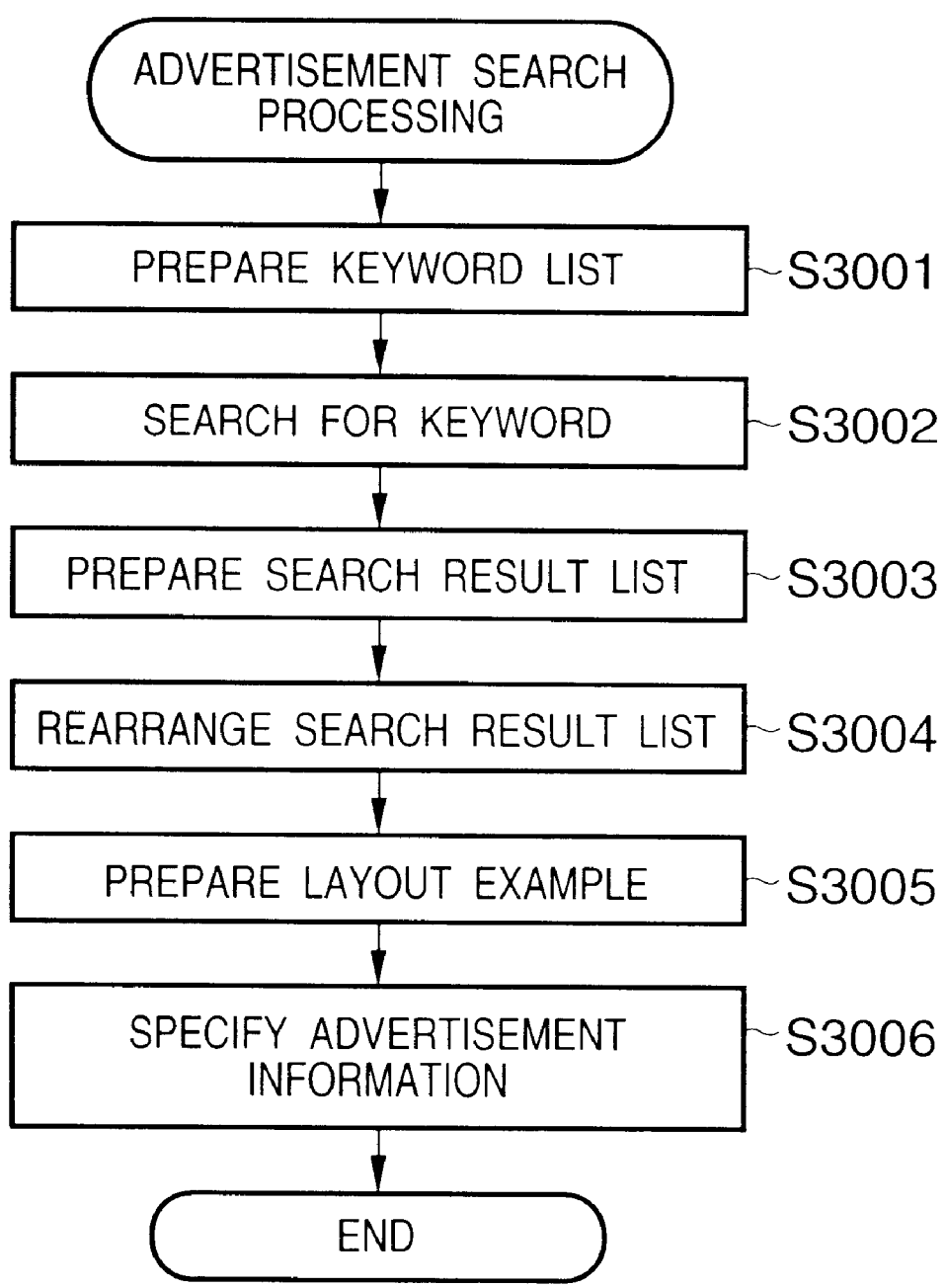

FIG. 105A

| IP INFORMATION LIST | |
|---|---|
| KEYWORD | WEIGHT |
| MARRIAGE | +10 |

FIG. 105B

| USER REGISTRATION LIST | |
|---|---|
| KEYWORD | WEIGHT |
| TOKYO | +1 |
| 25 YEARS OLD | +1 |

FIG. 105C

| P SERVICE TERMINAL LIST | |
|---|---|
| KEYWORD | WEIGHT |
| SAITAMA | +1 |

FIG. 105D

| HIGHEST PRIORITY LIST | |
|---|---|
| KEYWORD | WEIGHT |
| ADMISSION | +5 |
| CHINESE CUISINE | +4 |

FIG. 105E

| LOWEST PRIORITY LIST | |
|---|---|
| KEYWORD | WEIGHT |
| TOKYO | +1 |
| KANAGAWA | +1 |

FIG. 106A

| SEARCH RESULT LIST OF IP INFORMATION LIST | | | |
|---|---|---|---|
| KEYWORD | WEIGHT | P-CODE | DEGREE OF MATCHING |
| MARRIAGE | +10 | + + + | +100 |
| | -5 | * * * | -50 |
| | +3 | - - - | +30 |
| | -4 | + - + | -40 |
| | +7 | * - * | +70 |

FIG. 106B

| SEARCH RESULT LIST OF USER REGISTRATION LIST | | | |
|---|---|---|---|
| KEYWORD | WEIGHT | P-CODE | DEGREE OF MATCHING |
| TOKYO | +2 | @ @ * | +2 |
| | +8 | + - * | +8 |
| | -2 | @ + + | -2 |
| 25 YEARS OLD | +10 | @ * * | +10 |

FIG. 106C

| SEARCH RESULT LIST OF P SERVICE TERMINAL LIST | | | |
|---|---|---|---|
| KEYWORD | WEIGHT | P-CODE | DEGREE OF MATCHING |
| SAITAMA | +10 | + + @ | +10 |
| | +5 | * + + | +5 |
| | -5 | @ * @ | -5 |

FIG. 106D

| SEARCH RESULT LIST OF HIGHEST PRIORITY LIST | | | |
|---|---|---|---|
| KEYWORD | WEIGHT | P-CODE | DEGREE OF MATCHING |
| ADMISSION | +10 | + + / | +50 |
| | +3 | * / * | +15 |
| CHINESE CUISINE | +3 | % % % | +12 |
| | -4 | $ $ $ | -16 |
| | +7 | % & % | +28 |

FIG. 106E

| SEARCH RESULT LIST OF LOWEST PRIORITY LIST | | | |
|---|---|---|---|
| KEYWORD | WEIGHT | P-CODE | DEGREE OF MATCHING |
| TOKYO | +1 | + & + | +1 |
| | -2 | * * & | -2 |
| KANAGAWA | +2 | $ - - | +2 |
| | -2 | + - & | -2 |
| | +1 | * - & | +1 |

FIG. 107A

| SEARCH RESULT LIST OF IP INFORMATION LIST | | | |
|---|---|---|---|
| KEYWORD | WEIGHT | P-CODE | DEGREE OF MATCHING |
| MARRIAGE | +7 | * - * | +85 |
| | +10 | + - + | +80 |
| | +3 | - - - | +30 |
| | -5 | * * * | -30 |
| | -4 | + - + | -45 |

FIG. 107B

| SEARCH RESULT LIST OF USER REGISTRATION LIST | | | |
|---|---|---|---|
| KEYWORD | WEIGHT | P-CODE | DEGREE OF MATCHING |
| TOKYO | +8 | + - * | +10 |
| | -2 | @ + + | +0 |
| | +2 | @ @ + | -1 |
| 25 YEARS OLD | +10 | @ * * | +10 |

FIG. 107C

| SEARCH RESULT LIST OF P SERVICE TERMINAL LIST | | | |
|---|---|---|---|
| KEYWORD | WEIGHT | P-CODE | DEGREE OF MATCHING |
| SAITAMA | +10 | + + @ | +15 |
| | +5 | * + + | +3 |
| | -5 | @ * @ | -8 |

FIG. 107D

| SEARCH RESULT LIST OF HIGHEST PRIORITY LIST | | | |
|---|---|---|---|
| KEYWORD | WEIGHT | P-CODE | DEGREE OF MATCHING |
| ADMISSION | +10 | + + / | +40 |
| | +3 | * / * | +10 |
| CHINESE CUISINE | +7 | % & % | +25 |
| | +3 | % % % | +20 |
| | -4 | $ $ $ | -5 |

FIG. 107E

| SEARCH RESULT LIST OF LOWEST PRIORITY LIST | | | |
|---|---|---|---|
| KEYWORD | WEIGHT | P-CODE | DEGREE OF MATCHING |
| TOKYO | -2 | * * & | +4 |
| | +1 | + & + | -5 |
| KANAGAWA | +2 | $ - - | +10 |
| | -2 | + - & | -1 |
| | +1 | * - $ | -5 |

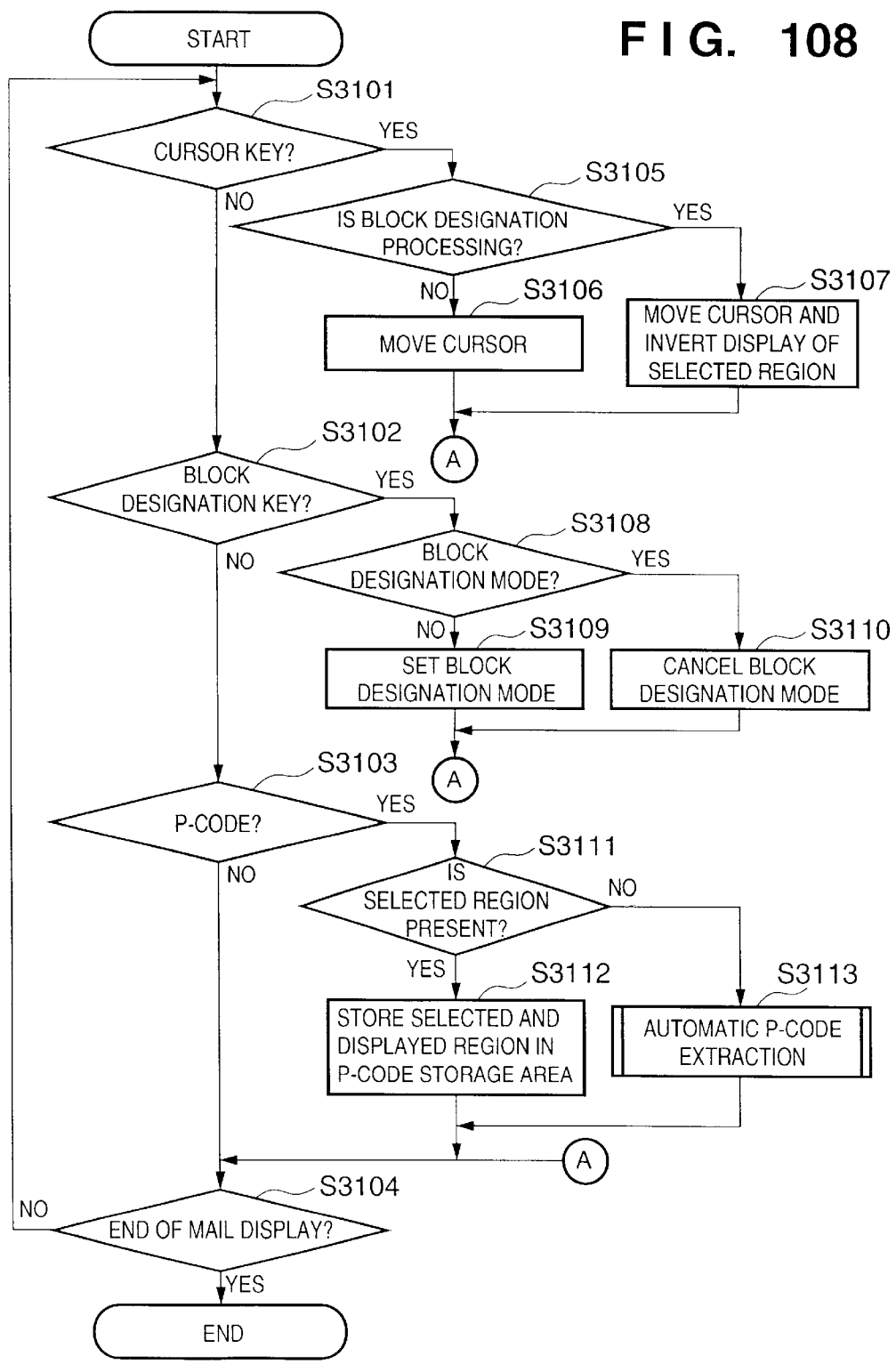
FIG. 108 RECEPTION OF MAIL AND DISPLAY OF CONTENTS OF MAIL

MAIL UNDER DISPLAY AND AUTOMATIC P-CODE EXTRACTION

CODE GENERATION METHOD, TERMINAL APPARATUS, CODE PROCESSING METHOD, ISSUING APPARATUS, AND CODE ISSUING METHOD

FIELD OF THE INVENTION

The present invention relates to a method of generating a code representing a service for, e.g., printing information in a terminal, terminal apparatus, code processing method, issuing apparatus, and code issuing method.

BACKGROUND OF THE INVENTION

Along with the recent development of communication technology, the following methods have been used to provide information to users.
1: Internet Web
2: Internet push-type news distribution service
3: FAX information extraction service
4: Sending material requesting coupons attached to newspapers/magazines
5: Inquiry by free dials
6: Sending material requesting postcards As portable information terminals are being widely used, information providing services using character information are becoming active. However, since a portable terminal has a limited display ability in size, colors, and resolution, a demand has arisen for a detail information providing service capable of compensating for it.

The above methods are conventionally used to acquire detail information, though they have limitations.

Methods 1 and 2 are limited to PC or terminal users well versed in the Internet environment, and it is also time-consuming to find a URL necessary for access to desired information. Method 3 is limited to FAX users. In addition, the print ability (monochrome printing and print preview) is limited, and the output cost (telephone charge or cost of paper) is for the users to bear. Methods 4, 5, and 6 are available for many and unspecified users. However, a user can acquire information several hours or several days after the request. The information provider side must also prepare a physical request processing system, resulting in an increase in information providing cost.

As described above, in the prior art, to register information in expectation of use of the information in the future, the register or user must input all data for a code for identifying the information, resulting in cumbersome operation. Even if it is not cumbersome, an input error may occur.

SUMMARY OF THE INVENTION

The present invention has been proposed to solve the problem of the prior art.

In order to achieve the above object, according to the present invention, there is provided a code generation method of generating a code which means predetermined processing, characterized by comprising the steps of:
inputting a predetermined first code portion by a user through predetermined input means;
attaching a predetermined second code portion to the first code portion input by the input means to generate an integrated code; and
externally outputting the integrated code.

A terminal apparatus of the present invention is characterized by comprising the input means.

According to the present invention, there is also provided a code processing method of processing a code representing predetermined processing, characterized by comprising the steps of inputting a first code portion by a user, attaching a second code portion to the first code portion, and handling the first code portion and the second code portion, which are integrated, as a code and executing processing corresponding to the code.

According to the present invention, there is also provided an issuing apparatus for generating a code for identifying information, comprising:
means for assigning a main code portion for identifying an information input user to information to be registered; and
means for attaching a subcode portion associated with the information to be registered to the main code portion.

According to the present invention, there is also provided a code issuing method in a storage device for storing information and a code in correspondence with each other, characterized by comprising the steps of:
issuing a first code for specifying information to be stored in the storage device in accordance with a scale of the storage device within an allowable range; and
issuing a third code containing a second code predetermined in accordance with the scale of the storage device and the issued first code to the storage device.

According to the present invention, there is also provided a code processing method characterized by comprising the step of identifying, using a scale discrimination bit of an input code, a bit for specifying a storage device and a bit for specifying information held by the storage device in the code.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing a data structure example of an IP information registration table;

FIG. 8 is a view showing a data structure example of an advertisement information table;

FIG. 9 is a view showing a data structure example of a user information table;

FIG. 10 is a view showing a data structure example of a mail service P-code table;

FIG. 11 is a view showing a data structure example of a distribution service P-code table;

FIG. 12 is a view showing a data structure example of a personal information service P-code table;

FIG. 13 is a view showing a data structure example of a personal information table;

FIG. 14 is a view showing a data structure example of an owner information table;

FIG. 15 is a view showing a data structure example of a terminal information table;

FIG. 17 is a view for explaining the data structure of a P-code used in the P service system according to this embodiment;

FIG. 18 is a view showing the data structure of a P-code;

FIG. 22 is a dialog box for new registration processing;

FIG. 23 is a dialog box corresponding to a "name/address" button 1000;

FIG. 25 is a dialog box corresponding to a "place of employment" button 1020;

FIG. 26 is a dialog box corresponding to a "credit card" button 1030;

FIG. 28 is a dialog box corresponding to a "personal information" button 1050;

FIG. 29 is a dialog box corresponding to a "personal information 2" button 1060;

FIG. 35 is a dialog box for confirming a member;

FIG. 37 is a dialog box for specifying a nonmember;

FIG. 38 is a dialog box for inviting registration of a member;

FIG. 39 is a dialog box for setting charging;

FIG. 44 is a dialog box for setting a property;

FIG. 45 is a dialog box for setting another property;

FIG. 46 is a dialog box for setting still another property;

FIG. 47 is a dialog box for setting still another property;

FIG. 49 is a dialog box for setting still another property;

FIG. 51 is a dialog box for setting still another property;

FIG. 53 is a dialog box for displaying the list of input items;

FIG. 55 is a dialog box for confirming a member;

FIG. 56 is a dialog box for inputting a member's password;

FIG. 57 is a dialog box for specifying a nonmember;

FIG. 61 is a dialog box for setting a property;

FIG. 64 is a dialog box for setting still another property;

FIG. 65 is a dialog box for setting still another property;

FIG. 66 is a dialog box for setting still another property;

FIG. 67 is a dialog box for setting still another property;

FIG. 68 is a dialog box showing the list of input items;

FIG. 72 is a view showing the data structure of a P-code use registration table used in this embodiment;

FIG. 73 is a view showing the data structure of a P-code use table;

FIG. 82 is a view showing still another example of the display window displayed on the touch panel 104 of the P service terminal 100 of this embodiment;

FIG. 92 is a view showing still another example of the display window displayed on the touch panel 104 of the P service terminal 100 of this embodiment;

FIG. 96 is a view showing still another example of the display window displayed on the touch panel 104 of the P service terminal 100 of this embodiment;

FIG. 100B is a view showing the processing sequence in the service system for executing the distribution service (reception of registered information) of this embodiment;

FIG. 104 is a flow chart of advertisement search processing;

FIG. 105A is a view showing an example of a keyword list of IP information;

FIG. 105B is a view showing an example of a keyword list of user registration;

FIG. 105C is a view showing an example of a keyword list of the P service terminal;

FIG. 105D is a view showing an example of a highest priority keyword list;

FIG. 105E is a view showing an example of a lowest priority keyword list;

FIG. 106A is a view showing an example of the search result list of an IP information list;

FIG. 106B is a view showing an example of the search result list of a user registration list;

FIG. 106C is a view showing an example of the search result list of a P service terminal list;

FIG. 106D is a view showing an example of the search result list of a highest priority list;

FIG. 106E is a view showing an example of the search result list of a lowest priority list;

FIG. 107A is a view showing an example of the search result list of the rearranged IP information list;

FIG. 107B is a view showing an example of the search result list of the rearranged user registration list;

FIG. 107C is a view showing an example of the search result list of the rearranged P service terminal list;

FIG. 107D is a view showing an example of the search result list of the rearranged highest priority list;

FIG. 107E is a view showing an example of the search result list of the rearranged lowest priority list;

FIG. 108 is a flow chart for explaining P-code extraction processing of the portable terminal of this embodiment;

FIG. 109 is a flow chart for explaining automatic P-code extraction processing in step S3113;

FIG. 110 is a flow chart for explaining P-code transmission processing by the portable terminal of this embodiment; and FIG. 111 is a flow chart for explaining another form of P-code transmission processing by the portable terminal of this embodiment.

DETAILED DESCRIPTION OF THE PREFERRED EMBODIMENTS

Preferred embodiments of the present invention will now be described in detail in accordance with the accompanying drawings.

<System Arrangement>

A service system (to be referred to as a P service system hereinafter) to be described in this embodiment has a plurality of service terminals (to be referred to as P service terminals hereinafter) installed in shops or stations and a dedicated service server (to be referred to as a P service server hereinafter) connected to the P service terminals. When a code (to be referred to as a P-code hereinafter) in a predetermined form is input from a P service terminal, corresponding information is acquired from the P service server, and the print of necessary information is obtained. Note that designation of a P-code to a P service terminal can be done by unspecified users.

Figure 1:
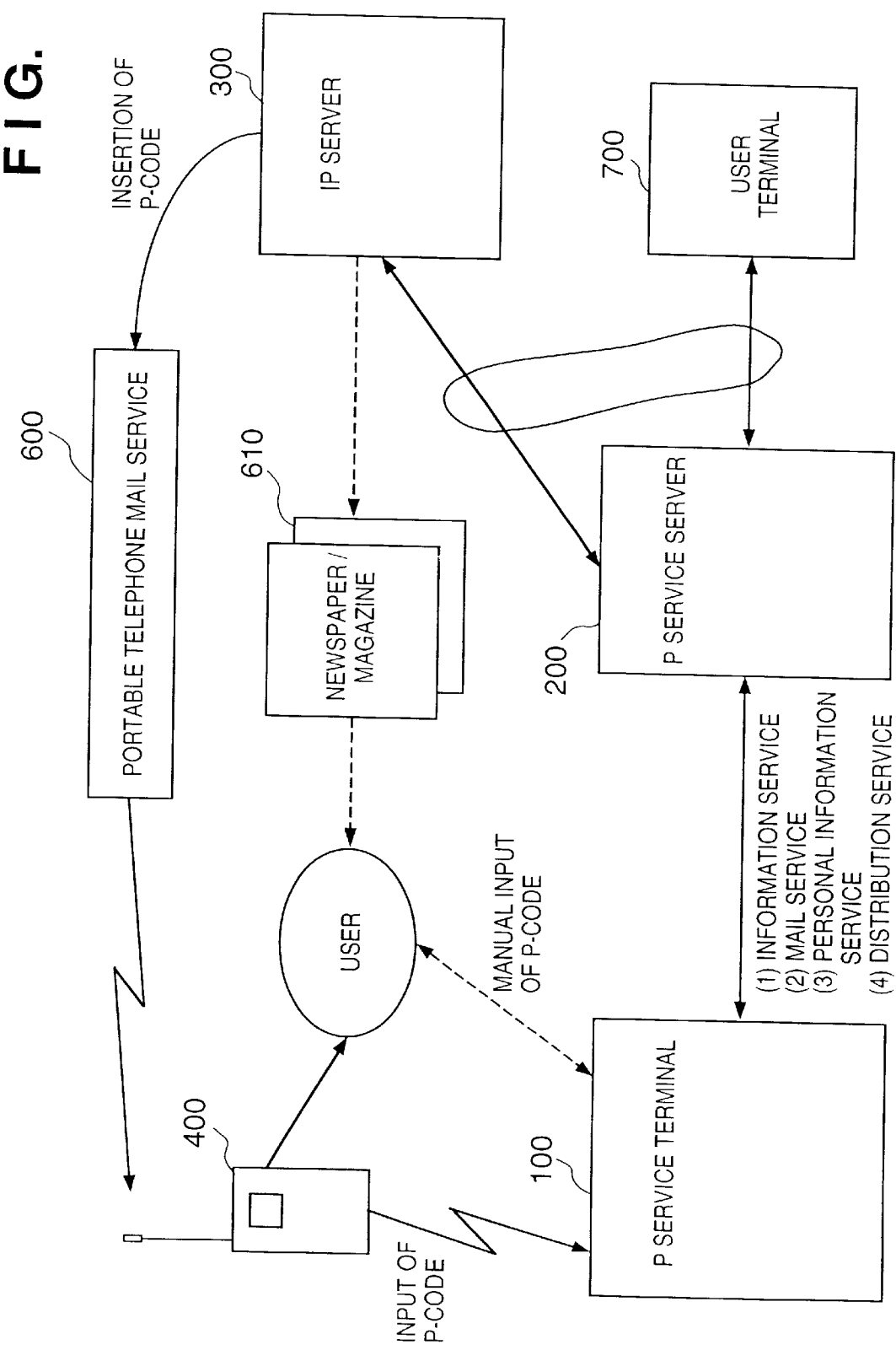
FIG. 1 is a view for explaining the schematic arrangement of a P service system according to an embodiment.

FIG. 1 is a view showing the schematic arrangement of the P service system according to this embodiment. Referring to FIG. 1, reference numeral 100 denotes a P service terminal; and 200, a P service server. The P service terminal 100 communicates with the P service server, acquires information corresponding to a P-code input by a user, and prints the information. Alternatively, image information input in the P service terminal 100 can be uploaded to the P service server.

The P service terminal 100 can be a terminal installed for public use in a shop, street, or public facility. In this case, the P service terminal 100 does not include a terminal used by only a specific person, e.g., a so-called personal computer used by a person at home.

The P service server 200 issues P-codes corresponding to provided information, registers the P-codes in a P-code database, and manages them. The P service server 200 acquires information corresponding to a P-code input from the P service terminal 100, generates print data, and outputs it to the P service terminal 100.

An information provider server 300 (to be referred to as an IP server hereinafter) is, e.g., a general Internet provider. In response to an information request from the P service server 200, the IP server 300 transmits information (contents) corresponding to the P-code attached to the information request to the P service server 200. Additionally, as will be described later, the P service server 200 sets a plurality of usable P-codes in the IP server 300, and the IP server 300 can uniquely issue a P-code in correspondence with information provided from a user terminal within the range of the usable P-codes.

FIG. 1 shows a system in which the P service server 200 and IP server 300 independently function, and information can be transmitted/received through a communication network. However, a system in which the P service server 200 incorporates the IP server 300, and the function of the IP server is realized by the P service server may be constructed.

When the P-code of information managed on the IP server 300 side is input from the P service terminal 100, the P service server 200 finds a corresponding IP server from the P-code and transmits the P-code to this IP server to request information.

A portable terminal 400 is, e.g., a portable telephone. The IP server 300 notifies a P service terminal user (to be simply referred to as a user hereinafter) of a P-code informed from the P service server 200 by inserting the P-code on media 610 such as newspapers and magazines or describing the P-code in mail information transmitted to the user's portable terminal 400 using a portable telephone mail service 600. When the user inputs the P-code attached to information of interest from the P service terminal 100, he/she can obtain the print of information corresponding to the P-code. The portable terminal 400 of this embodiment can extract a P-code described in mail information, hold it in an internal memory, and input the held P-code to the P service terminal 100 by infrared communication or the like.

A service such as a mail service becomes available when personal registration is done in the P service server 200. This registration can be done from, e.g., a terminal of a user (user terminal 700) through a Web. Instead, the user may fill a registration form with predetermined items, and the operator of the P service server may perform registration processing in accordance with the described contents.

In this embodiment, two kinds of information are provided by the IP server 300 and registered/managed by the P service server 200. One is information (to be referred to as IP information hereinafter) provided to a user with or without charge on the basis of P-code designation by the user from the P service terminal 100 or the like. The other is information (to be referred to as advertisement information hereinafter) automatically selected by the P service server and attached to information (e.g., IP information) acquired in accordance with P-code input by the user.

As examples of services realized in the above-described P service system, the following services will be mainly described in this embodiment. (1) User registration: a personal P-code is given in accordance with registration application from the user terminal 700 to the P service server. (2) IP information registration: in accordance with IP information registration application from the IP server 300, IP information is registered in the P service server 200, and a P-code for the IP is given. (3) Advertisement information registration: in accordance with an advertisement information registration application, advertisement information is registered in the P service server 200. (4) Information service: by inputting the P-code (P-code for the IP) of desired information from the P service terminal 100, a print output of the desired information is obtained. (5) Mail service: by inputting the user's P-code (personal P-code) from the P service terminal 100, mail addressed to the user is printed. (6) Personal information service: by inputting the user's P-code from the P service terminal 100, a print output of information set/registered for the user in advance is obtained. (7) Distribution service: desired information is uploaded from the P service terminal 100 to the P service server 200 in advance and printed from the P service terminal 100 as needed.

Each of these services will be described later in detail. The services and functions realized by the P service system of this embodiment are not limited to the above-described services and functions.

<Arrangement of P Service Terminal>

Figure 2:
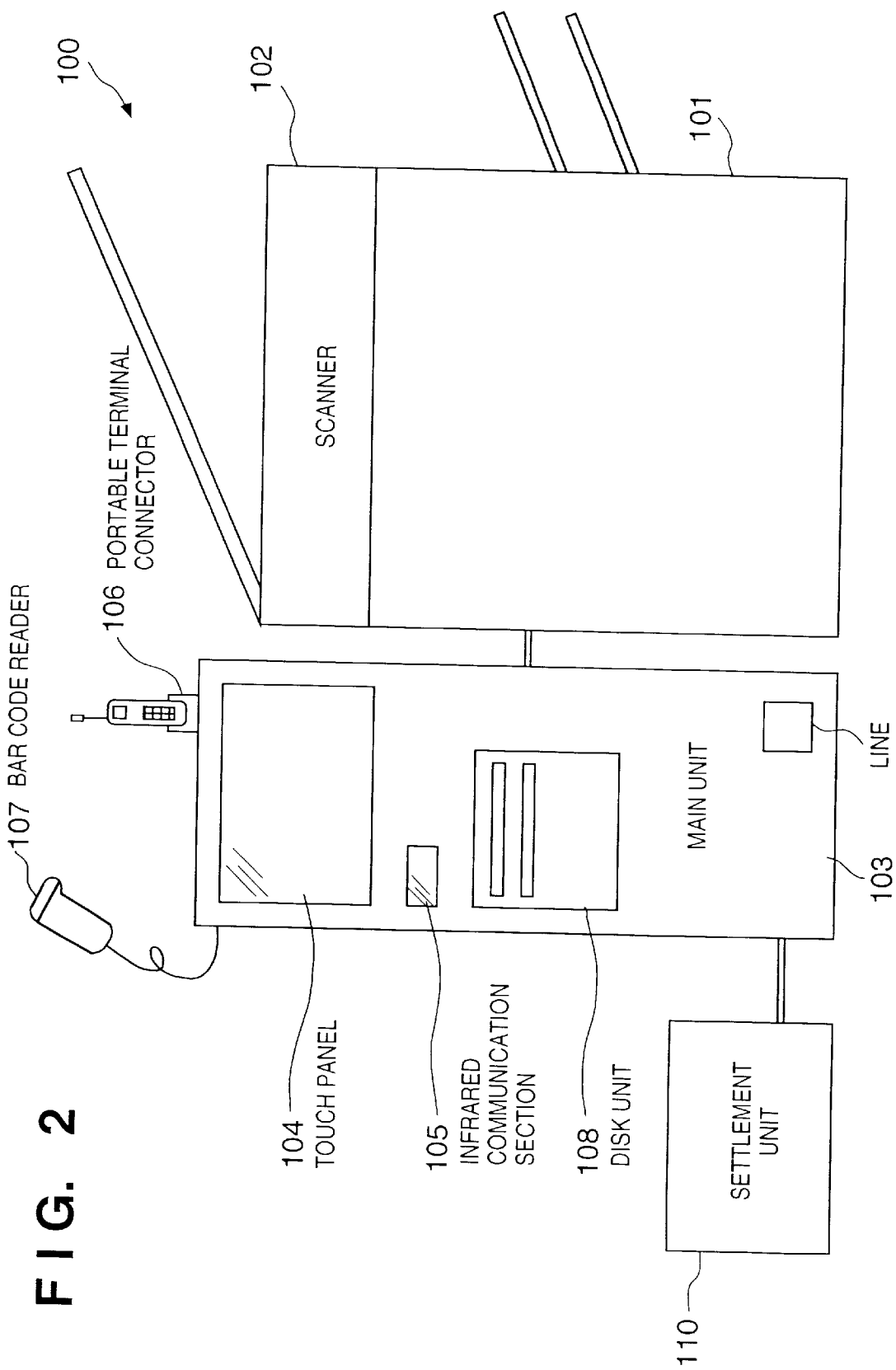
FIG. 2 is a view showing the schematic appearance of a P service terminal 100 according to this embodiment.

FIG. 2 is a view showing the schematic appearance of the P service terminal 100 of this embodiment. Referring to FIG. 2, a printer 101 forms a visible color image by, e.g., a laser beam scheme. A scanner 102 optically reads an original image and converts it into digital image data. The printing scheme of the printer 101 is not limited to the laser beam scheme, and any other scheme such as a thermal transfer scheme or ink-jet printing scheme can be used. Using the printer 101 and scanner 102, the service terminal 100 can also be made to function as a copying machine. A main unit 103 controls communication with the P service server 200 or communication with the portable terminal 400 and performs various operation inputs and display corresponding to various operations.

In the main unit 103, a touch panel 104 receives an operation input by a user and presents various information to the user. An infrared communication section 105 is used to receive a P-code from a portable terminal having an infrared communication function by infrared communication. When a portable terminal is connected to a portable terminal connector 106, data (P-code) stored in the memory of the portable terminal is read out by the P service terminal 100. When a P-code is provided in a form of a bar code, a bar code reader 107 is used to read the bar code to acquire the P-code.

A disk unit 108 reads/writes data from/in a medium such as a floppy disk or MO disk. A settlement unit 110 performs settlement for the above-described various services. As a settlement method, various methods including settlement using cash or a credit card are available.

Figure 3:
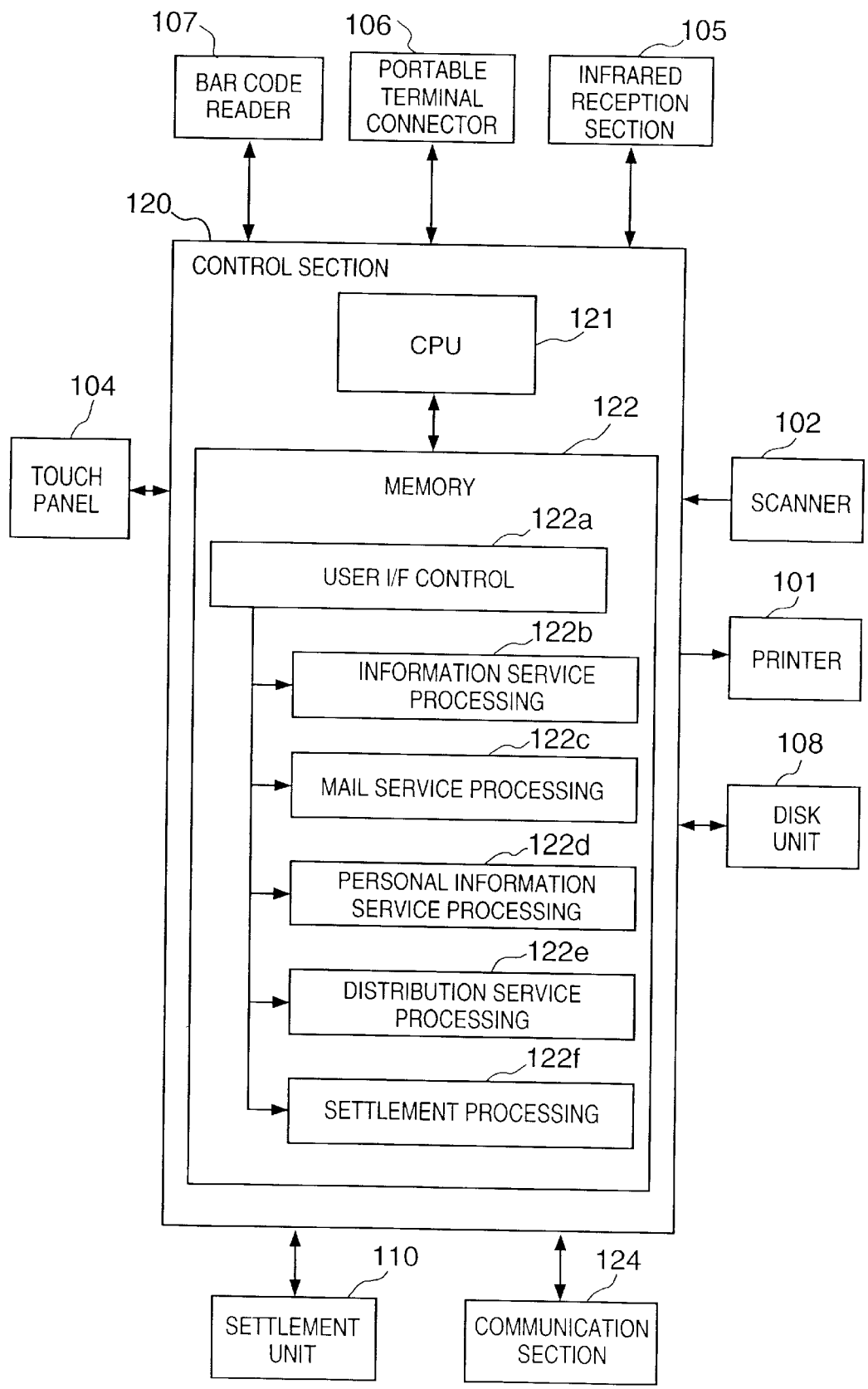
FIG. 3 is a block diagram showing the control arrangement of the P service terminal 100.

FIG. 3 is a block diagram showing the control arrangement of the P service terminal 100. The same reference numerals as in FIG. 2 denote the same parts in FIG. 3. A communication section 124 is connected to the P service server 200 through, e.g., a telephone line to perform communication.

A control section 120 controls each construction described with reference to FIG. 2. In the control section 120, a CPU 121 realizes various control operations in the P service terminal 100 in accordance with control programs stored in a memory 122. User I/F control 122a controls execution of each of the following programs in accordance with a user's operation instruction input through the touch panel 104. Information service processing 122b, mail service processing 122c, personal information service processing 122d, and distribution service processing 122e realize the above-described various services, i.e., information service, mail service, personal information service, and distribution service, respectively. Settlement processing 122f realizes settlement processing using the settlement unit 110.

<Arrangement of Portable Terminal>

Figure 4:
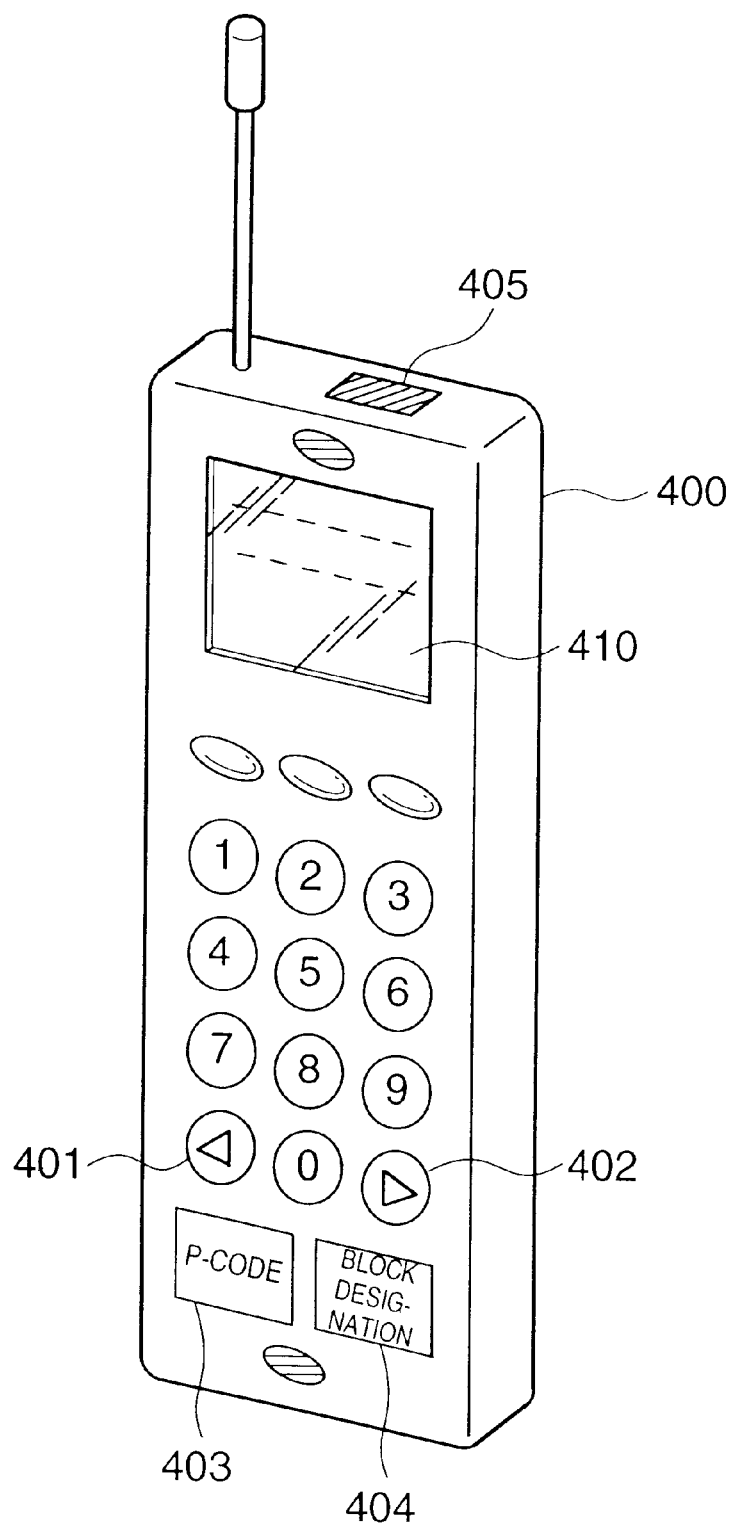
FIG. 4 is a view showing the schematic appearance of a portable terminal 400 capable of transmitting a P-code to the P service terminal.

FIG. 4 is a view showing the schematic appearance of the portable terminal 400 capable of transmitting a P-code to the P service terminal 100. Like a general portable telephone, the portable terminal 400 has a liquid crystal display 410 and dial buttons and functions as a portable telephone. The portable terminal 400 can receive mail and displays its contents on the liquid crystal display 410. The cursor in the liquid crystal display can be moved using a left cursor 401 and right cursor 402 and can select a desired block in mail in cooperation with a block designation key 404. When a P-code key 403 is pressed while a certain block in mail is kept selected, data in the selected block is stored in the internal memory as a P-code. Instead, the P-code may be automatically searched for, extracted, and stored in the memory by pressing the P-code key 403 in a mail displayed state. Details of these operations will be described later with reference to FIGS. 108 to 111.

An infrared communication section 405 outputs a P-code stored in the internal memory by infrared rays. The infrared rays output from the infrared communication section 405 are received by the infrared communication section 105 of the P service terminal 100 and recognized as a P-code. The portable terminal 400 also has a communication connector on its bottom surface so as to exchange telephone number information between the terminal and a personal computer.

Figure 5:
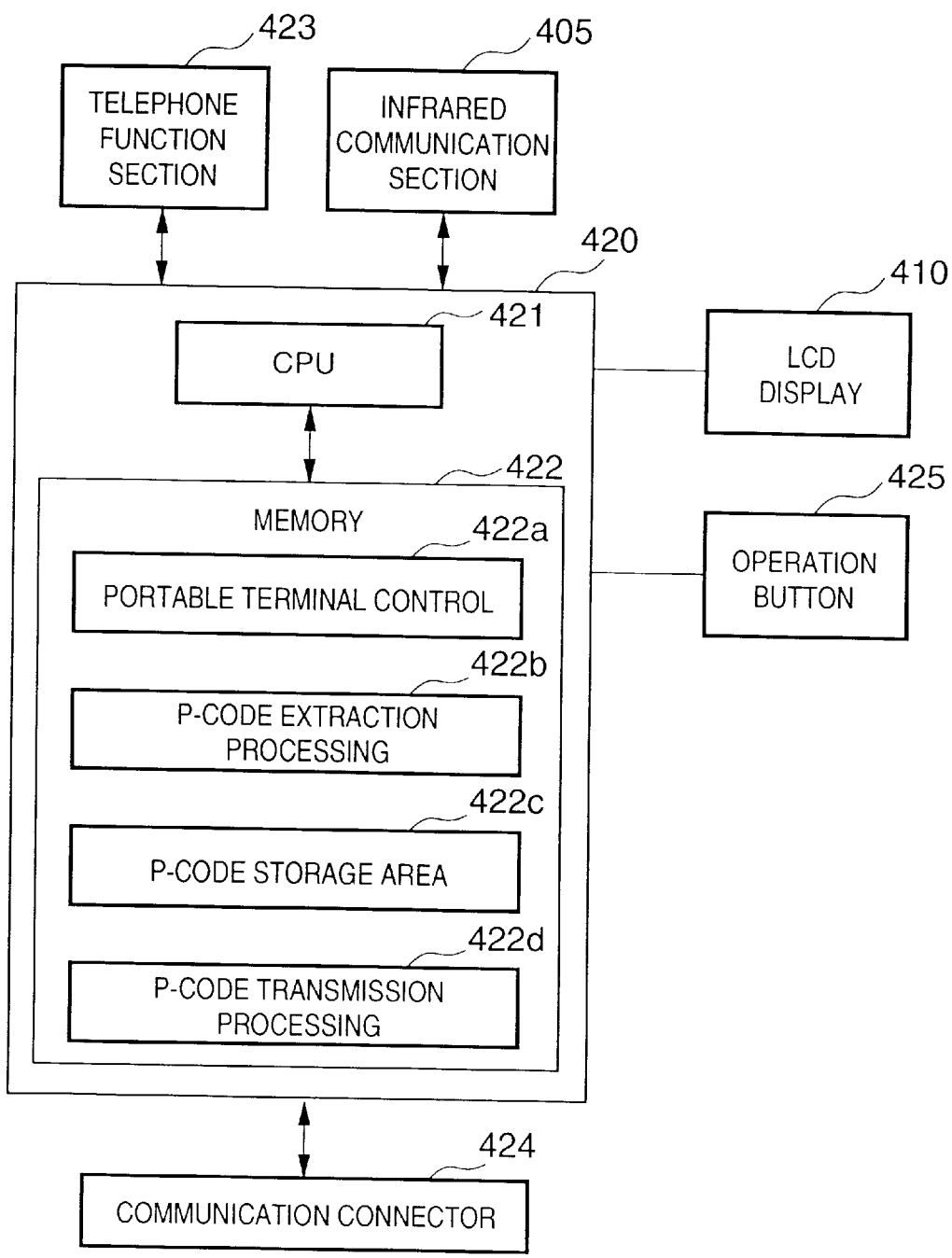
FIG. 5 is a block diagram for explaining the control arrangement of the portable terminal 400.

FIG. 5 is a block diagram for explaining the control arrangement of the portable terminal 400. Referring to FIG. 5, a telephone function section 423 has functions necessary for communication processing as a portable telephone, including a loudspeaker, microphone, and radio communication functions. A communication connector 424 is generally used to connect the portable terminal to a personal computer and upload or download a telephone number or the like. In this embodiment, when the communication connector 424 is connected to the portable terminal connector 106 of the P service terminal 100, a P-code can be transferred to the P service terminal 100. A button group 425 corresponds to the group of various operation buttons described with reference to FIG. 4 (including the dial button group).

A control section 420 realizes control of the constructions described with reference to FIG. 4 or various control operations in the portable terminal 400 in accordance with control programs stored in a memory 422. Of the programs stored in the memory 422, portable terminal control 422a is a program unit for realizing a function as a normal portable telephone. P-code extraction processing 422b is a program unit for processing of extracting a P-code from received mail and storing the P-code in a P-code storage area 422c. As described above, to extract a P-code, data in a manually selected block is extracted as a P-code, or a P-code is automatically identified and extracted from mail data. P-code transmission processing 422d is a program unit for transmitting a P-code stored in the P-code storage area 422c to the P service terminal through the infrared communication section 405 or communication connector 424.

<Arrangement of P Service Server>

Figure 6:
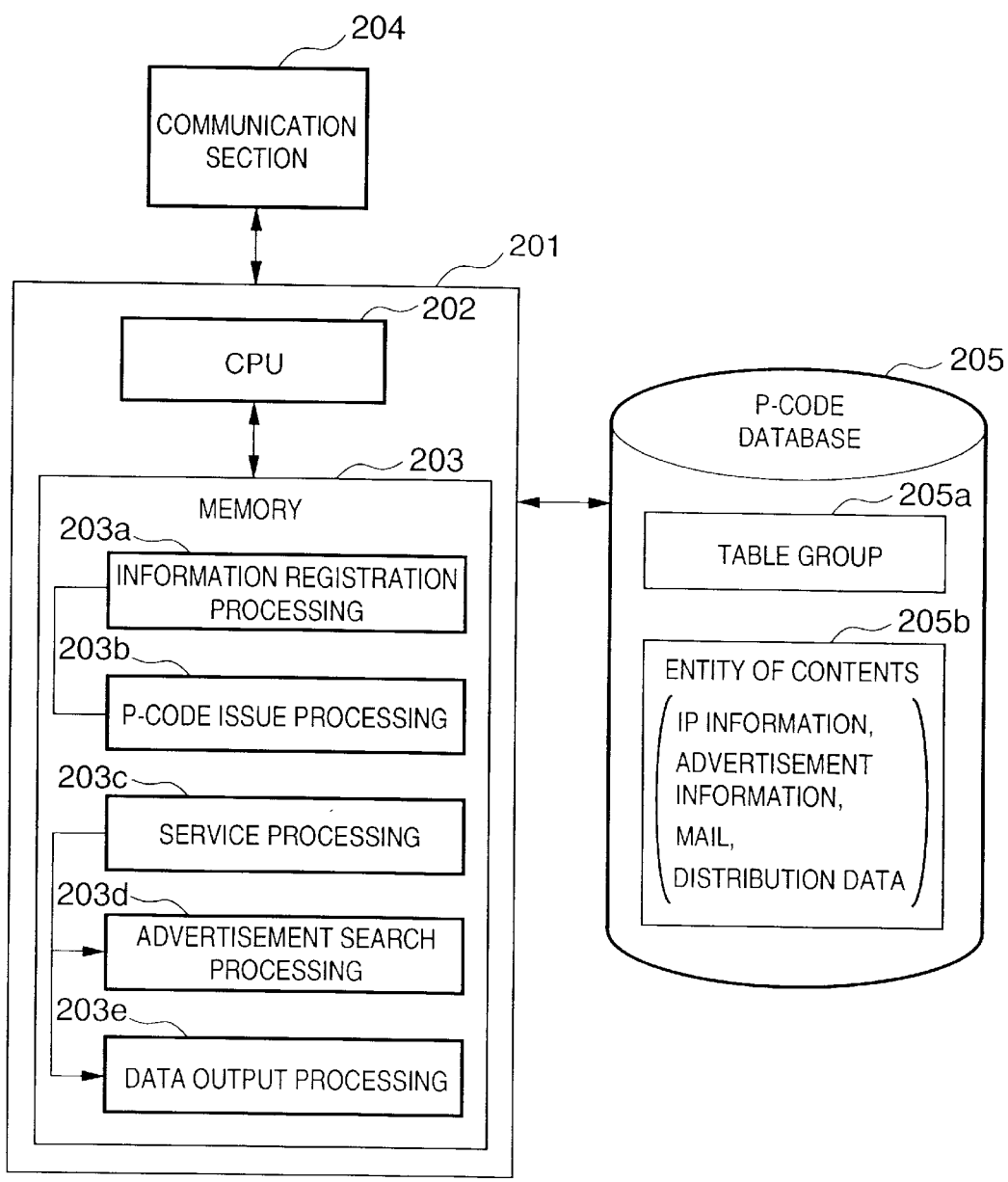
FIG. 6 is a block diagram showing the schematic arrangement of a P service server 200.

The P service server 200 will be described next. FIG. 6 is a block diagram showing the schematic arrangement of the P service server 200. A control section 201 has a CPU 202 and memory 203. The CPU 202 realizes various services in the P service server 200 in accordance with control programs stored in the memory 203. The memory 203 stores the control programs to be executed by the CPU 202. Information registration processing 203a is a program module for registering, e.g., IP information, advertisement information, user information (personal information), the distribution data. P-code issue the process 203b is a program module for assigning a P-code for specifying each registered information. Service processing 203c acquires IP information, advertisement information, mail data, or distribution data or registers distribution data in accordance with a P-code transmitted from the P service terminal 100. Advertisement search processing 203d searches for advertisement information to be attached to a print output in the P service terminal. By attaching advertisement information, the information output charge is canceled by advertisement charges to reduce the cost for the user to bear in outputting information (printing). Data output processing 203e attaches advertisement information obtained by advertisement search processing to information obtained on the basis of a P-code input from the P service terminal 100, lays out the pieces of information on a printing paper sheet, and generates and outputs print data.

A communication section 204 is connected to the P service terminal through a line or to each IP server 300 through a Web.

A P-code database 205 stores a table group 205a associated with P-codes and entity 205b of contents. The table group 205a includes an IP information registration table (FIG. 7), advertisement information table (FIG. 8), user information table (FIG. 9), mail service P-code table (FIG. 10), distribution service P-code table (FIG. 11), personal information service P-code table (FIG. 12), personal information table (FIG. 13), owner information table (FIG. 14), and terminal information table (FIG. 15).

FIG. 7 is a view showing a data structure example of the IP information registration table. An IP information registration table 220 is generated and recorded when IP information is registered. In the IP information registration table 220, an identification section, basic properties, and entity information are registered in correspondence with an assigned P-code. The identification section stores information representing the structure of the P-code (whether a subcode is present, and when the P-code is linked to another P-code, information representing the linked P-code). For a P-code having subcodes, a plurality of types of P-codes with subcodes can be registered for the P-code. As shown in FIG. 11, each subcode table has the same identification section, basic properties, and entity information as those of the IP information registration table. Subcode tables are prepared in units of P-codes having subcodes, i.e., in numbers corresponding to the number of P-codes having subcodes, and stored. The basic properties store information representing the owner of the IP information and article insertion condition. The basic properties include a "keyword list" and "keyword weight list" which are used by the advertisement search processing 203d (details will be described later). The entity information specifies the entity data of the IP information and includes the path and file name of an entity file.

In the P service system of this embodiment, the IP server 300 can issue a P-code within an allowable range. Hence, IP information is registered by the P service server 200 or IP server 300. A server which has registered IP information holds the contents and IP information registration table. That is, the entity of IP information and IP information registration table are present in the P service server 200 or IP server 300.

FIG. 8 is a view showing a data structure example of the advertisement information table. The advertisement information table is generated and recorded when an advertiser registers advertisement information. The advertisement properties, link, and entity file information of the advertisement information are stored in correspondence with an assigned P-code. The advertisement properties store information representing the owner of the advertisement information and insertion conditions of the advertisement information. The "link information to IP information" of the advertisement properties stores a target keyword list and target keyword weight list used in the advertisement search processing 203d.

The "link" stores the P-code of advertisement information to be linked. In the "entity file information", the path name and file name for specifying the file of the advertisement information are registered. The entity of the advertisement information can be present in either the P service server or IP service server. However, the advertisement information table is always stored in the P-code database 205 of the P service server 200. When the entity of advertisement information is present in the IP service server, information for specifying the IP service server is included in the entity file information of the advertisement information table (in this embodiment, the IP server is specified by the P-code, and this will be described later).

FIG. 9 is a view showing a data structure example of a user information table. The user information table is generated and recorded when the user registers himself/herself as a member of the P service system and includes a user profile, personal information, mail service information, distribution service information, and personal information service information. In the user profile is information representing the address and objects of interest of the user. The "personal information table" in the user profile stores pointers to the personal information table in which the personal secret matters including the address, name, telephone number, and credit card number of the user are registered, as shown in FIG. 13. In the mail service information, distribution service information, and personal information service information, information necessary for the mail print service, distribution service, and personal information service are registered, respectively.

FIG. 10 is a view showing a data structure example of a P-code table for the mail service. As shown in FIG. 10, in correspondence with the P-code for the mail service, a "mail properties" representing the subject (title) and sender of mail and entity file information representing the file of mail data are registered. Referring to FIG. 10, the P-code has a parent code section "telephone number" and attached section (suffix (also to be spelled as "surfix")) "# number". The subcode herein means the "number" section in the attached section.

FIG. 11 is a view showing a data structure example of a P-code table for the distribution service. As shown in FIG. 11, in correspondence with the P-code for the distribution service, the "distribution information properties" representing the title, valid dates of the distribution information, and the password given to the distribution information, and entity file information representing the distribution information file are registered. Referring to FIG. 11, the P-code has a parent code section "telephone number" and attached section (surfix) "- number". The subcode herein means the "number" section in the attached section.

FIG. 12 is a view showing a data structure example of a P-code table for the personal information service. As shown in FIG. 12, in correspondence with the P-code for the personal information service, the "personal information properties" representing the title and final print date and "registered P-code information" representing the list of registered P-codes are registered. The P-code list is a P-code group which is set and registered by the user in advance. Referring to FIG. 12, the P-code has a parent code section "telephone number" and attached section (surfix) "## number". The subcode herein means the "number" section in the attached section.

FIG. 13 is a view showing a data structure example of a personal information table. The personal information table is contained in the user information table, as described above with reference to FIG. 9.

FIG. 14 is a view showing a data structure example of an owner information table. This table is linked to the IP information registration table shown in FIG. 7, and is the "owner ID" in the advertisement information table shown in FIG. 8. As shown in FIG. 14, information associated with the owner (information provider or advertiser) is registered.

FIG. 15 is a view showing a data structure example of a terminal information table. The terminal information table is held for each P service terminal.

<Arrangement of IP Server>

Figure 16:
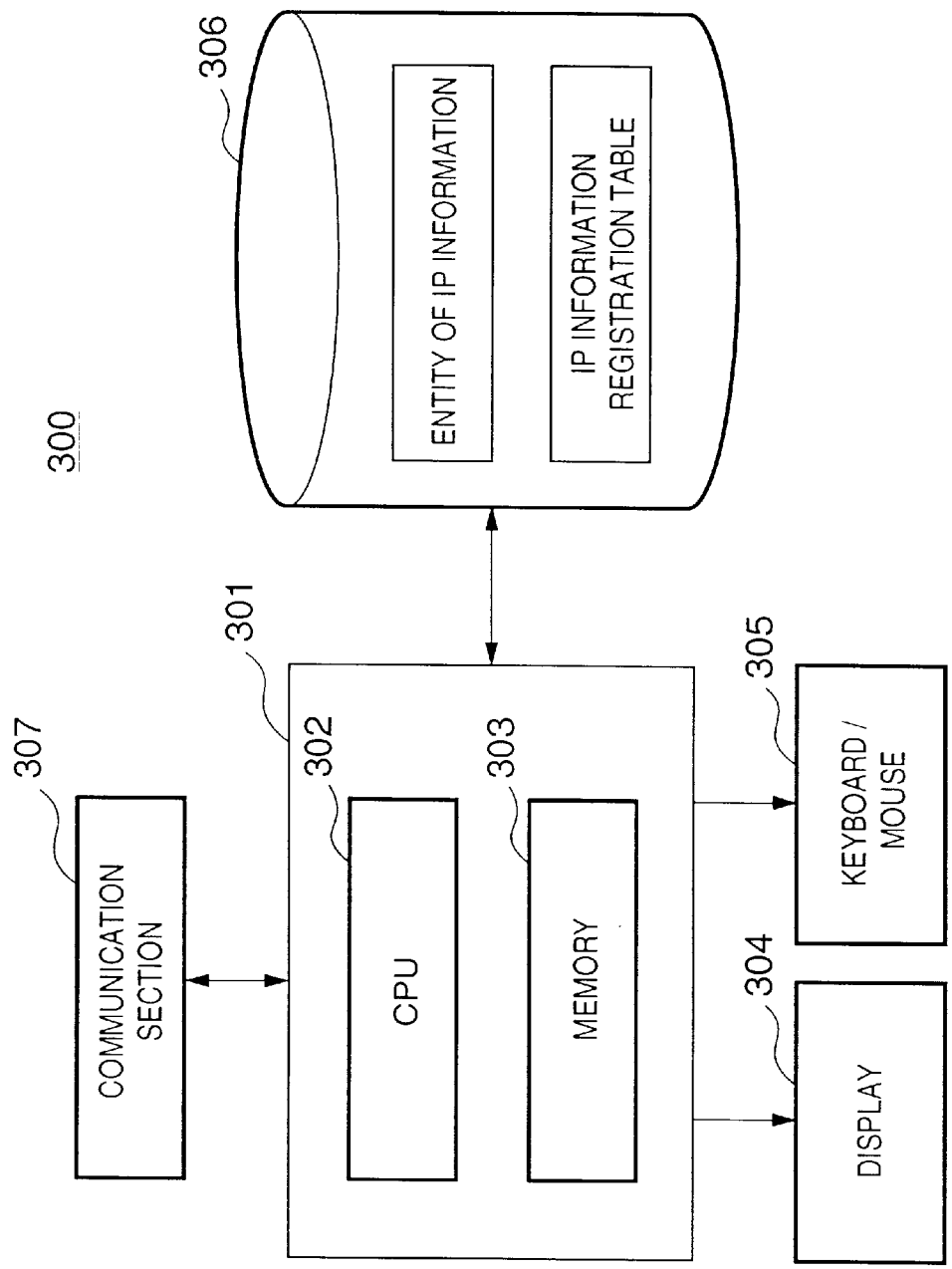
FIG. 16 is a block diagram showing the typical arrangement of an IP server 300.

FIG. 16 is a block diagram showing the typical arrangement of the IP server 300. Referring to FIG. 16, a control section 301 has a CPU 302 and memory 303 and executes various processing operations in the IP server 300. A display 304 displays various data under the control of the control section 301. An input section 305 comprises a pointing device such as a keyboard or mouse. A data storage section 306 stores the "entity of IP information" registered in the P service system and "IP information registration table" associated with the IP information (the IP information registration table is the same as that shown in FIG. 7). A communication section 307 is connected to the P service server 200 through a line or the like.

The IP server 300 acquires an available P-code value from the P service server 200 and issues a P-code when IP information is registered from the user terminal. At this time, the entity of IP information and the IP information registration table are held by the data storage section 306. When an information request from the P service server 200 is received, the entity (contents) of the IP information is extracted in accordance with the designated P-code and is transmitted to the P service server 200.

<P-Code>

The P-code used to specify information or the like in this embodiment will be described next.

FIG. 17 is a view for explaining the data structure of the P-code used in the P service system according to this embodiment. As shown in FIG. 17, the P-code can be divided into three sections: a "classification section", "number section", and "attached section".

The classification section is a 16-bit code containing a P-code type bit representing that the input P-code number is an IP P-code (information P-Code) or personal P-code (personal user P-Code), version information, and country number. When a P-code number is input to the P service terminal 100, the contents of this classification section are automatically attached by the terminal.

First, it is determined whether the input P-code is a personal P-code or IP P-code to set the P-code type bit. In this embodiment, a telephone number is used as the number section of the personal P-code. If the number input to the P service terminal 100 has 11 consecutive digits or less, it is determined that a telephone number is input, i.e., a personal P-code is input, and the P-code type bit is set at "1". On the other hand, if a number sequence hyphened in units of four digits (in units of four numbers) is input as a P-code number, it is identified that a nontelephone number is input, and the P-code type bit is set at "0". Subsequently, version information is set, and a country number representing the country where the P service terminal is installed is set (when a country is designated from the P service terminal, the number of the designated country is set).

The number section has a number (to be referred to as a P-code number hereinafter) directly input by the user. This is a number inserted to a newspaper, magazine, or homepage by the information provider. Note that a telephone number is used as a personal P-code number.

When the above-described P-code type bit is 1, i.e., a personal P-code, 40 bits are allocated to the number section, as shown in FIG. 17, in which a numerical value represented by the telephone number is input. The remaining eight bits are used as an attached section.

On the other hand, when the flag bit is 0, i.e., an IP P-code, 39 bits are allocated to the number section, as shown in FIG. 17, and the remaining nine bits are used as an attached section. Of the 39 bits of the number section, the first bit represents a P service server identification bit (1 bit), and the subsequent three bits represent a class category. Since the P service server identification bit is 0 for a site except the P service server, only three bits representing a class category are contained in the first four bits, and the first digit of the P-code number represents a class category (numerical values 1 to 5). The class category has the same meaning as that of an IP address. As shown in FIG. 17, numerical values 1 to 5 indicated by the three bits represent five classes from minimum to maximum scales. For example, for class 1 (minimum scale), 24 bits are used as a site identification number (to also be referred to as an external code hereinafter), and the remaining 11 bits construct an ID code (to also be referred to as an internal code hereinafter) freely usable in the site. When the class category is determined in accordance with the scale of an IP server, the number of P-codes assigned to the IP server is determined depending on the scale of the IP server.

The attached section indicates the identification number of a subcategory of the contents identified by the above classification section+number section. For an information P-code, for example, "professional baseball game result" has categories "result of today", "result of yesterday ", "result of day before yesterday", . . . , and "tip on horse racing" has categories "site" and "race". For a personal P-code, the attached section is used for a mail box number or personal information number.

Especially, in this embodiment, a plurality of types of "attached sections" can be connected to one number section as suffixes. When grouping is designated for P-codes, the P-code can be linked to other IP information in units of suffixes. When the code of the number section is input as a P-code, information having the maximum surfix value is selected and presented as IP information. This can cope with information such as "results of professional baseball games of yesterday", which requires frequent update and addition of information. Assume that a new result of professional baseball game is generated. Next day, the game result of yesterday is grouped in correspondence with a P-code with an incremented surfix, thereby linking the P-code with the incremented surfix to the IP information of the game result. Hence, when a P-code number is designated to obtain the "result of professional baseball game of yesterday", information having the maximum surfix attached to the P-code number is extracted and presented to the user.

When a P-code has an attached section, it may be directly input by the user. However, instead of directly inputting the number, the P-code with an attached section can be input by selecting it from a menu. More specifically, when the user inputs only the P-code number of a P-code having an attached section, the value of the corresponding P-code (number section+attached section) and its properties (title and the like) are transmitted from the P service server to the P service terminal 100. The P service terminal 100 displays a selection list using the information on the touch panel 104 as a menu. When the user selects a desired content from the selection list, a corresponding P-code (number section+ attached section) is transmitted to the P service server, and the selected content is sent to the P service terminal. In this embodiment, an example will be described, in which a personal P-code uses, as a number section, a numerical value input by the user as a "telephone number", and as an attached section, a code formed from a sequence of a "predetermined symbol" and "subcode", and "#", "-", or "##" is used as the "predetermined symbol". In this case, when the personal P-code is input, the "predetermined symbol" registered in advance is detected from the P-code, and a service predetermined in accordance with the type of the detected "predetermined symbol" is executed (a mail service for "#", distribution service for "-", and personal information service for "##").

FIG. 18 shows the structure of the above P-code.

When a P-code is stored in the memory of a portable terminal, all constituent elements ("classification section", "number section", and "attached section") of the P-code are registered in the memory and input to the P service terminal. This enables omission of an operation such as menu selection, so load of the user can be reduced.

<Outline of Operation of System>

The outline of processing by the P service server of this embodiment will be described next with reference to FIGS. 19 and 20.

In steps S101 to S109, processing to be executed is selected on the basis of IP information, command, and P-code input from the P service terminal 100, IP server 300, or user terminal 700. For example, when input data is a user registration request, the flow advances from step S102 to step S111 to issue a personal P-code and perform user registration processing by the information registration processing 203a and P-code issue processing 203b. By this user registration processing, the user information table shown in FIG. 9 and personal information table shown in FIG. 13 are generated and registered. When an IP information registration request is input, the flow advances from step S103 to step S112 to issue an IP P-code from P-codes assigned to the IP server which is requested to register the IP information.

In step S113, IP information registration processing is performed. By this IP information registration processing, the IP information registration table shown in FIG. 7 is generated and registered. When an advertisement information registration request is input, the flow advances from step S104 to step S114 to issue a P-code. In step S115, advertisement information registration processing is executed. By this advertisement information registration processing, the advertisement information table as shown in FIG. 8 is generated and registered in the P service server 200.

When a P-code is input from the P service terminal 100, processing requested by the P-code is determined from processing operations in steps S105 to S109. When the P-code is an IP P-code (the P-code type bit is 0), it is determined that the information service is requested. The flow advances from step S105 to step S116 to acquire the entity and properties of IP information from the P-code and generate preview data. When the P-code is a personal P-code (the P-code type bit is 1) and is registered in the mail service information of the user information table, it is requested that the mail service is requested, and the flow advances from step S106 to step S117. In step S117, the entity and properties of mail data are acquired from the mail P-code table on the basis of the P-code.

When the input P-code is a personal P-code and is registered in the personal information service information of the user information table (FIG. 9), it is determined that the personal information service is requested, and the flow advances from step S107 to step S118. In step S118, the list of IP P-codes is acquired by looking up the personal information service P-code table (FIG. 12), and IP information and their properties of all P-codes registered in this list are acquired.

When the input P-code is a personal P-code and is registered in the distribution service information of the user information table, it is determined that data extraction in the distribution service is requested, and the flow advances from step S108 to step S119. In step S119, a password registered in correspondence with the data is requested. It is determined by looking up the distribution service P-code table whether an authentic password is received, and the entity and properties of distribution data corresponding to the P-code are acquired.

When it is determined that distribution data registration in the distribution service is requested, the flow advances from step S109 to step S123 to execute distribution data registration processing including P-code issue processing and processing of registering a password corresponding to the data and notify the user of the data registration and assigned P-code. In this case, a P-code in a form of a personal P-code (telephone number) having a subcode (surfix) is issued.

When necessary information is acquired in steps S116 to S119, layout of acquired information to be printed on a paper sheet is determined in step S120. In step S121, advertisement information to be laid out in a margin on the paper sheet is acquired (advertisement information search will be described later). In step S122, the properties acquired in steps S116 to S119 and preview data of the image of each page obtained in steps S120 and S121 are transmitted it to the P service terminal. When a print instruction is received from the P service terminal 100, print data is generated and transmitted to the P service terminal 100. The printer 101 prints information on the basis of the print data.

<User Registration>

When the user wants to receive the mail service or personal information service in the P service system, user registration in the P service server 200 is required in advance.

In user registration, at least matters for specifying the user must be registered. Arbitrary matters for preferable reception of each service of the P service system can also be registered. Additionally, already registered matters can be changed.

The procedure of user registration will be described by exemplifying a case wherein user registration is done from the user terminal 700 of the user through the Web.

When the user accesses user registration of the P service server 200 from the user terminal 700, the P service server 200 executes user registration processing in step S111.

Figure 21:
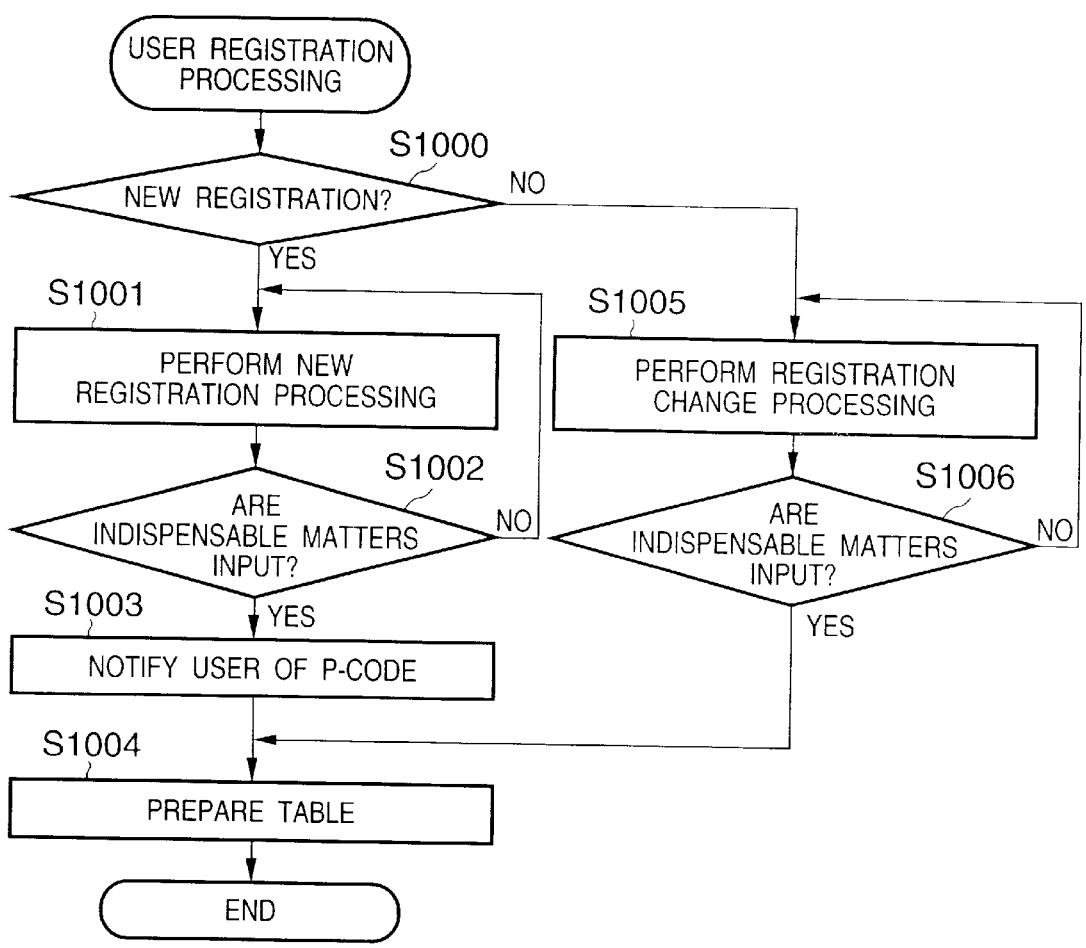
FIG. 21 is a flow chart of user registration processing.

FIG. 21 is a flow chart of user registration processing.

In this user registration processing, the P service server 200 displays various windows for user registration on the display of the user terminal 700 and causes the user to sequentially input matters to be registered by so-called GUI.

In step S1000, the P service server 200 determines whether the user has selected new user registration or a change in user registration that has been already performed. For the former processing, the flow advances to step S1001. For the latter processing, the flow advances to step S1005.

In step S1001, new registration processing is performed. In this new registration processing, a dialog box shown in FIG. 22 is displayed first on the display of the user terminal 700.

This dialog box has a "name/address" button 1000, "password" button 1010, "place of employment" button 1020, "credit card" button 1030, "service" button 1040, "personal information" button 1050, "personal information 2" button 1060, "desired information" button 1070, "printing paper" button 1080, and "favorite information registration" button 1090. The user can register matters corresponding to the respective items by clicking the buttons.

When the "name/address" button 1000 is clicked in the dialog box shown in FIG. 22, a dialog box shown in FIG. 23 is displayed. The user must input, from the user terminal 700, at least the name, address, and one of the telephone number and portable telephone number as indispensable input matters. At the end of the input, the "OK" button is clicked, the input contents are stored, and the dialog box shown in FIG. 22 is displayed again. When the "cancel" button is clicked, the dialog box shown in FIG. 22 is displayed again without storing the input contents. This also applies to processing to be described below.

Figure 24:
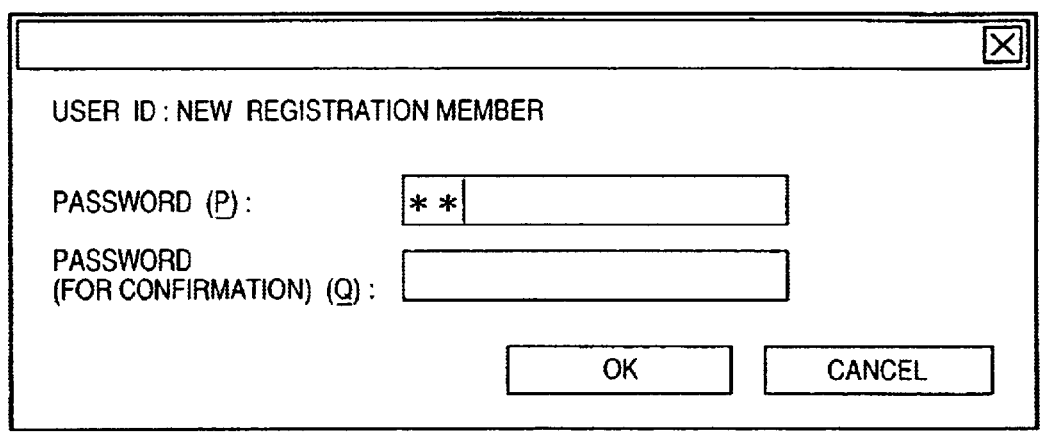
FIG. 24 is a dialog box corresponding to a "password" button 1010.

When the "password" button 1010 is clicked in the dialog box shown in FIG. 22, a dialog box shown in FIG. 24 is displayed. The user inputs a desired password to the "password" column. The password is registered to prevent a third party from using the P service system under disguised ownership. Hence, the password is an indispensable input matter in principle.

Since the input password is displayed by "*", the user is caused to input the password again to the "password (confirmation)" column to prevent any input error.

When the "place of employment" button 1020 is clicked in the dialog box shown in FIG. 22, a dialog box shown in FIG. 25 is displayed. The user can arbitrarily input matters associated with the place of employment.

When the "credit card" button 1030 is clicked in the dialog box shown in FIG. 22, a dialog box shown in FIG. 26 is displayed. When the user will pay a charge for the P service system using a credit card, he/she designates a credit card of his/her own in this dialog box. If no credit card is designated, it is regarded that the user will pay in cash.

Figure 27:
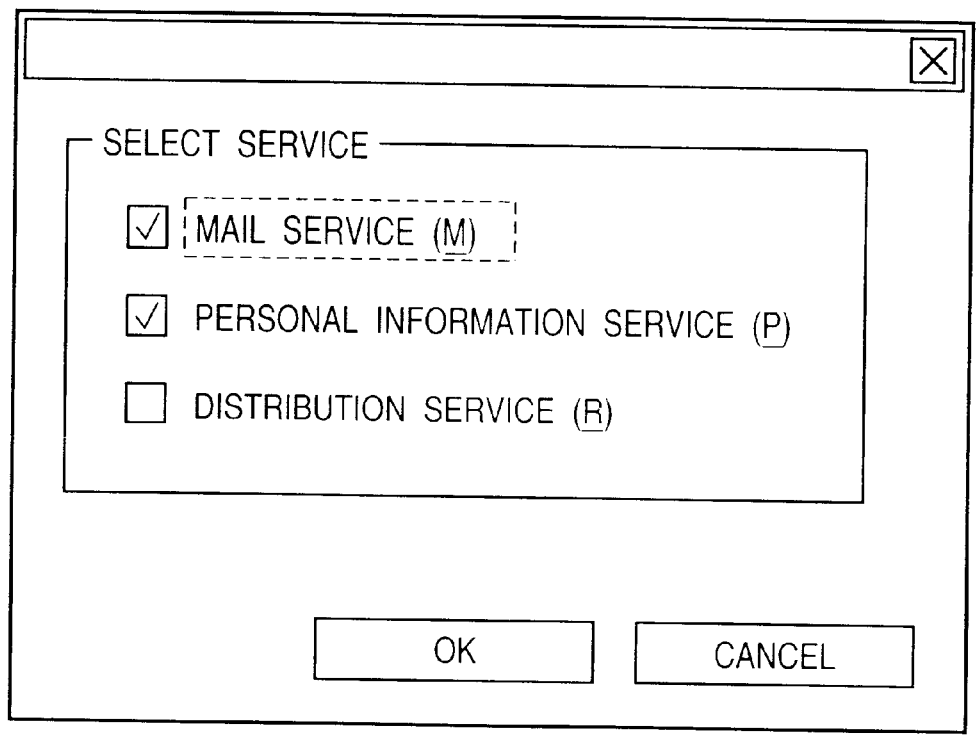
FIG. 27 is a dialog box corresponding to a "service" button 1040.

When the "service" button 1040 is clicked in the dialog box shown in FIG. 22, a dialog box shown in FIG. 27 is displayed. From the mail service, personal information service, and distribution service provided by the P service system, the user selects services desired based on the P-code assigned by this user registration, and checks check boxes corresponding to the services. A service without a check mark is not available on the basis of the P-code assigned by this user registration.

When the "personal information" button 1050 is clicked in the dialog box shown in FIG. 22, a dialog box shown in FIG. 28 is displayed. The user can arbitrarily input general personal information. The information input herein is mainly used for advertisement information search processing (to be described later in detail).

When the "personal information 2" button 1060 is clicked in the dialog box shown in FIG. 22, a dialog box shown in FIG. 29 is displayed. The user can arbitrarily input specific personal information. The information input herein is also mainly used for advertisement information search processing (to be described later in detail).

Figure 30:
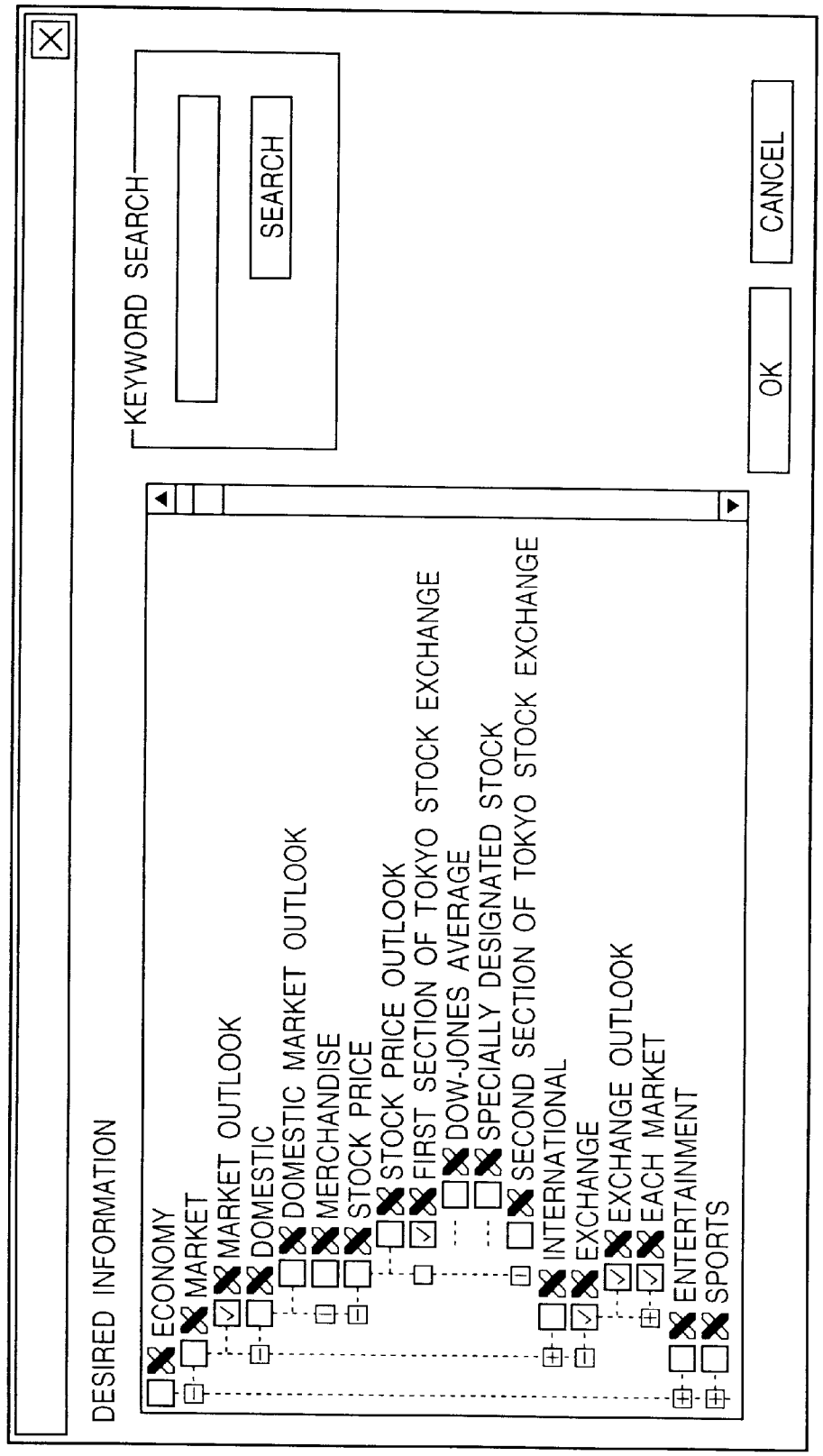
FIG. 30 is a dialog box corresponding to a "desired information" button 1070.

When the "desired information" button 1070 is clicked in the dialog box shown in FIG. 22, a dialog box shown in FIG. 30 is displayed. In this dialog box, items such as economy, entertainment, and sports are hierarchically listed and displayed. The user can check the check boxes of items of his/her interest. Each item can be quickly searched for by "keyword search".

The checked items are used to search for information which is to be arbitrarily provided to the user by the P service server 200 in each service of the P service system. For example, when the user receives the mail service, and an excess margin portion is present on the print, the P service server 200 can search for free IP information associated with the checked items, attach the information to the margin portion, and output it. The checked items can also be used for advertisement information search processing.

Figure 31:
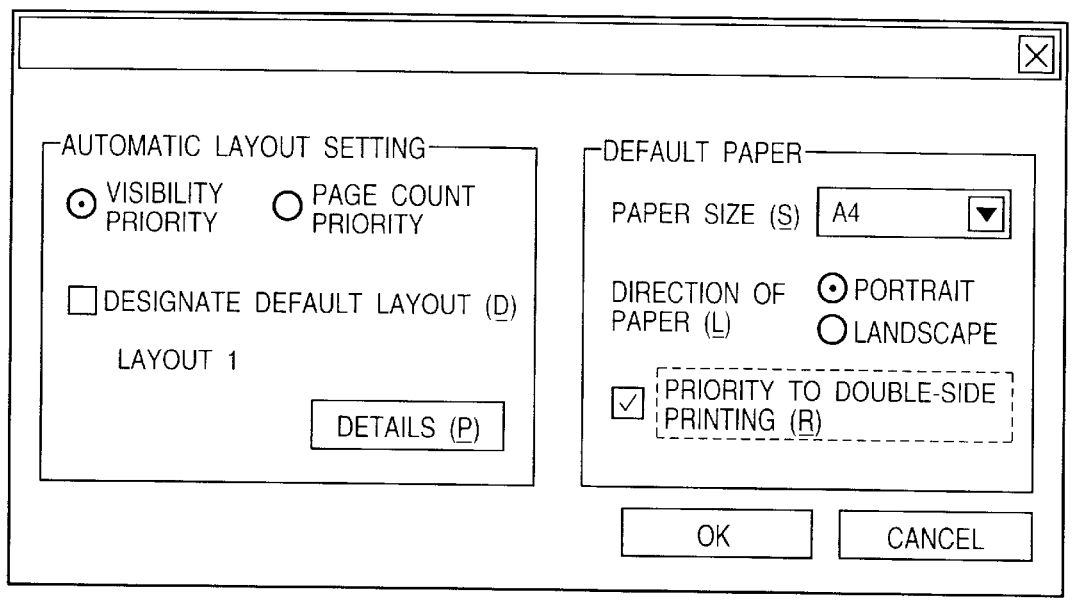
FIG. 31 is a dialog box corresponding to a "printing paper" button 1080.

When the "printing paper" button 1080 is clicked in the dialog box shown in FIG. 22, a dialog box shown in FIG. 31 is displayed. In receiving a print output from the P service terminal 100, the user can designate the output format. For example, when the "visibility priority" button in the dialog box shown in FIG. 31 is checked, priority is given to the layout of the print, and information obtained by the P service system is printed in a layout easy to see. When the "page count priority" check button is checked, priority is given to saving of page count, so the print cost is expected to be saved. When the "details" button is clicked, desired conditions can be selected and designated from a plurality of layout patterns, the amount of advertisement information, and font sizes, which are registered on the P service system.

When the "favorite information registration" button 1090 is clicked in the dialog box shown in FIG. 22, IP information to be subjected to the personal information service can be set. This setting is done by listing IP P-codes corresponding to an IP information group desired by the user. A plurality of pieces of favorite information can be registered. The dialog box displayed at this time is the same as that for registration of a frame of the personal information service for a later description of various services and therefore is not illustrated.

When the user clicks the "OK" button in the dialog box shown in FIG. 22, the P service server 200 determines that all inputs are complete. The flow advances to step S1002 to check whether all the above-described indispensable input matters are input. If YES in step S1002, the flow advances to step S1003. If NO in step S1002, a predetermined alarming message is displayed, and the flow returns to step S1001. When the user clicks the "cancel" button, processing is ended without registration.

In step S1003, the P service server 200 issues the personal P-code. Especially, one of the portable telephone number and telephone number input by the user in the dialog box shown in FIG. 23 is attached as a "number section", and then, the P-code is sent to the user terminal 700, thereby giving the P-code to the user. This issue processing will be described later in detail with reference to FIG. 70.

In step S1004, the information input by the above processing is stored in the user information table shown in FIG. 9 in correspondence with the new personal P-code given to the user in this user registration. After that, user registration processing is ended.

When a change in user registration already performed is selected in step S1000, the flow advances to step S1005.

Figure 32:
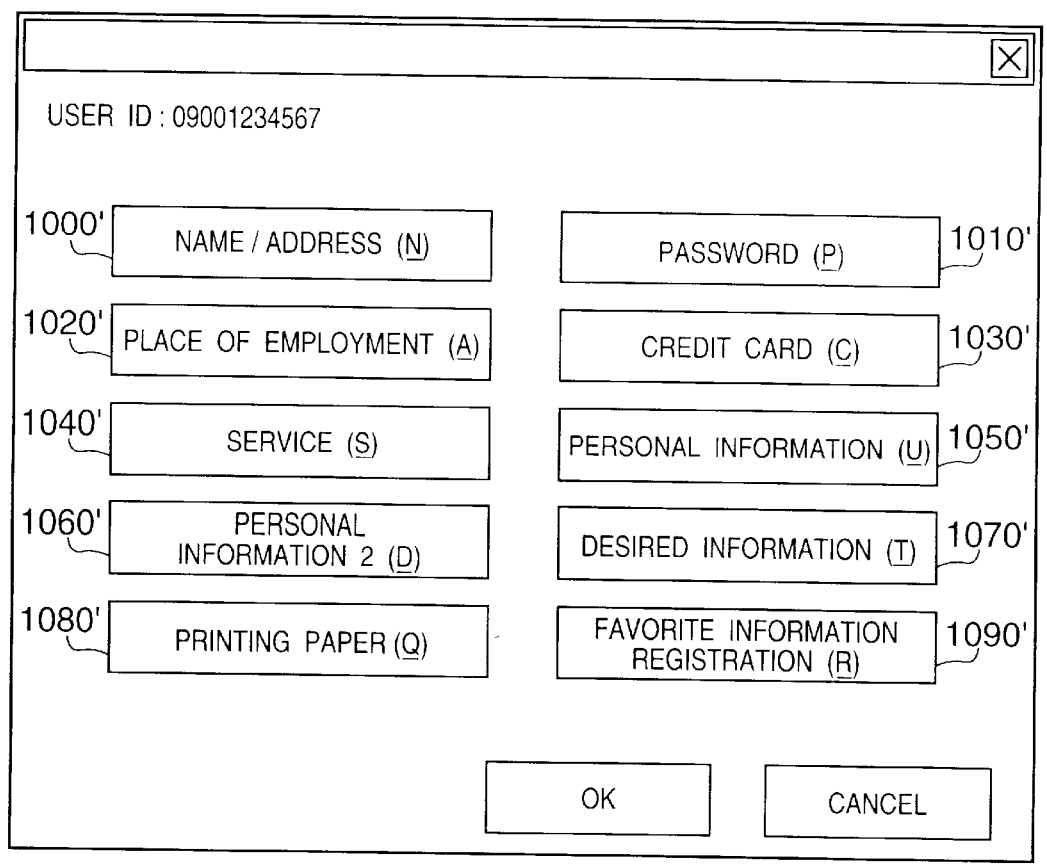
FIG. 32 is a dialog box for registration change processing.

In step S1005, registration change processing is performed. In this registration change processing, a dialog box shown in FIG. 32 is displayed on the display of the user terminal 700 first. The dialog box shown in FIG. 32 has the same structure as that of the dialog box shown in FIG. 22. Referring to FIG. 32, buttons corresponding to the buttons 1000 to 1090 of the dialog box shown in FIG. 22 are indicated by adding "'" to the same reference numerals as in FIG. 22.

When the user clicks the buttons 1000' to 1090', dialog boxes as shown in FIGS. 23 to 31 are displayed in correspondence with the buttons. In the displayed dialog box, matters input in the past user registration are displayed together.

Figure 33:
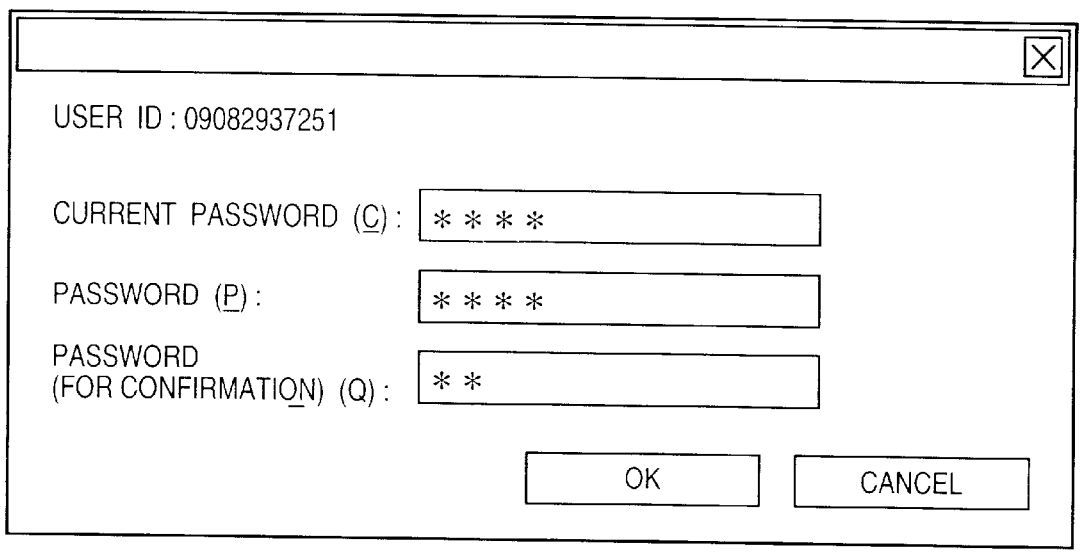
FIG. 33 is a dialog box for password change.

The user can change the displayed contents while looking at them. For example, when the "password" button 1010' in FIG. 32 is clicked, a dialog box shown in FIG. 33 is displayed. The user can input a new password to the "password" column to change the password. For confirmation, the new password is input to the "password (confirmation)" column again. After the input, the "OK" button is clicked to store the changed contents.

When the user clicks the "OK" button in the dialog box shown in FIG. 32, the P service server 200 determines that all changes are made, and the flow advances to step S1006 to check for confirmation whether the above-described indispensable input matters are erased by errors upon the change. If all the indispensable input matters have been input, the flow advances to step S1004. If matters are erased, a predetermined alarming message is displayed, and the flow returns to step S1005.

In step S1004, the P service server 200 updates the corresponding matters in the user information table in accordance with the changed contents.

All user registration processing operations are complete. In the above new registration processing, input items are sequentially selected from the menu shown in FIG. 22, and necessary matters are input. However, a so-called "wizard" form may be used to automatically sequentially display the input windows and cause the user to input necessary matters. However, to change the registered contents, the menu for selecting a desired matter as shown in FIG. 32 is preferable.

<IP Information Registration>

The information provider who provides IP information in the P service system must register contents of the IP information and the like in the P service server 200 or IP server 300.

To do this registration, the information provider accesses the P service server 200 or IP server 300 from a terminal (not shown) (to be referred to as an information provider terminal hereinafter) of the information provider through the Web or presents a storage medium such as a CD-ROM in which contents of IP information and the like are stored to the operator of the P service system.

The procedure of IP information registration will be described below by exemplifying a case wherein the information provider registers IP information in the P service server 200 through the Web.

Figure 19:
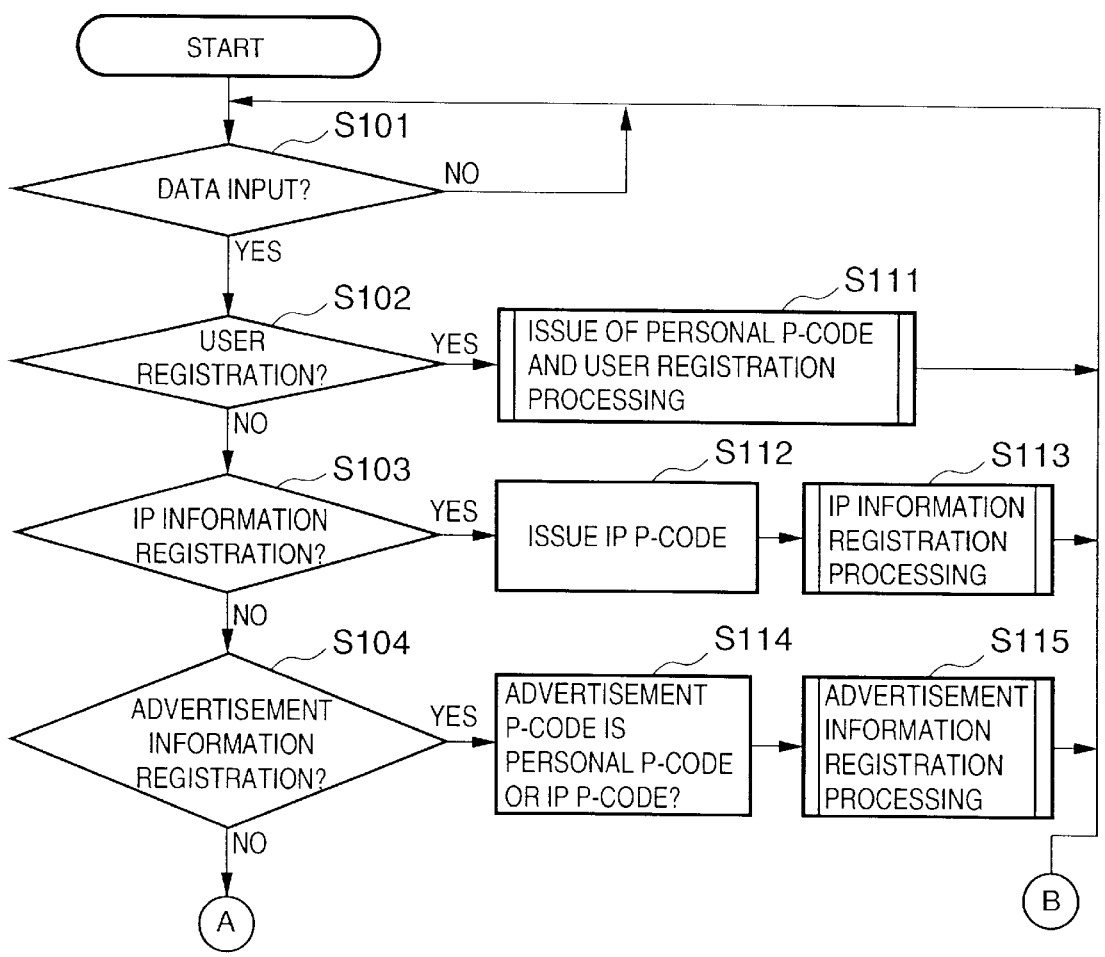
FIG. 19 is a flow chart for explaining the outline of processing by the P service server of this embodiment.
Figure 20:
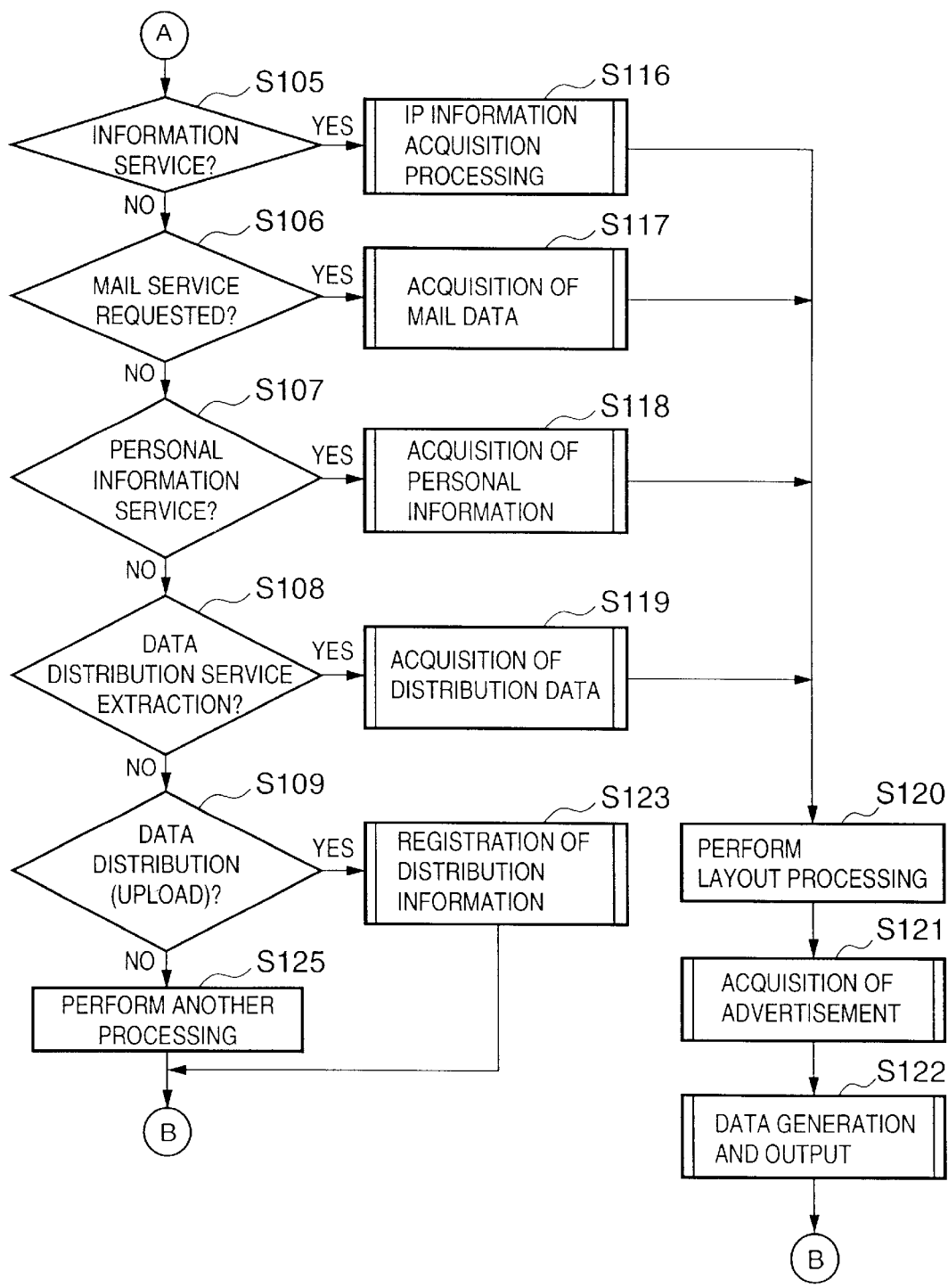
FIG. 20 is a flow chart for explaining the outline of processing by the P service server of this embodiment.

When the information provider accesses IP information registration in the P service server 200 from the information provider terminal, the P service server 200 executes processing in step S112 in FIG. 19 and internally issues an IP P-code for the information provider. After that, the flow advances to step S113 to execute IP information registration processing.

Figure 34:
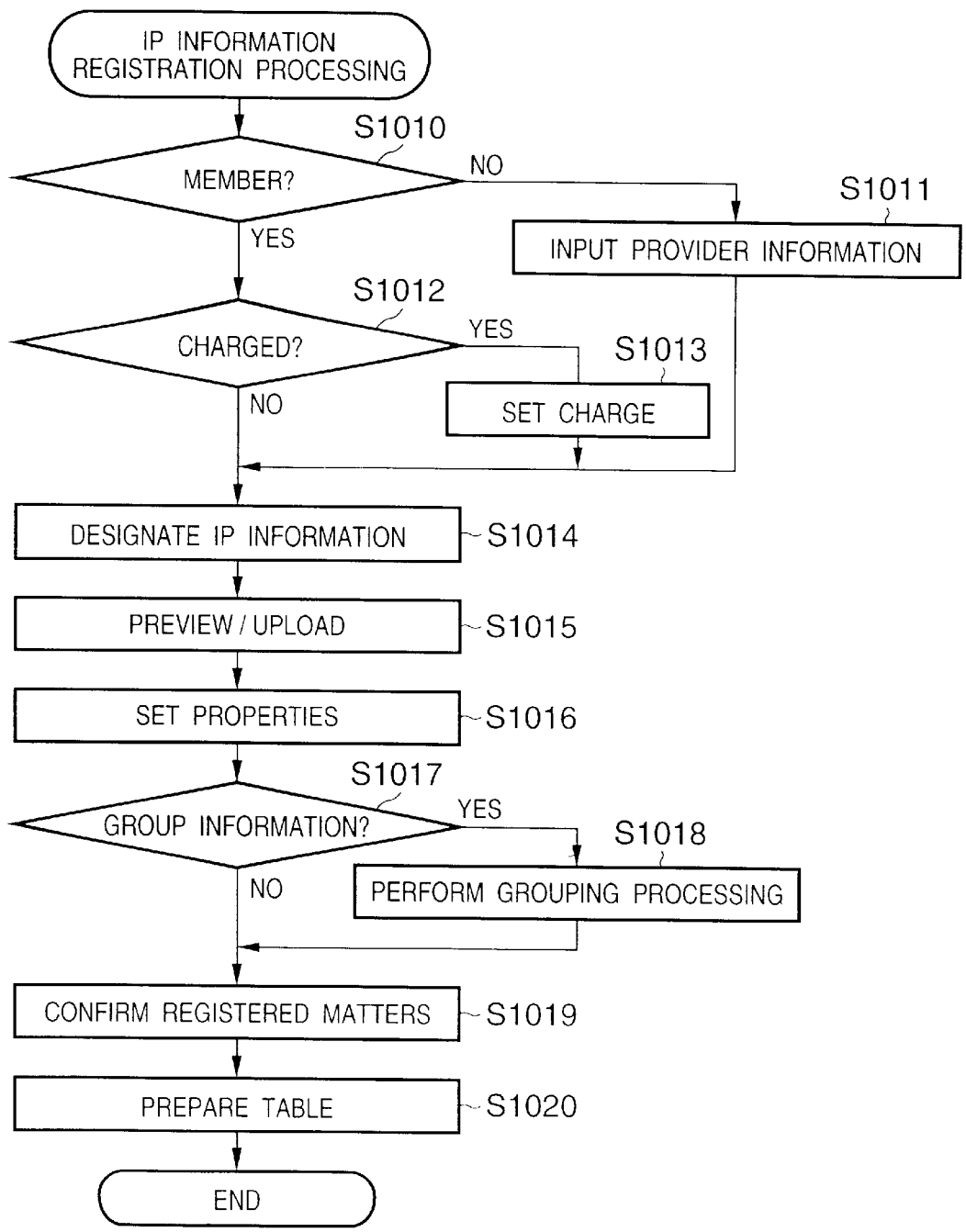
FIG. 34 is a flow chart of IP information registration processing.

FIG. 34 is a flow chart of IP information registration processing.

In this IP information registration processing, the P service server 200 displays windows for IP information registration on the display of the information provider terminal and causes the information provider to sequentially input matters to be registered by so-called GUI, as in the above-described user registration processing.

In step S1010, a dialog box shown in FIG. 35 is displayed. It is determined whether the information provider is a member of the P service system. A member means a person who has made an application to the P service system in advance as an information provider. A nonmember cannot provide pay IP information. A membership number and password are assigned in accordance with an application.

Figure 36:
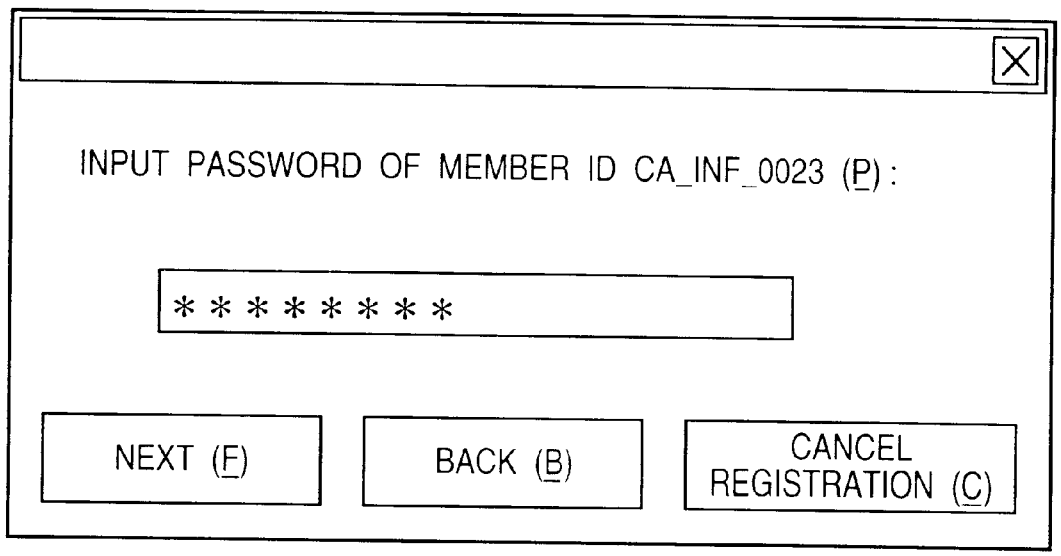
FIG. 36 is a dialog box for inputting member's password.

When the information provider is a member, he/she checks the radio button "Yes" in this dialog box and also inputs the membership number. When the information provider is a nonmember, he/she checks the radio button "No". When "next" is clicked, the flow advances to step S1011 for a nonmember. For a member, a dialog box shown in FIG. 36 is displayed to request to input a password. If the password input by the information provider is authentic, the flow advances to step S1012.

When "next" is clicked in each dialog box, input information is stored, and the flow advances to the next processing. When "back" is clicked, input information is stored, and the flow returns to immediately preceding processing. When "cancel" is clicked, the flow returns to the first dialog box without storing input information. This also applies to the following processing.

In step S1011, a dialog box shown in FIG. 37 is displayed to cause the information provider as a nonmember to input information for specifying the information provider, including the address, name, and telephone number. This process is required to prevent oversupply of inappropriate IP information. After the input, when "next" is clicked, the flow advances to step S1014. After the input, a dialog box shown in FIG. 38 may be displayed to recommend member registration such that the procedure of member registration can be executed on the Web.

In step S1012, a dialog box shown in FIG. 39 is displayed to confirm whether the information provider as a member will charge for IP information registered by this IP information registration. If the IP information is pay information, the information provider checks the check box "charge for printing" and inputs a desired charge (step S1013). If the IP information is free information, no check box is checked. In either case, when "next" is clicked, the flow advances to step S1014.

Figure 40:
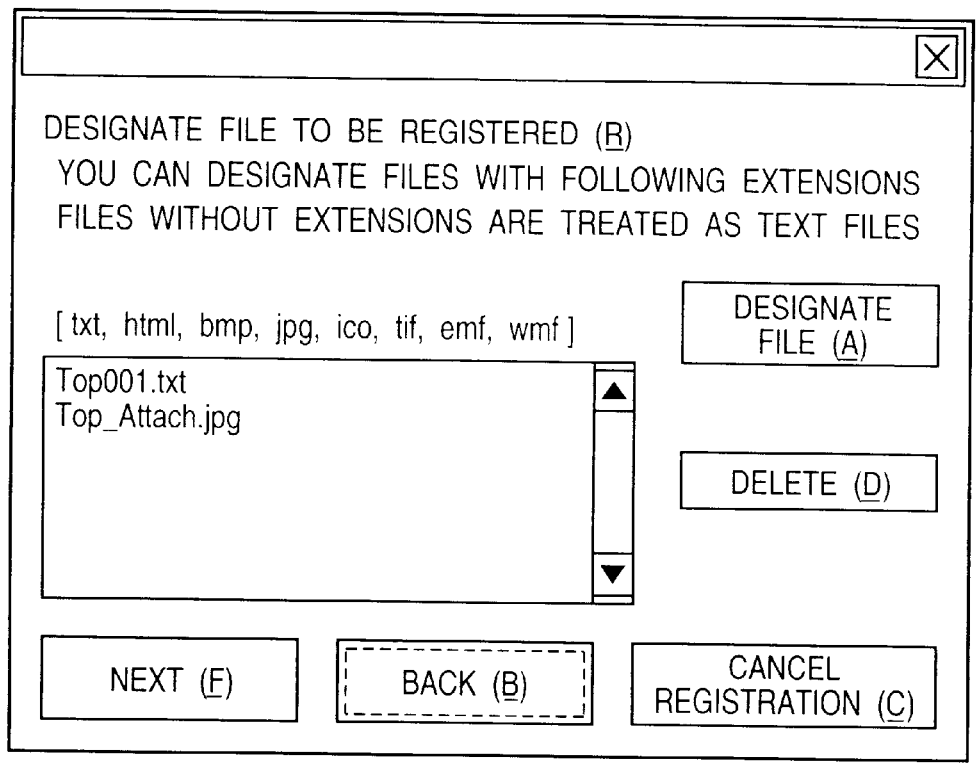
FIG. 40 is a dialog box for designating IP information.

In step S1014, a dialog box shown in FIG. 40 is displayed to designate IP information to be registered. The information provider inputs the file name of the entity (contents) of IP information stored in the information provider terminal. In this case, a plurality of file names can be designated. The IP information to be registered may be either character information or an image.

Figure 41:
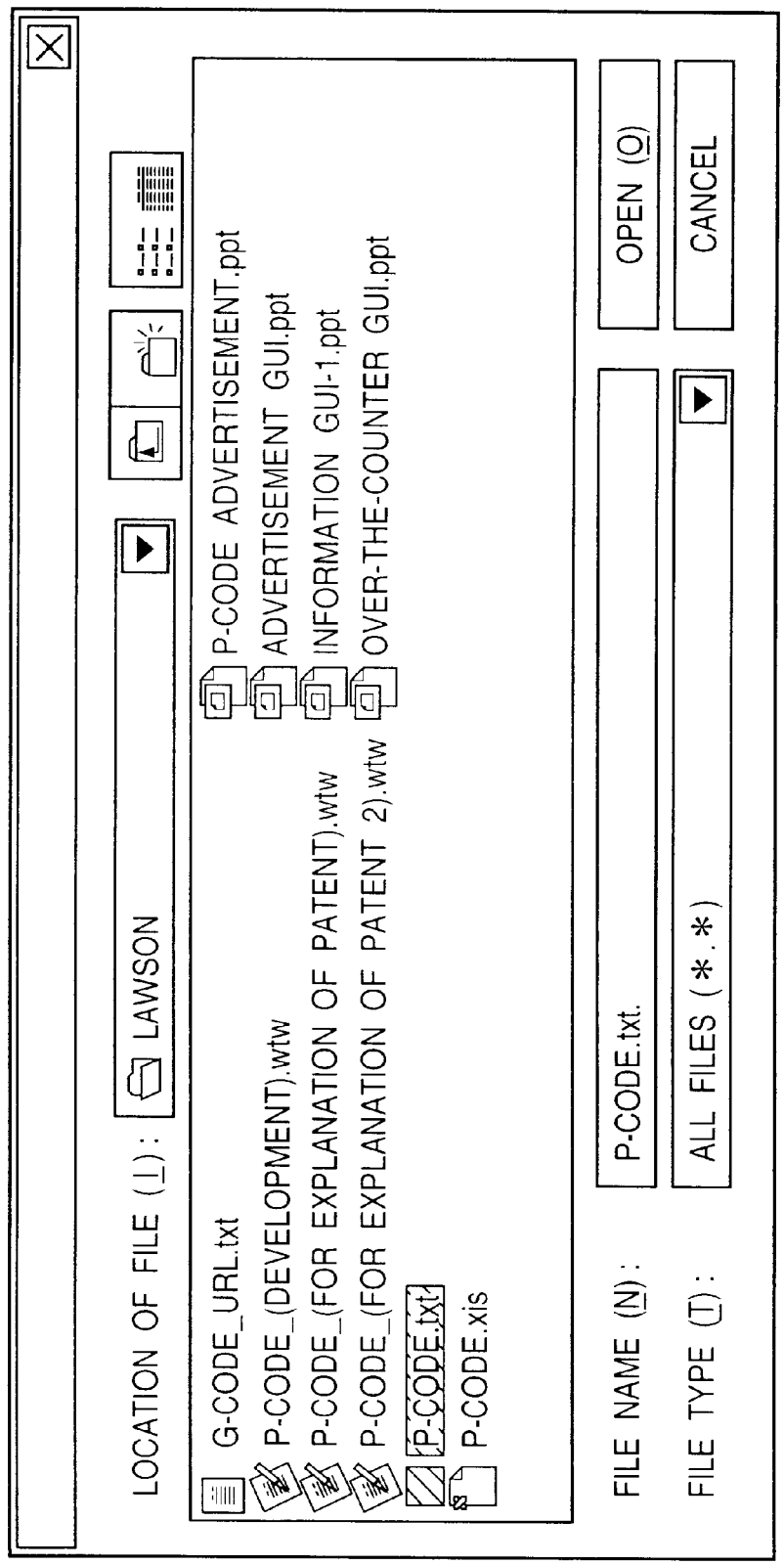
FIG. 41 is a dialog box for designating IP information.

When the "designate file" button is clicked, a dialog box in FIG. 41 that shows the list of IP information files stored in the information provider terminal can be displayed. In this case, the information provider can easily select an IP information file. To cancel a file selected once, the file is designated in the dialog box shown in FIG. 40, and the "delete" button is clicked. When "next" is selected in the dialog box shown in FIG. 40, the flow advances to step S1015.

Figure 42:
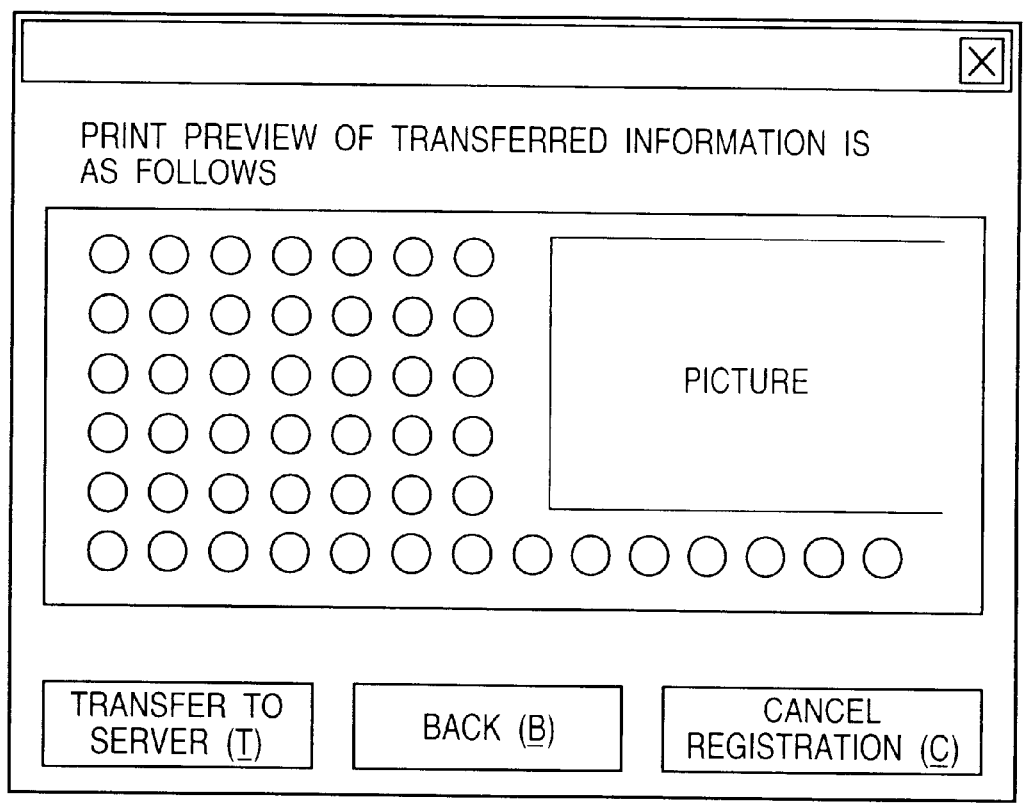
FIG. 42 is a dialog box showing a preview window.
Figure 43:
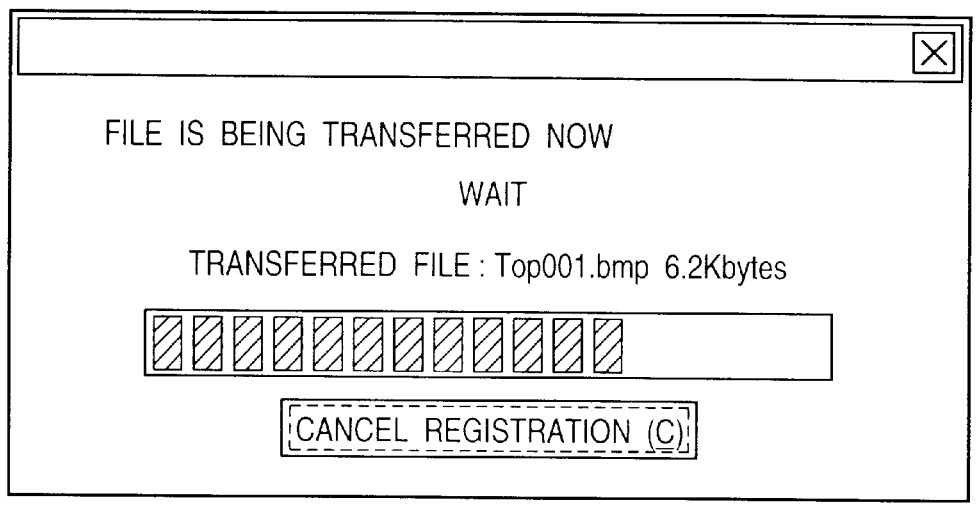
FIG. 43 is a dialog box when file transfer progresses.

In step S1015, the contents of the file designated in step S1014 are displayed as a preview (FIG. 42), and the information provider is made to confirm it. After the confirmation, when the information provider clicks the "transfer to server" button, a dialog box shown in FIG. 43 is displayed, and the designated file is transferred to the P service server 200. After the transfer, the flow advances to step S1016.

In step S1016, a property of the transferred IP information is set. In setting the property, a dialog box shown in FIG. 44 is displayed, so the date of start of insertion and valid dates of the IP information can be set. In this setting, the valid dates of the IP P-code and those of the IP information can be independently set. The valid dates of the P-code may be automatically set by adding a predetermined period to the valid dates of the IP information, as will be described later with reference to FIG. 73. When "next" is clicked in the dialog box shown in FIG. 44, a dialog box shown in FIG. 45 is displayed to set another property.

In this dialog box, whether a change in size of registered IP information is allowed when it is output from the P service terminal 100 is set.

This setting is required because size reduction may be required on the P service terminal 100 side due to the paper of the P service terminal 100 or layout of a plurality of IP information output to one paper sheet. If the size can be freely changed on the P service terminal 100 side, the printed contents may be unclear depending on the contents of the IP information. Hence, the information provider is allowed to set the allowable range of the font size or magnification. When "next" is selected in the dialog box shown in FIG. 45, a dialog box shown in FIG. 46 is displayed to set still another property.

In this dialog box, whether the information provider permits automatic attachment of advertisement information when the IP information registered is output from the P service terminal 100 is set. The information provider checks one of the radio buttons "permit", "permit for lower surface", "not permit" to select setting. Advertisement information is attached within the selected range. When "next" is selected in the dialog box shown in FIG. 46, a dialog box shown in FIG. 47 is displayed to set still another property.

Figure 48:
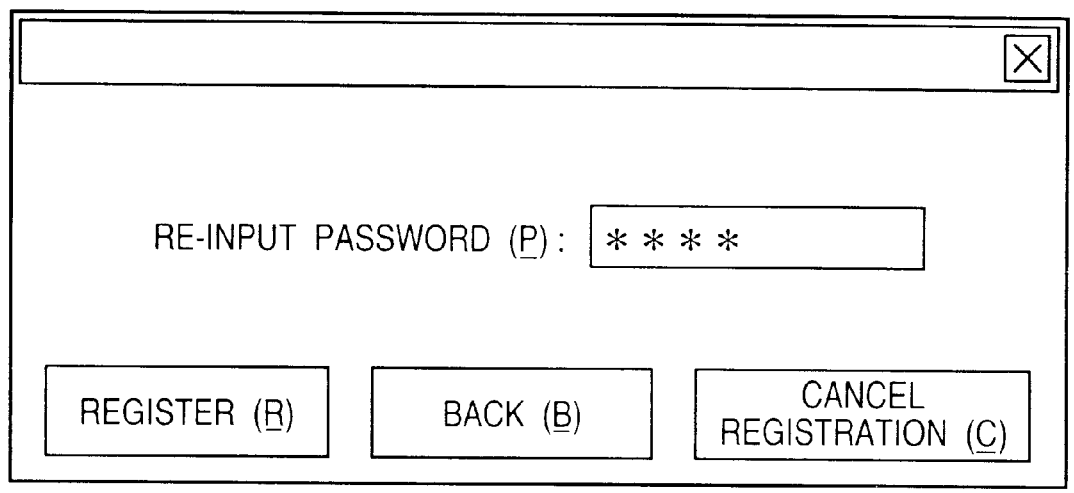
FIG. 48 is a dialog box for confirming a password.

In this dialog box, a password can be set to allow only a specific user to use the registered IP information. To set a password, the check box "set password" is checked, and a desired password is input to the "password" column. After input, when "next" is clicked, a dialog box shown in FIG. 48 is displayed. Re-input is requested to prevent a password input error. When the "register" button is clicked, the password is stored. When password setting is unnecessary, "next" is clicked without any processing in the dialog box shown in FIG. 47. In either case, a dialog box shown in FIG. 49 is displayed to set still another property.

Figure 50:
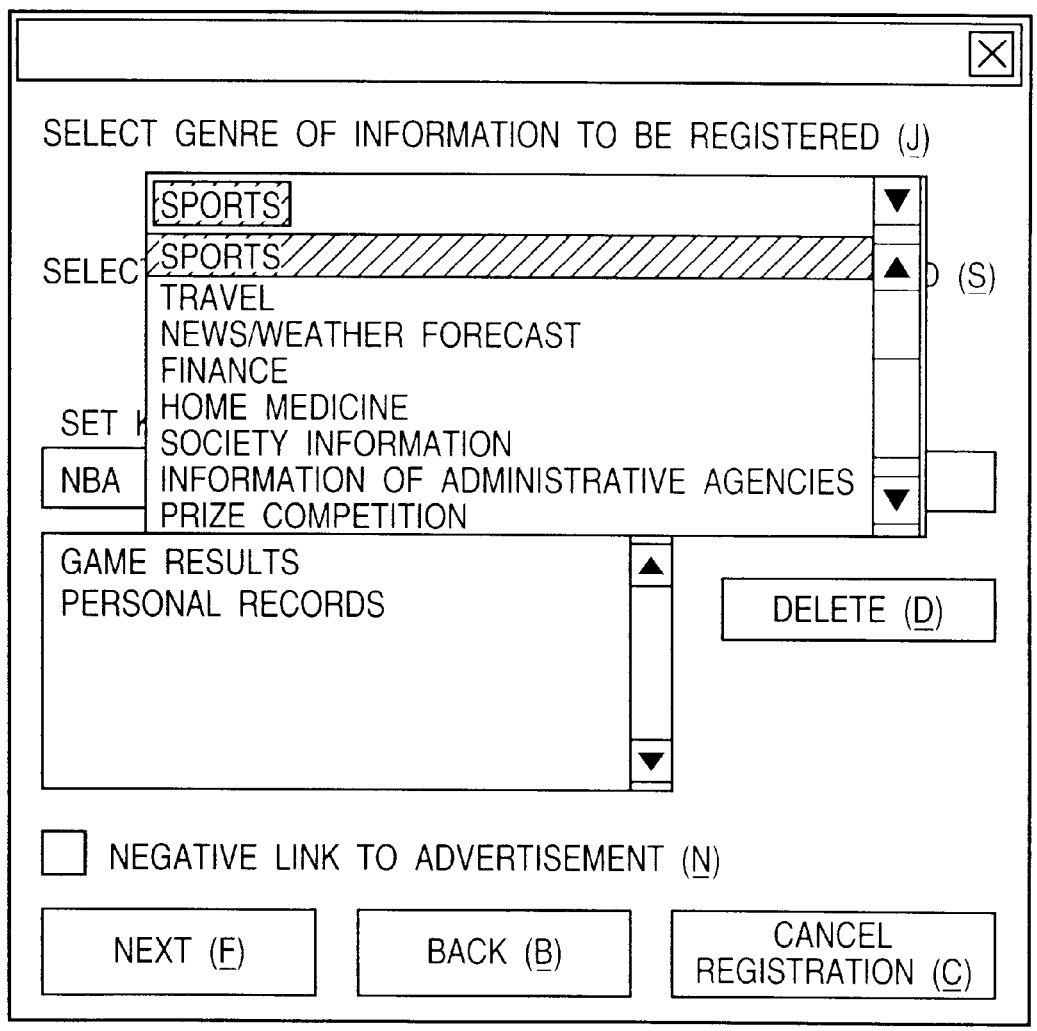
FIG. 50 is a dialog box for setting still another property.

In this dialog box, the genre and keywords of IP information to be registered are input such that they can be used for advertisement search processing. The items to be input are "genre", "subgenre", and "keyword". "Genre" and "subgenre" are listed in drop-down list boxes. For example, when the right arrow of the "genre" column is clicked, the list of items of the "genre" column is displayed, as in a dialog box shown in FIG. 50. The information provider can select from this list a category most suitable to the IP information to be registered. In addition, keywords associated with the concrete contents of the IP information registered can be arbitrarily selected and input to the "keyword" column. An input keyword can be set by the "add" button, and the set keyword can be canceled by the "delete" button.

When the check box "negative link to advertisement" is checked, selection of advertisement information inappropriate to the contents of the registered IP information can be avoided.

Instead of or together with setting the property in the dialog box shown in FIG. 49, a property in a dialog box shown in FIG. 51 can be set.

In the dialog box shown in FIG. 51, the title and summary of the registered IP information are input. This summary is used for advertisement search processing. In addition, when the IP information is requested in the information service, the summary is temporarily disclosed to the user instead of immediately providing the entity of the IP information to the user, thereby increasing the width of IP information selection by the user or reducing the charge.

Property setting in step S1016 is ended, and the flow advances to step S1017.

Figure 52A:
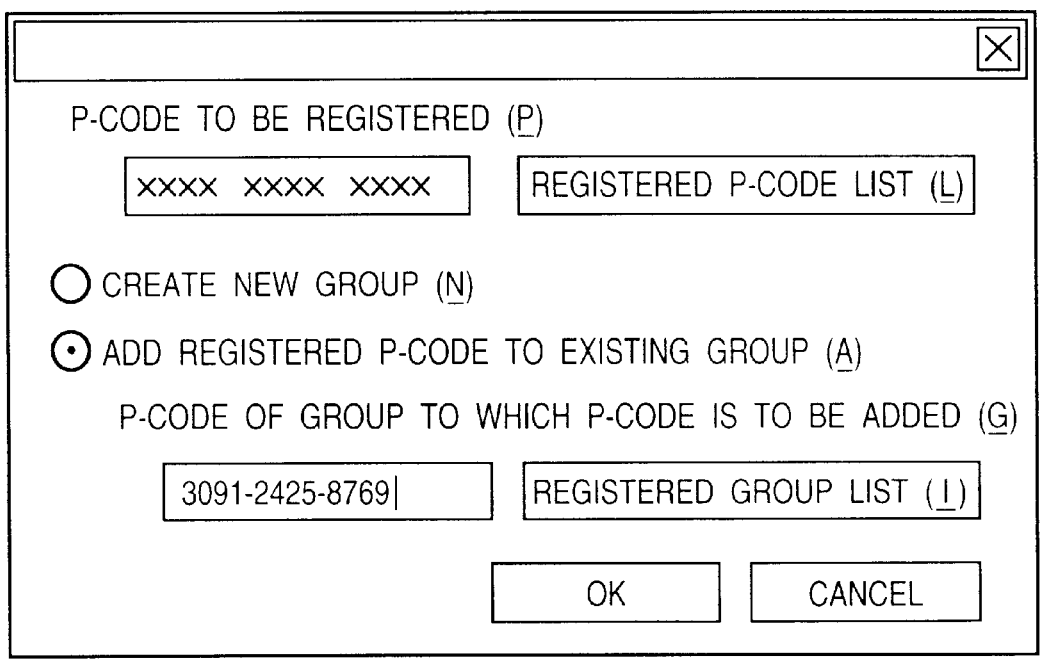
FIG. 52A is a dialog box for setting still another property.

In step S1017, a dialog box shown in FIG. 52A is displayed to select whether the registered IP information is to be subjected to group setting. With group setting, pieces of IP information are associated with each other. This processing is used to handle information having the same object whose contents are updated over time, including the results of professional baseball games and stock information.

If group setting is not desired, the information provider clicks the "cancel" button, and in this case, the flow advances to step S1019.

If group setting is desired, whether the registered IP information is to be added to an existing group or a new group is selected by a radio button in the dialog box shown in FIG. 52A.

To add the IP information to an existing group, the IP P-code of the link destination is input. The P-code displayed in the "P-code to be registered" column is the P-code assigned to the IP information to be registered this time.

Figure 52B:
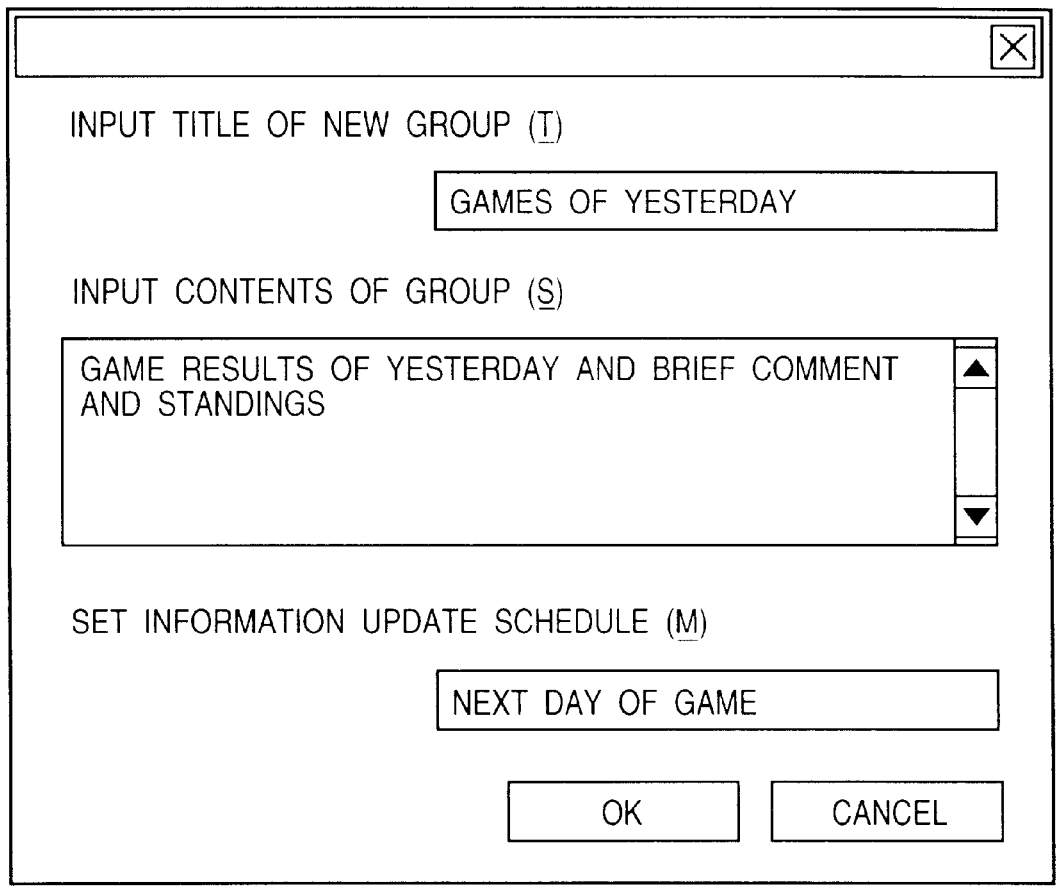
FIG. 52B is a dialog box for setting still another property.

When a new group is selected, and the "OK" button is clicked, a dialog box shown in FIG. 52B is displayed. The title, contents, and update schedule of the group are input. The input data are finally stored in the Frame Information storage area of the IP information registration table (FIG. 7).

Figure 52C:
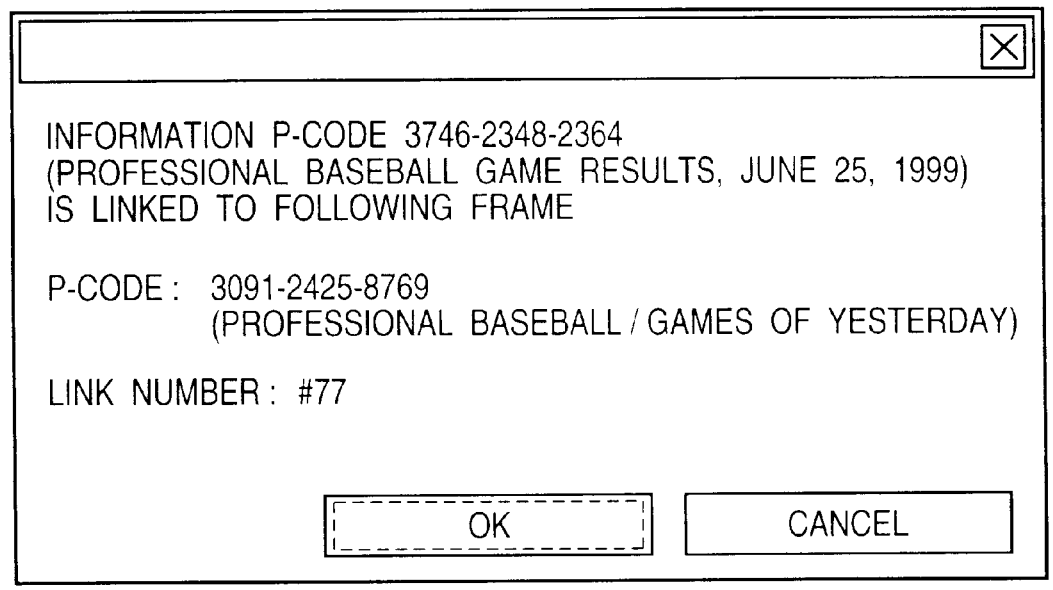
FIG. 52C is a dialog box for setting still another property.

In either case, when the "OK" button is clicked, a dialog box shown in FIG. 52C is displayed, and registration matters for group setting are displayed. This display is done when the IP information to be registered this time is added to an existing group. "Link number #77" in this display means that the IP information registered this time is also used as a P-code in which an attached section (surfix) "#77" is attached to the IP P-code (parent code section) of the link destination. That is, the IP information subjected to group setting can be accessed as the IP P-code of itself or as the IP P-code of the link destination (identified by the attached section), and the latter is mainly used to update information. When the "OK" button is clicked, the flow advances to step S1019.

In step S1019, a dialog box shown in FIG. 53 is displayed. The list of input matters is displayed together with the IP P-code assigned to the registered IP information. When the information provider confirms display and clicks the "register" button, the flow advances to step S1020.

In step S1020, the P service server 200 stores the information input by the above processing in the IP information registration table shown in FIG. 7 in correspondence with the IP P-code assigned to the information provider. The information can also be transferred to the IP server 300 and held by the IP server 300.

When the information provider will register IP information not in the P service server 200 but in the IP server 300 from the information provider terminal, registration is generally done according to the above-described procedure.

In this case, the P service server 200 allocates a usable IP P-code area to the IP server 300 in advance. The IP server 300 can assign an IP P-code to the information provider from the IP P-codes in the allocated area. The IP server 300 notifies the P service server 200 of at least the assigned P-code to perform IP information registration processing. This will be described later with reference to FIGS. 71 to 74.

In this way, the entire IP information registration processing is ended.

<Advertisement Information Registration>

In the P service system, an advertisement provider who provides advertisement information must register the contents of advertisement information in the P service server 200 or IP server 300.

To do this registration, the advertisement provider accesses the P service server 200 or IP server 300 from a terminal (not shown) (to be referred to as an advertisement provider terminal hereinafter) of the advertisement provider through the Web or presents a storage medium such as a CD-ROM in which contents of advertisement information are stored to the operator of the P service system.

The procedure of advertisement information registration will be described below by exemplifying a case wherein the advertisement provider registers advertisement information in the P service server 200 through the Web.

When the advertisement provider accesses advertisement information registration in the P service server 200 from the advertisement provider terminal, the P service server 200 executes processing in step S114 in FIG. 19 and internally issues a P-code for advertisement information. This P-code is exclusively used for internal processing of the P service server 200 and therefore is not disclosed to the advertisement provider in principle.

After that, the flow advances to step S115 to execute advertisement information registration processing.

Figure 54:
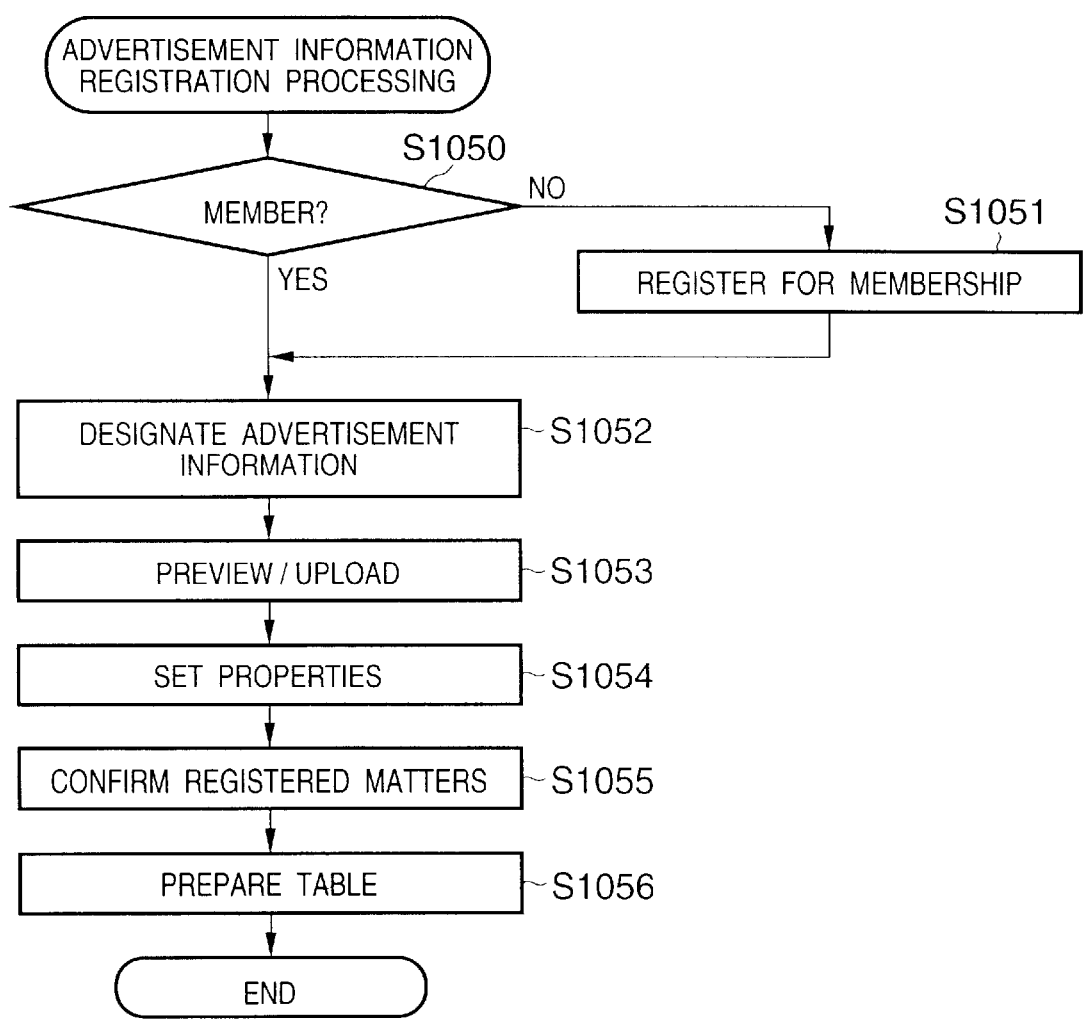
FIG. 54 is a flow chart of advertisement information registration processing.

FIG. 54 is a flow chart of advertisement information registration processing.

In this advertisement information registration processing, windows for advertisement information registration are displayed on the display of the advertisement provider terminal, and the advertisement provider is caused to input matters to be registered by so-called GUI, as in the above-described user registration processing and IP information registration processing.

In step S1050, a dialog box shown in FIG. 55 is displayed, and it is determined whether the advertisement provider is a member of the P service system. A member means a person who has made an application as an information provider in advance. A nonmember cannot provide advertisement information because advertisement insertion is charged for. A membership number and password are assigned in accordance with an application.

When the advertisement provider is a member, he/she checks the radio button "Yes" in this dialog box and also inputs the membership number. When the advertisement provider is a nonmember, he/she checks the radio button "No". When "next" is clicked, the flow advances to step S1051 for a nonmember. For a member, a dialog box shown in FIG. 56 is displayed to request to input a password. If the password input by the advertisement provider is authentic, the flow advances to step S1052.

When "next" is clicked in each dialog box, input information is stored, and the flow advances to the next processing. When "back" is clicked, input information is stored, and the flow returns to immediately preceding processing. When "cancel" is clicked, the flow returns to the first dialog box without storing input information. This also applies to the following processing.

In step S1051, a dialog box shown in FIG. 57 is displayed to cause the advertisement provider as a nonmember to input information for specifying the advertisement provider. This is because advertisement insertion is charged for, as described above. After the input, when "next" is clicked, the flow advances to step S1052.

Figure 58:
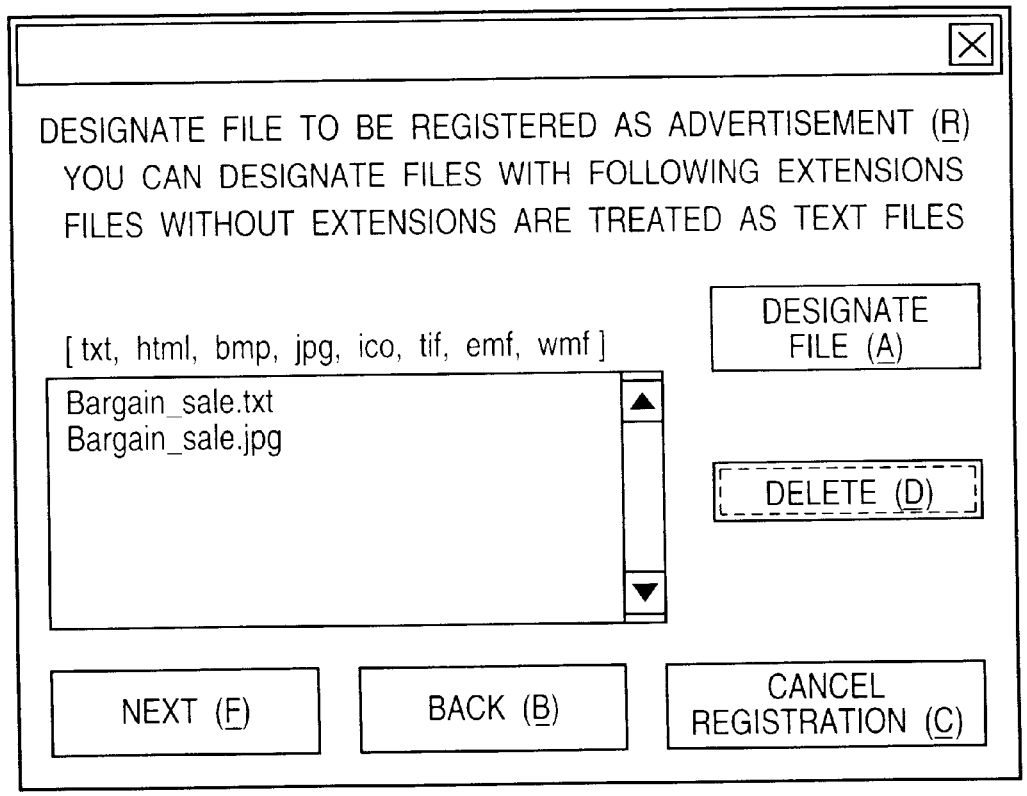
FIG. 58 is a dialog box for designating advertisement information.

In step S1052, a dialog box shown in FIG. 58 is displayed to designate advertisement information to be registered. The advertisement provider inputs the file name of the entity (contents) of advertisement information stored in the advertisement provider terminal. In this case, a plurality of file names can be designated. The functions of the "designate file" and "delete" buttons are the same as in the above-described IP information registration processing shown in FIG. 40. The advertisement information to be registered may be either an image or character information.

When "next" is selected in the dialog box shown in FIG. 58, the flow advances to step S1053.

Figure 59:
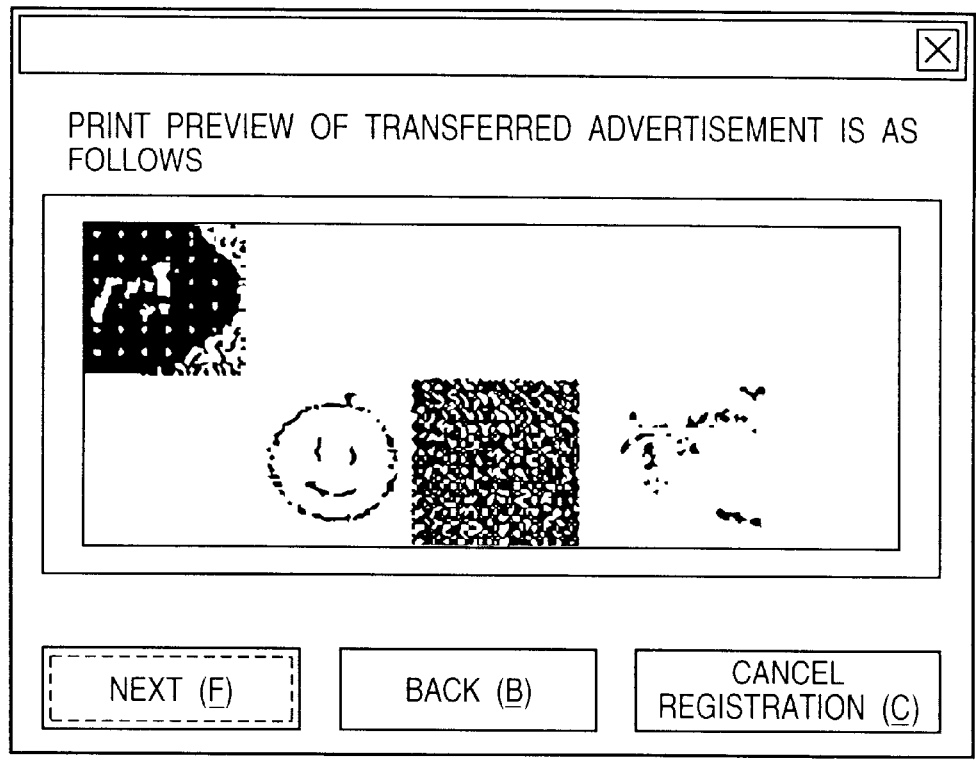
FIG. 59 is as dialog box showing a preview window.
Figure 60:
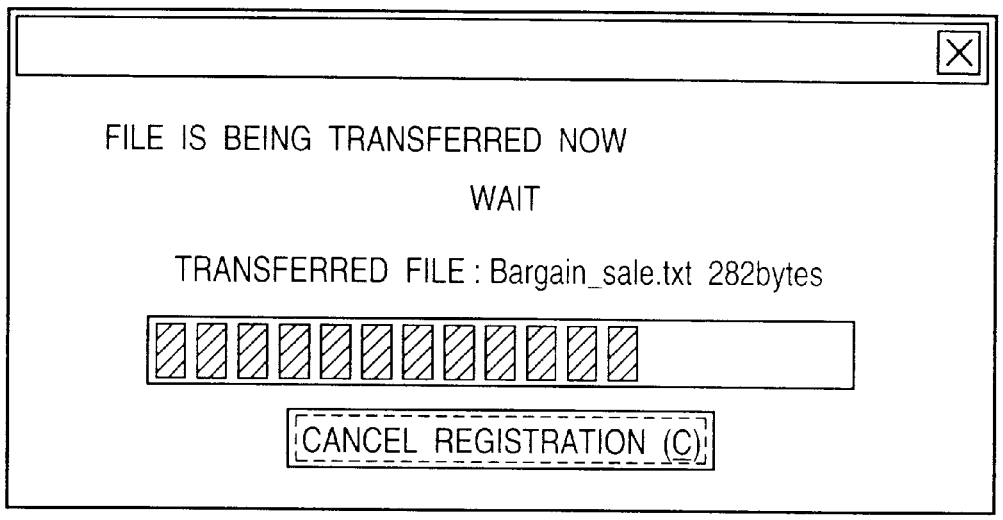
FIG. 60 is a dialog box when file transfer progresses.

In step S1053, the contents of the designated file are displayed as a preview (FIG. 59), and the advertisement provider is made to confirm it. After the confirmation, when the advertisement provider clicks the "next ", a dialog box shown in FIG. 60 is displayed, and the designated file is transferred to the P service server 200. After the transfer, the flow advances to step S1054.

Figure 62:
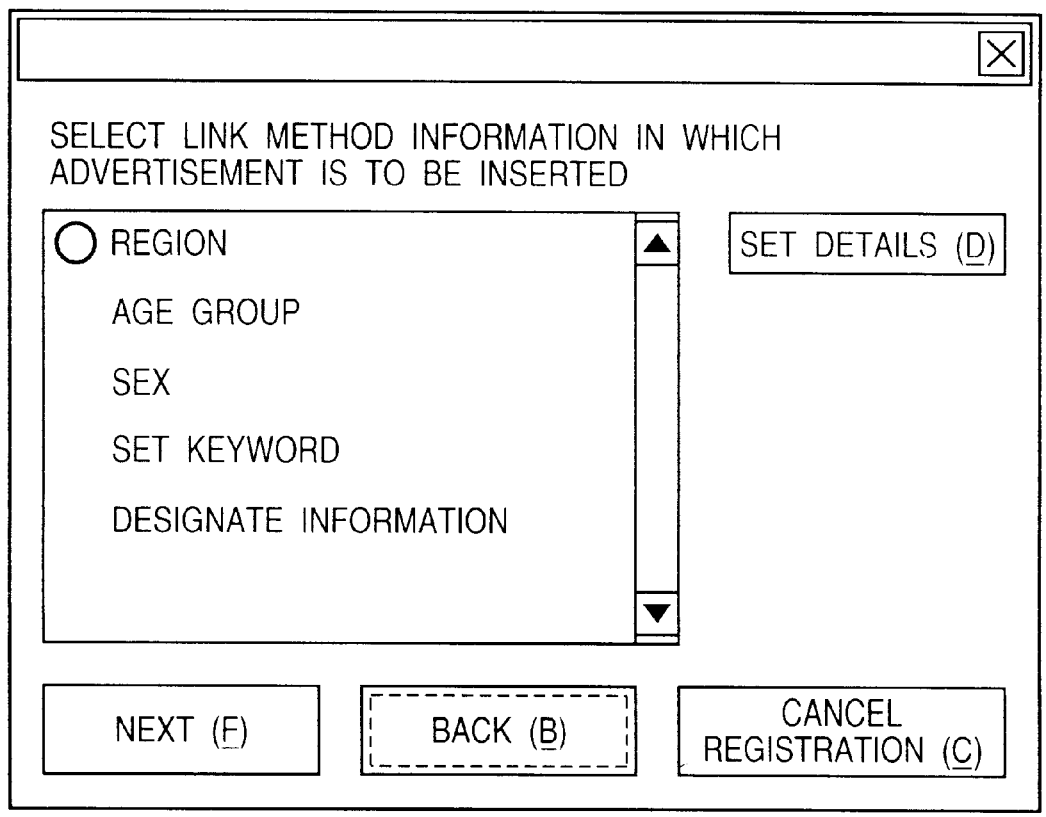
FIG. 62 is a dialog box for setting another property.

In step S1054, a property of the transferred advertisement information is set. In setting the property, a dialog box shown in FIG. 61 is displayed, so the date of start of insertion and valid dates (due date of insertion) of the advertisement information can be set. When "next" is clicked in the dialog box shown in FIG. 61, a dialog box shown in FIG. 62 is displayed to set another property.

Figure 63:
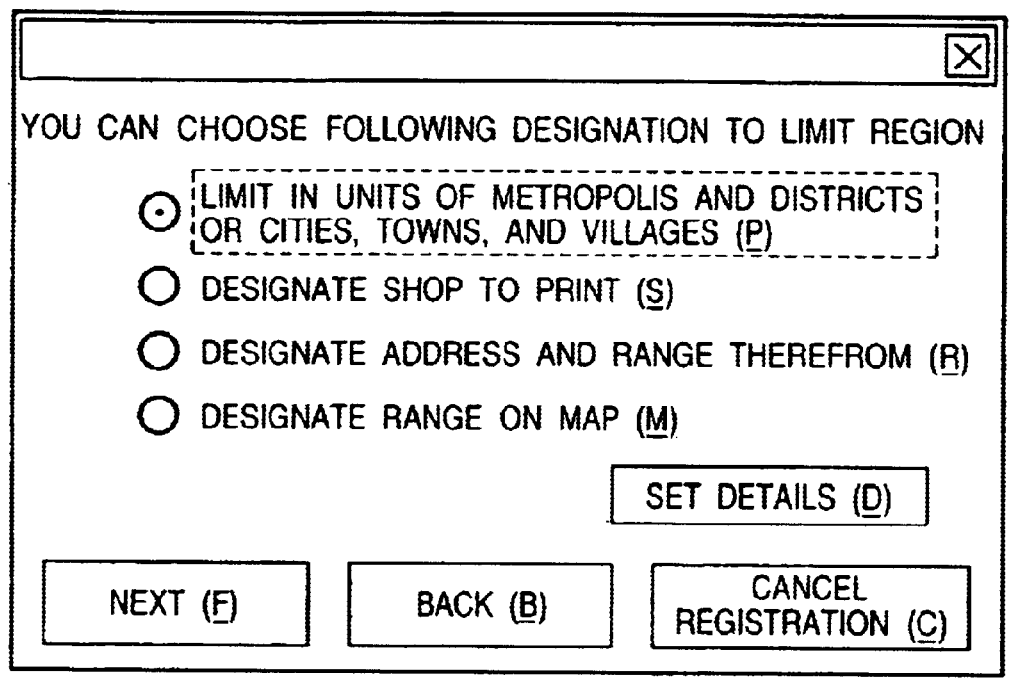
FIG. 63 is a dialog box for setting still another property.

In this dialog box, a method of linking the advertisement information to IP information in which insertion of the advertisement information is requested is set. In accordance with the display of the dialog box, insertion of the advertisement information into IP information common in association with any one of the region, age group, sex, and keyword or contents of information can be designated. For example, when "region" is selected, and the "set details" button is clicked in FIG. 62, a dialog box shown in FIG. 63 is displayed, and specific region setting can be done. When "next" is selected in the dialog box shown in FIG. 63, a dialog box shown in FIG. 64 is displayed to set still another property.

In this dialog box, the size and the like of the advertisement information transferred to the P service server 200 are displayed. The advertisement provider can designate the size in printing, enable/disable state of enlargement/reduction of advertisement information, and print position. For example, when the right arrow of the drop-down list box of the print size selection column is clicked, the list of print sizes is displayed, as shown in FIG. 65, and the advertisement provider can select a desired print size. When "next" is selected in the dialog box shown in FIG. 64, a dialog box shown in FIG. 66 is displayed to set still another property.

In this dialog box, the insertion scheme of the advertisement information to be printed is set. The advertisement provider can check the check box of a desired limitation item to impose the limitation. Except the limitation items shown in FIG. 66, a limitation may be imposed on a change in contents corresponding to color or monochrome print, insertion at the same position when a plurality of pages are printed, or generation of a series of advertisement information. When "next" is selected in the dialog box shown in FIG. 66, a dialog box shown in FIG. 67 is displayed to set still another property.

In this dialog box, a charge for insertion of the advertisement information is set. In this dialog box, a charge per insertion of advertisement information is displayed, and the limit of the total charge can be designated by setting the print count or the upper limit of charge for insertion. When the radio box "designate maximum print count" is checked, the count can also be designated. When the radio box "designate upper limit of advertisement charge " is checked, the upper limit of charge for insertion can also be designated.

Property setting in step S1054 is ended, and the flow advances to step S1055.

Figure 69:
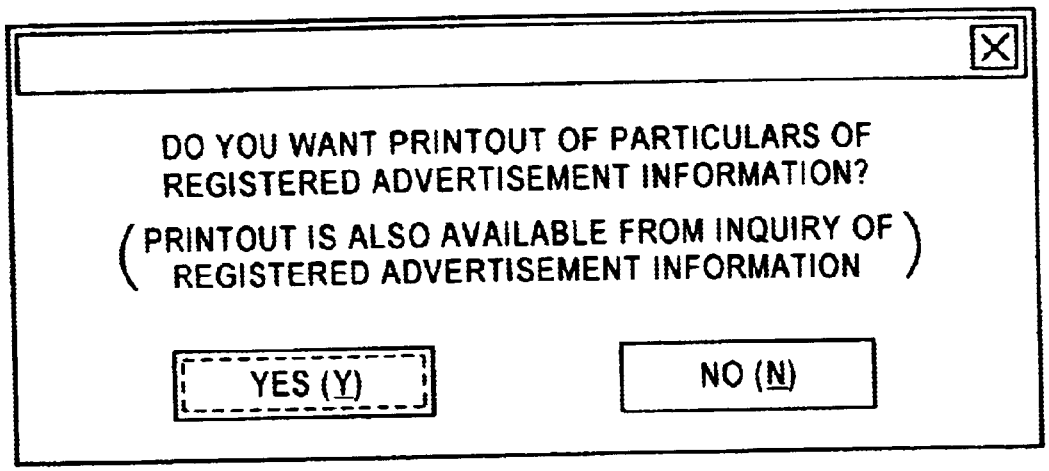
FIG. 69 is a dialog box for printing registered items.

In step S1055, a dialog box shown in FIG. 68 is displayed. The list of input matters is displayed. The P-code is not displayed in principle. When the advertisement provider confirms the display and clicks the "register" button, the flow advances to step S1056. When the "register" button is clicked, a dialog box shown in FIG. 69 may be displayed to allow the advertisement provider terminal to print the particulars of the registered advertisement information.

In step S1056, the P service server 200 stores the information input by the above processing in the advertisement information table shown in FIG. 8 in correspondence with the P-code issued in advance. The information may be transferred to the IP server 300. The P service server 200 always holds the properties (advertisement information table) of the registered advertisement information. However, the entity (contents) itself can be held by either the P service server 200 or IP server 300.

When the advertisement provider will register advertisement information not in the P service server 200 but in the IP server 300 from the advertisement provider terminal, registration is generally done according to the above-described procedure.

In this case, the P service server 200 allocates a usable P-code area to the IP server 300 in advance. The IP server 300 can assign a P-code from the P-codes in the allocated area. The IP server 300 finally transfers the assigned P-code and its table information to the P service server 200 to perform advertisement information registration processing.

In this way, the entire advertisement information registration processing is ended.

<P-code Issue Processing>

P-code issue processing in steps S111, S112, and S114 in FIG. 19 will be described next.

Figure 70:
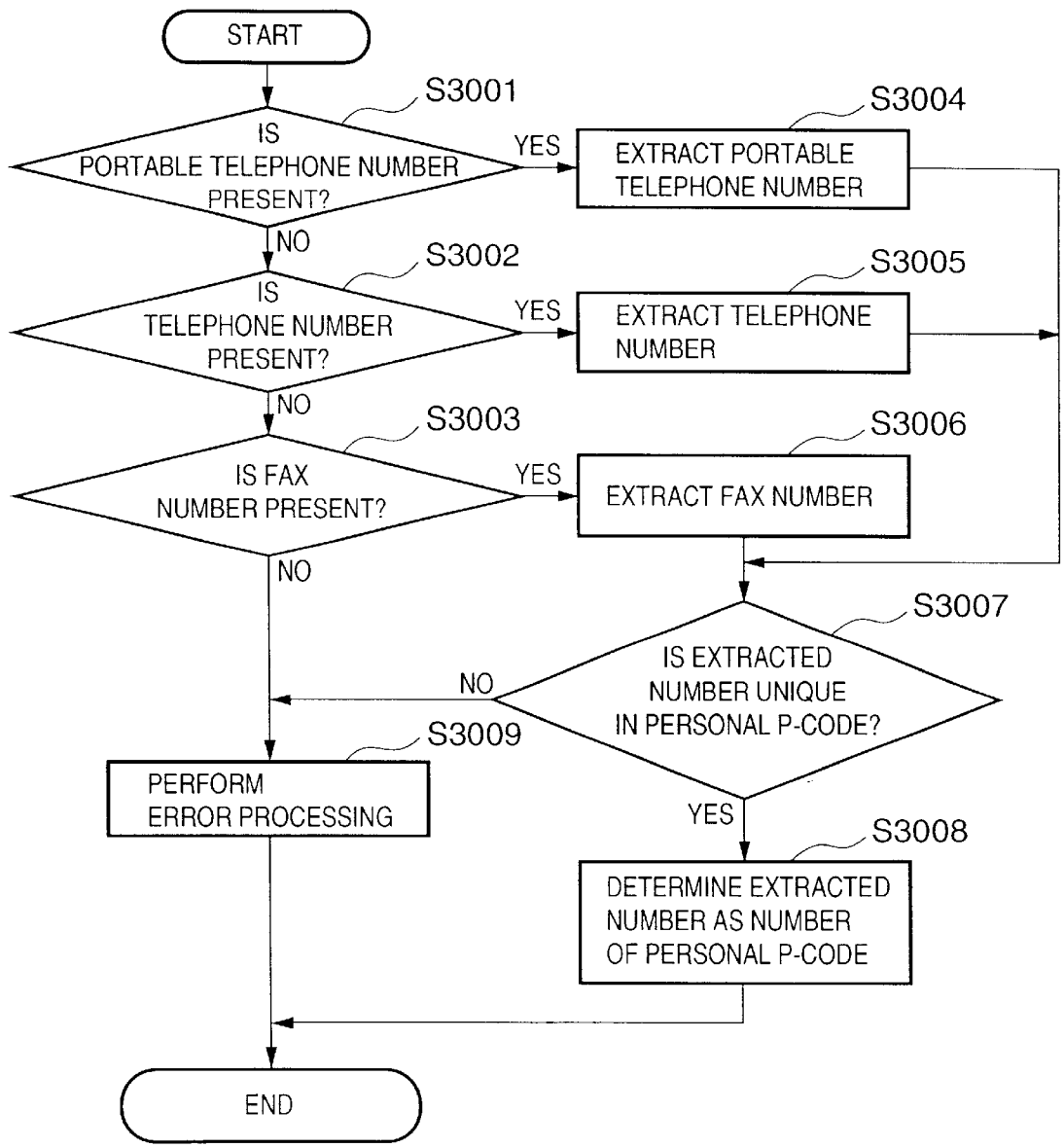
FIG. 70 is a flow chart for explaining the personal P-code issue procedure in step S111.

FIG. 70 is a flow chart for explaining the personal P-code issue procedure in step S111.

When user information is registered, one of the portable telephone number, telephone number, and FAX number of the user is input by the above-described procedure according to GUI. For a personal P-code, one of the input numbers is used for the number section (P-code number) of the P-code. In this embodiment, priority is given in the order of the portable telephone number, telephone number, and FAX number. Hence, when a plurality of numbers are input by the user, the number used for the number section of the P-code is determined in accordance with this priority. For example, when a portable telephone number and telephone number are input, the portable telephone number with a higher priority is used to issue a P-code.

When the portable telephone number is input, the flow advances from step S3001 to step S3004 to extract the portable telephone number. If not the portable telephone number but the telephone number is input, the flow advances from step S3002 to step S3005 to extract the telephone number. If only the FAX number is input, the flow advances from step S3003 to step S3006 to extract the FAX number. If none of the portable telephone number, telephone number, and FAX number are input, the flow advances to error processing in step S3009 to prompt the user to input at least one of the portable telephone number, telephone number, and FAX number.

When the number is extracted in one of steps S3004, S3005, and S3006, it is checked in step S3007 whether the extracted number is not common to a used personal P-code. If NO in step S3007, the flow advances to step S3009 to notify the user of it. When the extracted number is unique in the personal P-code, the flow advances from step S3007 to step S3008 to determine the extracted number as the number section of the P-code and assign the P-code to the user.

In this way, the personal P-code is determined on the basis of the portable telephone number, telephone number, or FAX number of the user.

IP P-code issue in step S112 in FIG. 19 will be described next. An IP P-code is issued by the P service server 200 or IP server 300.

To issue an IP P-code by the IP server 300, personal information ID number (internal code) is connected to a site number (external code) assigned to the IP server in advance to generate a P-code. More specifically, each IP server has a site number (external code, FIG. 18) assigned from the P service server 200. In accordance with an IP information registration request, the IP server 300 assigns an internal code and links the external code to the internal code to obtain one P-code. The number of P-codes that can be assigned by the IP server equals the number of internal codes. Hence, processing of assigning an external code to the IP server will be described first, and IP P-code issue processing will be described then.

Figure 71:
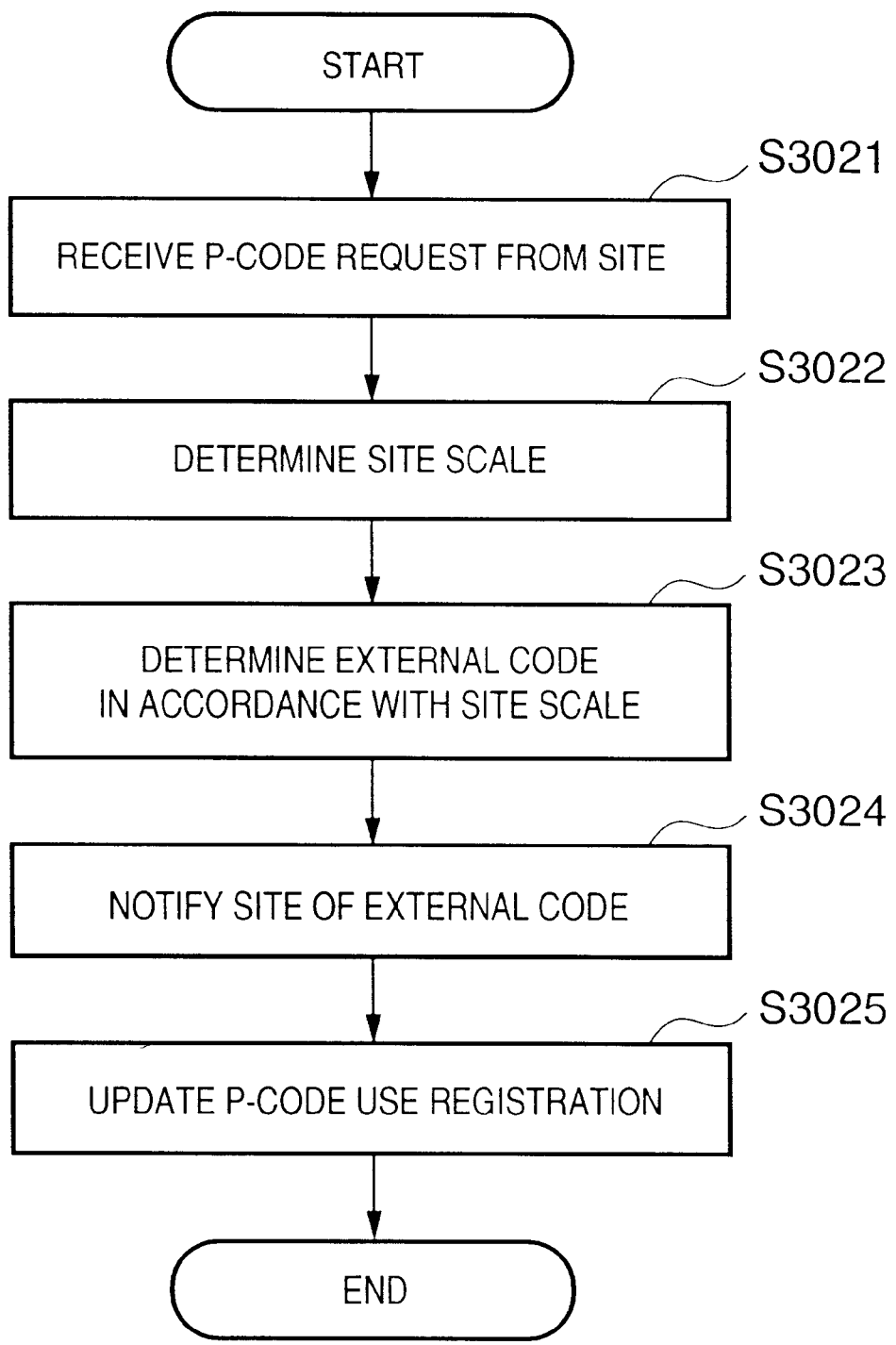
FIG. 71 is a flow chart for explaining a procedure in which the P service server assigns the external code of a P-code to another site.

FIG. 71 is a flow chart for explaining a procedure in which the P service server assigns the external code of a P-code to the IP server.

In step S3021, when a P-code request is received from the IP server, the site scale is determined in step S3022 (the site scale is determined in accordance with a scale request from the IP server). When the site scale is determined, four bits from the 17th bit to the 20th bit in FIG. 18 are determined (since the code is to be assigned to an external server, the 17th bit (server identification bit) is "0"). In step S3023, the code value of the external code section determined in accordance with the site scale determined in step S3022 is determined. For example, when the site scale is medium, the 21st to 36th bits are used as bits for the external code, as shown in FIG. 18, so a code value represented by 16 bits is determined. The code value determined herein is a code that has not been assigned yet to another site at that time.

FIG. 72 is a view showing the data structure of a P-code use registration table used in this embodiment. This P-code user registration table is held by the P service server 200. As shown in FIG. 72, external codes already assigned to sites (IP servers) and the URLs of the sites are registered in correspondence with each other in units of site scales including the minimal scale, small scale, medium scale, large scale, and maximal scale. In step S3023, an unused external code is detected by looking up the P-code use registration table and determined as an external code to be assigned. As information to be registered in correspondence with an external code, information capable of specifying the database which stores information in the IP server, i.e., database identification information (address) suffixes, and a URL need not always be used. This is because information to be provided in accordance with designation of a P-code in the system is not always present on the Web.

In step S3024, the site that has requested a P-code is notified of the value determined in steps S3022 and S3023 as an external code. Upon receiving the site number (external code) from the P service server 200, the site that has requested a P-code can issue a P-code corresponding to IP information using personal information ID bits (internal code) according to the site scale.

In step S3025, the P-code use registration table shown in FIG. 72 is updated. More specifically, in the external code determined in steps S3022 and S3023 and the URL (database identification information) of the site that has requested a P-code are registered in the P-code use registration table shown in FIG. 72 in correspondence with each other. When an IP P-code is designated later from the P service terminal 100, the P service server 200 can know the site that is to be notified of the designated P-code to obtain information by looking up this P-code use registration table.

P-code issue processing in the server (P service server or IP server) which has received an IP information registration request will be described next. In the following processing example, a P-code is issued using a P-code use table in which the valid date of each P-code is registered.

FIG. 73 is a view showing the data structure of the P-code use table. Each IP server holds a P-code use table as shown in FIG. 73 and looks it up in issuing a P-code. The number section of a P-code (for an IP server, a number obtained by linking an external code and internal code; for the P service server 200, a number represented by the 17th to 55th bits) and the valid dates of the code are registered in the P-code use table. As the valid dates of the code, the same data as the "valid dates of code" in the IP information registration table shown in FIG. 7 is used. In registering IP information, dates set by the information provider by GUI in FIG. 44 are registered as the valid dates of the code. Alternatively, a date after a predetermined period from the valid dates of information set by the information provider in IP information registration, e.g., a date after three months is automatically set. With this setting, a nonuse period of the P-code is given, and contents to which the same P-code is assigned can be prevented from largely changing after a certain day. Since a common external code is used in one site, only the internal code may be recorded in the column "number section of P-code" of the P-code use table.

For a personal P-code in the P service server 200, the number section of the P-code is constructed by a 40-bit code section. For this reason, the code represented by 40 bits is registered in the column "number section of P-code".

Figure 74:
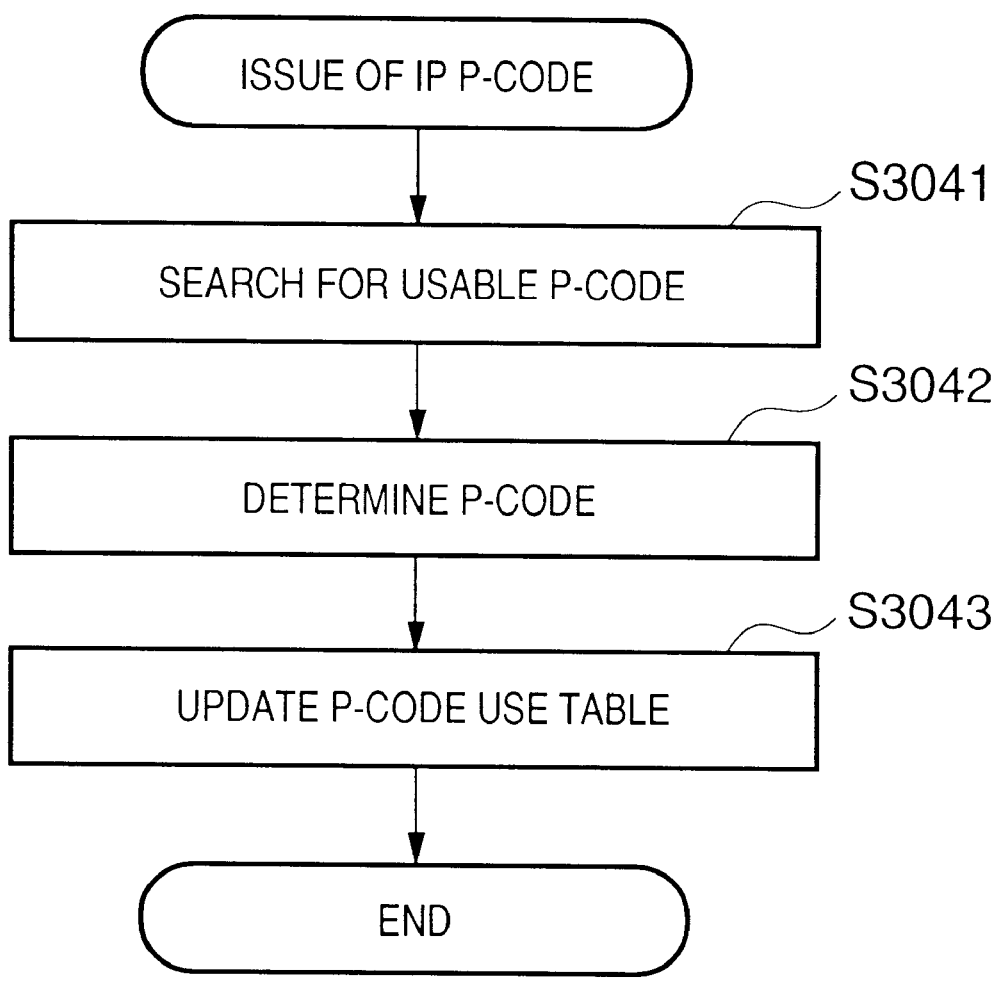
FIG. 74 is a flow chart for explaining IP-code issue processing.

FIG. 74 is a flow chart for explaining IP-code issue processing. When an IP information registration request is received, and step S112 in FIG. 19 is executed, a P-code usable in the server is detected by looking up the above-described P-code use table in step S3041. In step S3042, one of the usable P-codes is determined and assigned to the IP information. To assign a P-code by the IP server, the above-described P-code use table is searched to acquire an unused internal code. The internal code is linked to the external code of the IP server, class category code (code representing the site scale), and server identification bit (=0) to determine a P-code to be issued and assigned to the information. To assign a P-code by the P service server 200, a 39-bit unused code is connected to the identification bit (17th bit=1) to obtain a P-code, as shown in FIG. 18.

An unused P-code means a P-code whose "term of validity of code" has expired. To determine whether a P-code is unused, the table may be searched for a P-code that has expired at the time of issue. Alternatively, time information of year, month, and day may be always compared with the valid dates of code in the table, and an unused identifier may be stored in the table when the code has expired.

In step S3043, the P-code use table in the server is updated. More specifically, the newly assigned P-code is stored, and the valid dates of the P-code are set at the valid dates designated at the time of IP information registration, or at a date after a predetermined period (e.g., after three months) from the valid dates of the IP information set by the information provider.

In this way, an IP P-code is issued. In issuing an IP P-code, the valid dates of the code are looked up. In extracting information corresponding to the designated IP P-code, it is checked whether the current time falls within the range between the "date of start of insertion" and "valid dates of information", which are registered in the IP information registration table (FIG. 7) of the P-code.

In this example, to perform issue processing at a high speed, a table as shown in FIG. 73 is prepared. However, since the valid dates of the code are registered in the IP information registration table shown in FIG. 7, a P-code may be issued by looking up this table. Additionally, for example, an IP code usable in the server may be temporarily issued for information registration, and it maybe determined whether the temporarily issued code can be used, by looking up the valid dates of the code registered in the IP information registration table. In this case, it is determined whether the time (year, month, and day) of temporary code issue is before the valid dates of the code. If it is determined that the code has expired, issue of the IP code is inhibited, and temporary issue of another IP code and determination are repeated until an IP code is finally issued.

The procedure of issuing a P-code for advertisement information is basically the same as the procedure of issuing a P-code for IP information.

<Description of Various Services>

Details of information acquisition processing (to be referred to as an information service hereinafter) in step S116, mail data acquisition processing (to be referred to as a mail service hereinafter) in step S117, personal information acquisition processing (to be referred to as a personal information service hereinafter) in step S118, distribution data acquisition processing (to be referred to as a distribution service (reception of registered information) hereinafter) in step S119, and distribution information registration processing (to be referred to as a distribution service (registration of information) hereinafter) in step S123, and examples of display windows displayed on the touch panel 104 of the P service terminal 100 in executing each processing will be described next.

An initial window for executing the services will be described first with reference to FIG. 75.

Figure 75:
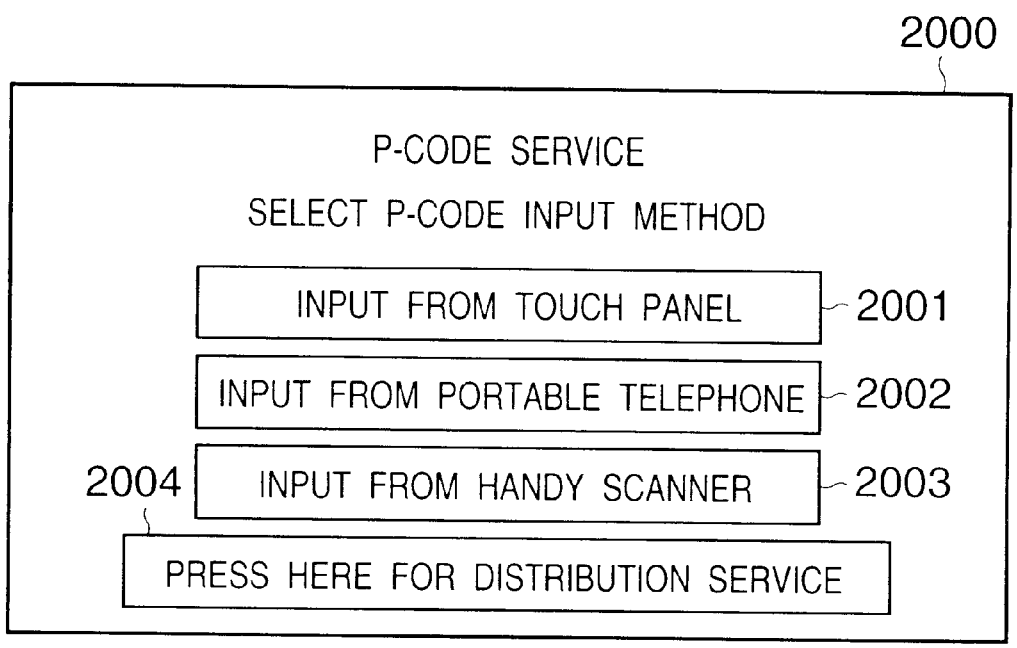
FIG. 75 is a view showing an example of the display window displayed on a touch panel 104 of the P service terminal 100 of this embodiment.

Referring to FIG. 75, an initial window 2000 has buttons 2001 to 2004. To execute the information service, mail service, personal information service, or distribution service (reception of registered information), a P-code for executing the service is input using one of the buttons 2001 to 2003. The button 2001 is pressed to input a P-code using the touch panel 104. The button 2002 is pressed to input a P-code using the portable terminal 400. The button 2003 is pressed to input a P-code using the bar code reader 107. The button 2004 is pressed for the distribution service (registration of information) (to be described later).

Figure 76:
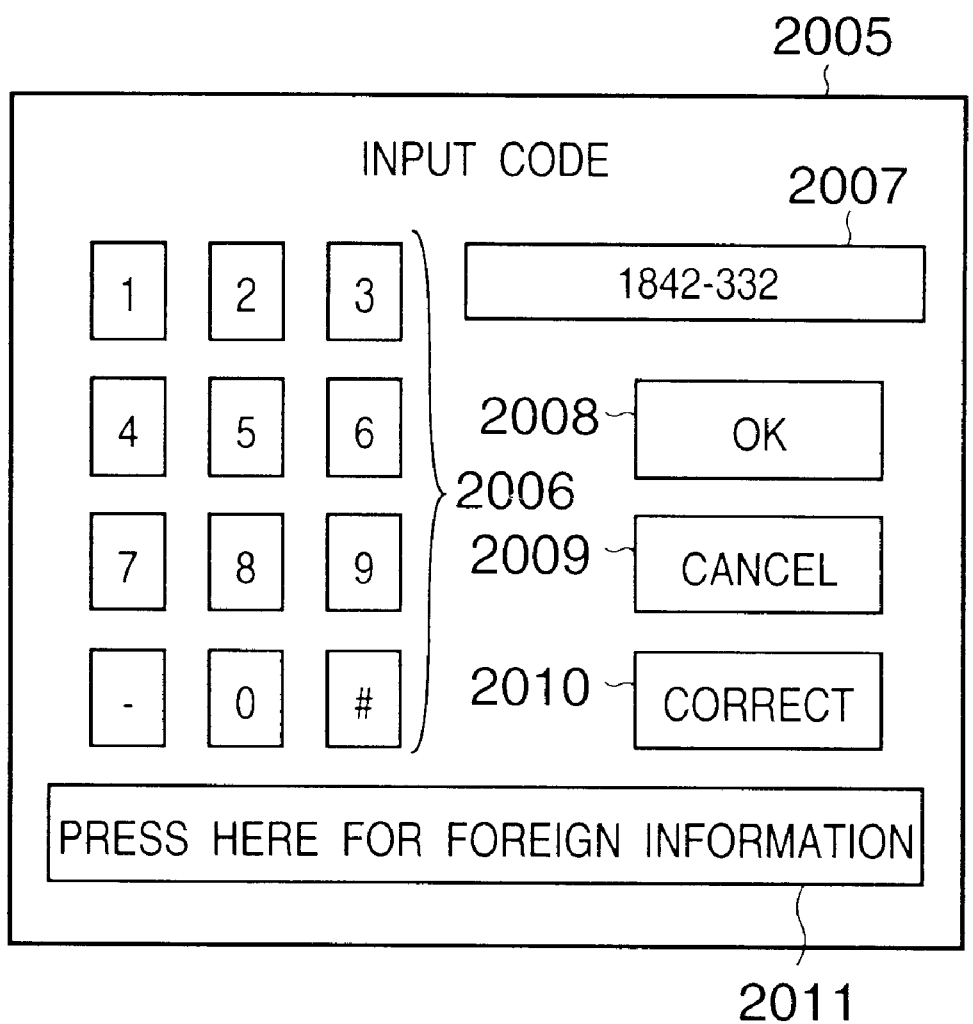
FIG. 76 is a view showing another example of the display window displayed on the touch panel 104 of the P service terminal 100 of this embodiment.

When the button 2001 in the initial window 2000 is pressed, a window 2005 shown in FIG. 76 is displayed.

The window 2005 is a P-code input window in which a P-code for executing various services including the information service, mail service, distribution service (reception of registered information), and personal information service is input.

The window 2005 has a ten-key group 2006. A desired P-code is input using the keys of the ten-key group 2006. The input P-code is displayed in an area 2007. After the end of input, a button 2008 is pressed to acknowledge the input P-code. To cancel the input P-code, a button 2009 is pressed to delete the P-code displayed in the area 2007. To correct the input P-code, a button 2010 is pressed to correct the P-code to be corrected using a cursor (not shown) on the area 2007. A button 2011 is pressed to input a P-code associated with foreign information.

Figure 77:
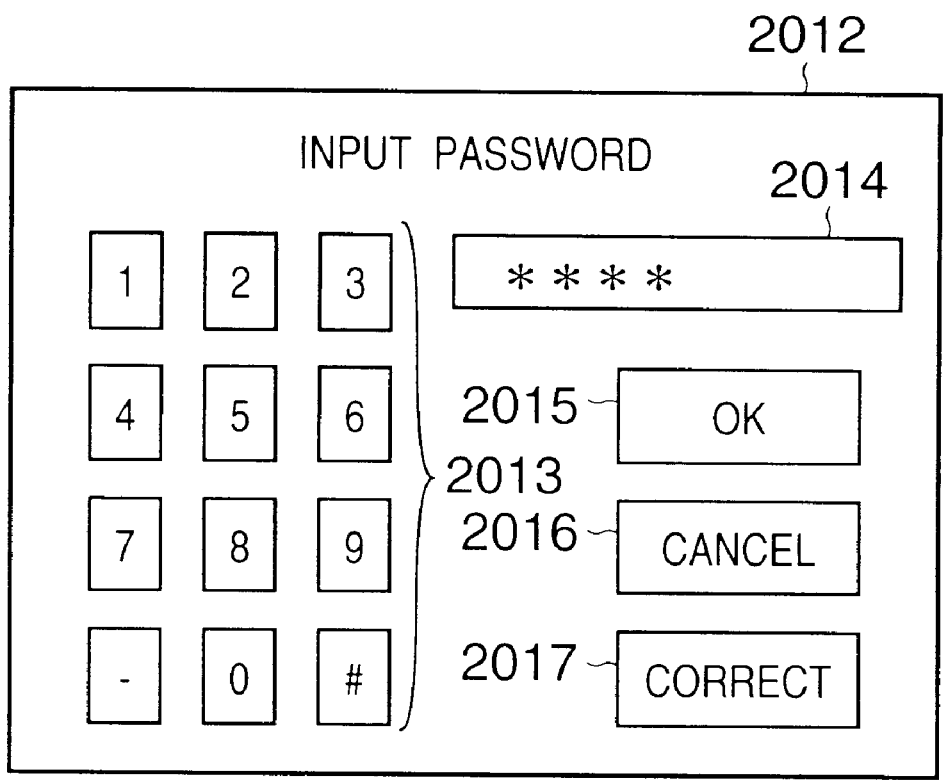
FIG. 77 is a view showing still another example of the display window displayed on the touch panel 104 of the P service terminal 100 of this embodiment.

When the button 2008 is pressed, the structure of the input P-code is determined. On the basis of the determination result, a window for executing various services including the information service, mail service, distribution service (reception of registered information), and personal information service or a window 2012 shown in FIG. 77 is displayed. If the input P-code has expired, a window (not shown) for notifying the user of it is displayed.

The window 2012 shown in FIG. 77 has a ten-key group 2013 for inputting a password and buttons 2015 to 2017. In an area 2014, "*" is displayed as the password is input.

When the button 2015 is pressed after completion of password input, a window for executing various services including the information service, mail service, distribution service (reception of registered information), and personal information service is displayed on the basis of the determination result of the structure of the P-code input in the window 2005 in FIG. 76. In this embodiment, a P-code input as a number sequence hyphened in units of four digits (in units of four numbers) is determined as a "nontelephone number" (IP P-code), and a P-code input as another type of number sequence (unhyphened number sequence or a number sequence hyphened in units of digits other than four digits) is determined as a "telephone number" (personal P-code).

When it is determined that the input P-code is "telephone number#Subcode", a window for executing the mail service is displayed. When the input P-code is "telephone number-Subcode", a window for executing the distribution service (reception of registered information) is displayed.

When the input P-code is "nontelephone number", a window for executing the information service is displayed.

When the input P-code is "telephone number##Subcode", a window for executing the personal information service is displayed.

Figure 78:
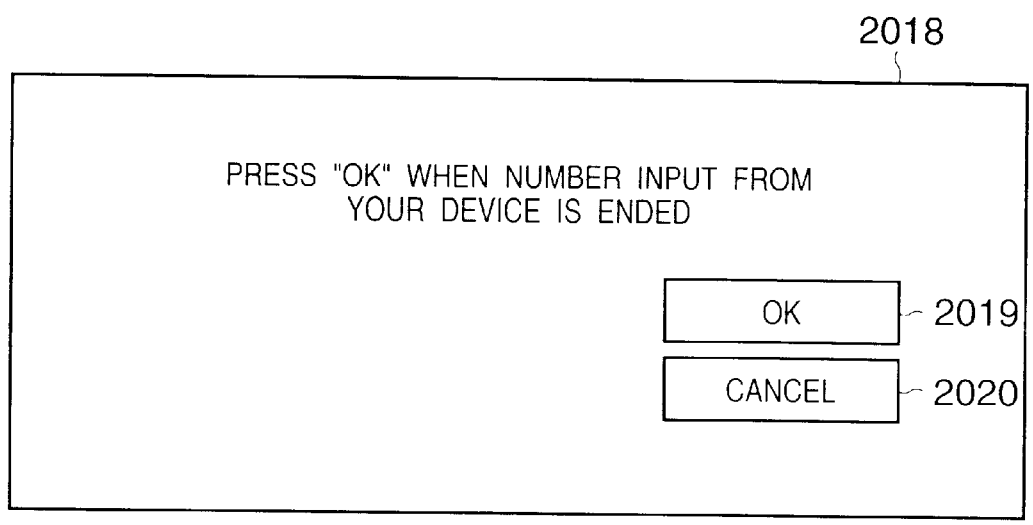
FIG. 78 is a view showing still another example of the display window displayed on the touch panel 104 of the P service terminal 100 of this embodiment.

When the button 2002 in the initial window 2000 shown in FIG. 75 is pressed, a window 2018 shown in FIG. 78 is displayed.

The window 2018 is a P-code input window by the portable terminal 400. After completion of input, when a button 2019 is pressed, the structure of the input P-code is determined. On the basis of the determination result, a window for executing various services including the information service, mail service, distribution service (reception of registered information), and personal information service or the window 2012 shown in FIG. 77 is displayed. To cancel the input P-code, a button 2020 is pressed. If the input P-code has expired, a window (not shown) for notifying the user of it is displayed.

Figure 79:
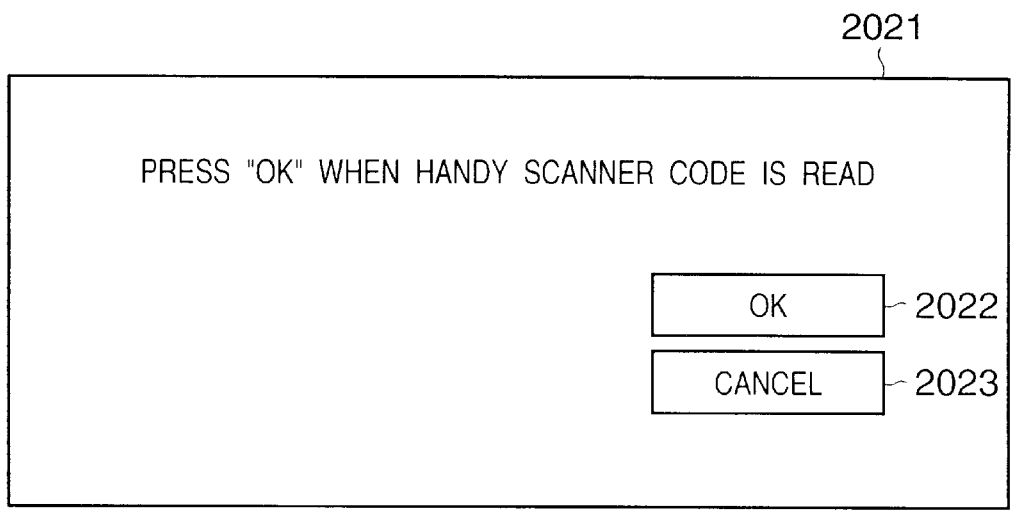
FIG. 79 is a view showing still another example of the display window displayed on the touch panel 104 of the P service terminal 100 of this embodiment.

When the button 2003 in the initial window 2000 shown in FIG. 75 is pressed, a window 2021 shown in FIG. 79 is displayed.

The window 2021 is a P-code input window by the bar code reader 107. After completion of input, when a button 2022 is pressed, the structure of the input P-code is determined. On the basis of the determination result, a window for executing various services including the information service, mail service, distribution service (reception of registered information), and personal information service or the window 2012 shown in FIG. 77 is displayed. To cancel the input P-code, a button 2023 is pressed. If the input P-code has expired, a window (not shown) for notifying the user of it is displayed.

Windows displayed on the basis of the determination result of the structure of the input P-code will be described next.

A window for executing the information service, which is displayed when the input P-code is a nontelephone number, will be described first with reference to FIG. 80.

When the input P-code is an IP P-code, the contents of information corresponding to the IP P-code are displayed in a window 2025. More specifically, in an area 2027, P-codes, titles of information corresponding to the P-codes, the number of pages, printing charges, and printing conditions (in this embodiment, color or monochrome printing and the presence/absence of printing can be particularly designated as printing conditions, for which buttons 2027a to 2027c are prepared) are displayed.

In an area 2028, charge information in printing the information displayed in the area 2027 is displayed. The area 2028 has a button 2028a which is pressed to print an advertisement together with the information. When the button 2028a is pressed, a window shown in FIG. 28 is displayed to set advertisement insertion conditions. This window will be described later in detail.

A button 2029 is pressed to display the print preview of information to be printed. A button 2030 is pressed to print information to be printed. A button 2031 is pressed to display the preceding window. A button 2032 is pressed to cancel the contents set in the window 2025. A button 2026 is pressed to input another P-code. When the button 2026 is pressed, the window 2005 shown in FIG. 76 is displayed again.

Figure 81:
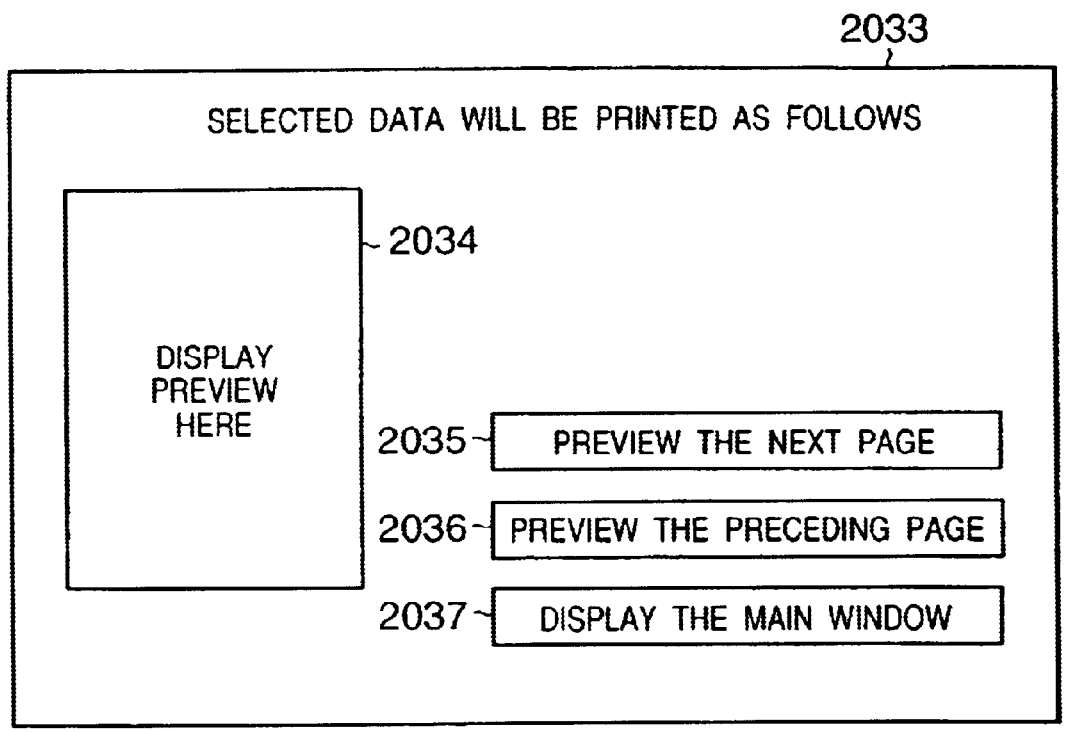
FIG. 81 is a view showing still another example of the display window displayed on the touch panel 104 of the P service terminal 100 of this embodiment.

When the button 2029 is pressed, a window 2033 shown in FIG. 81 is displayed.

In the window 2033, an area 2034 is a preview area where the contents of information to be printed are displayed. A button 2035 is pressed to display the next page of information to be printed. A button 2036 is pressed to display the preceding page of information to be printed. A button 2037 is pressed to display the main window (in this embodiment, the window 2025 shown in FIG. 80).

Figure 80:
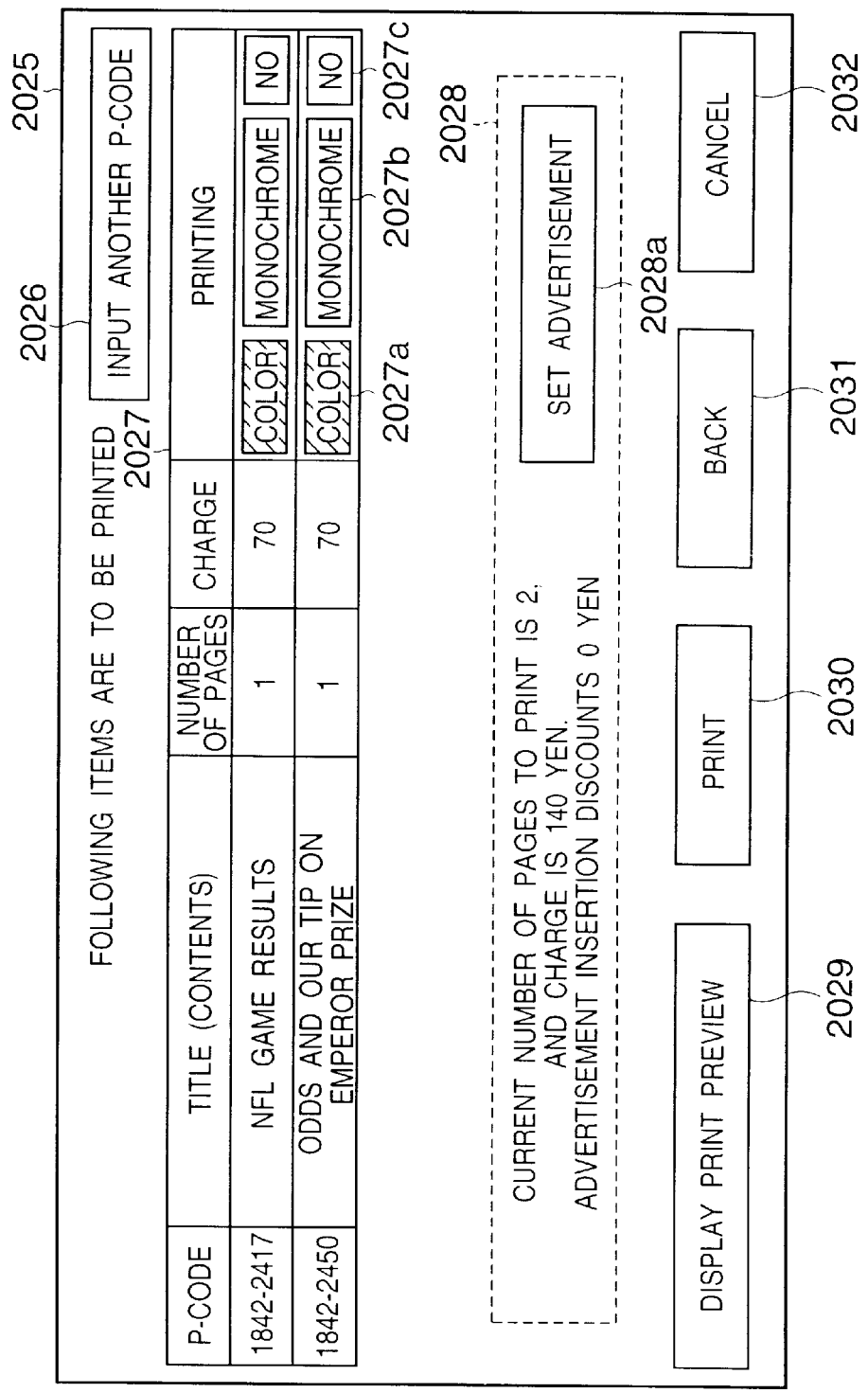
FIG. 80 is a view showing still another example of the display window displayed on the touch panel 104 of the P service terminal 100 of this embodiment.

When the button 2028a in the window 2025 shown in FIG. 80 is pressed, a window 2038 shown in FIG. 82 is displayed.

In the window 2038, insertion conditions of advertisements to be printed together with information to be printed are set. In the window 2038, the insertion condition set item group (in this embodiment, "print in free space of article", "print on lower surface", and "print another page") is displayed. The presence/absence of execution of each item can be designated by a button group 2039. A button 2040 is pressed to acknowledge the set insertion conditions. A button 2041 is pressed to cancel the set insertion conditions.

In the window 2038, the user can set the advertisement insertion conditions. Instead, the P service server 200 may search for an appropriate advertisement for information to be printed such that the charge for printing the information to be printed is nullified, and generate print data constructed by the searched advertisement and information to be printed. Advertisement search processing by the P service server 200 will be described later.

Figure 83:
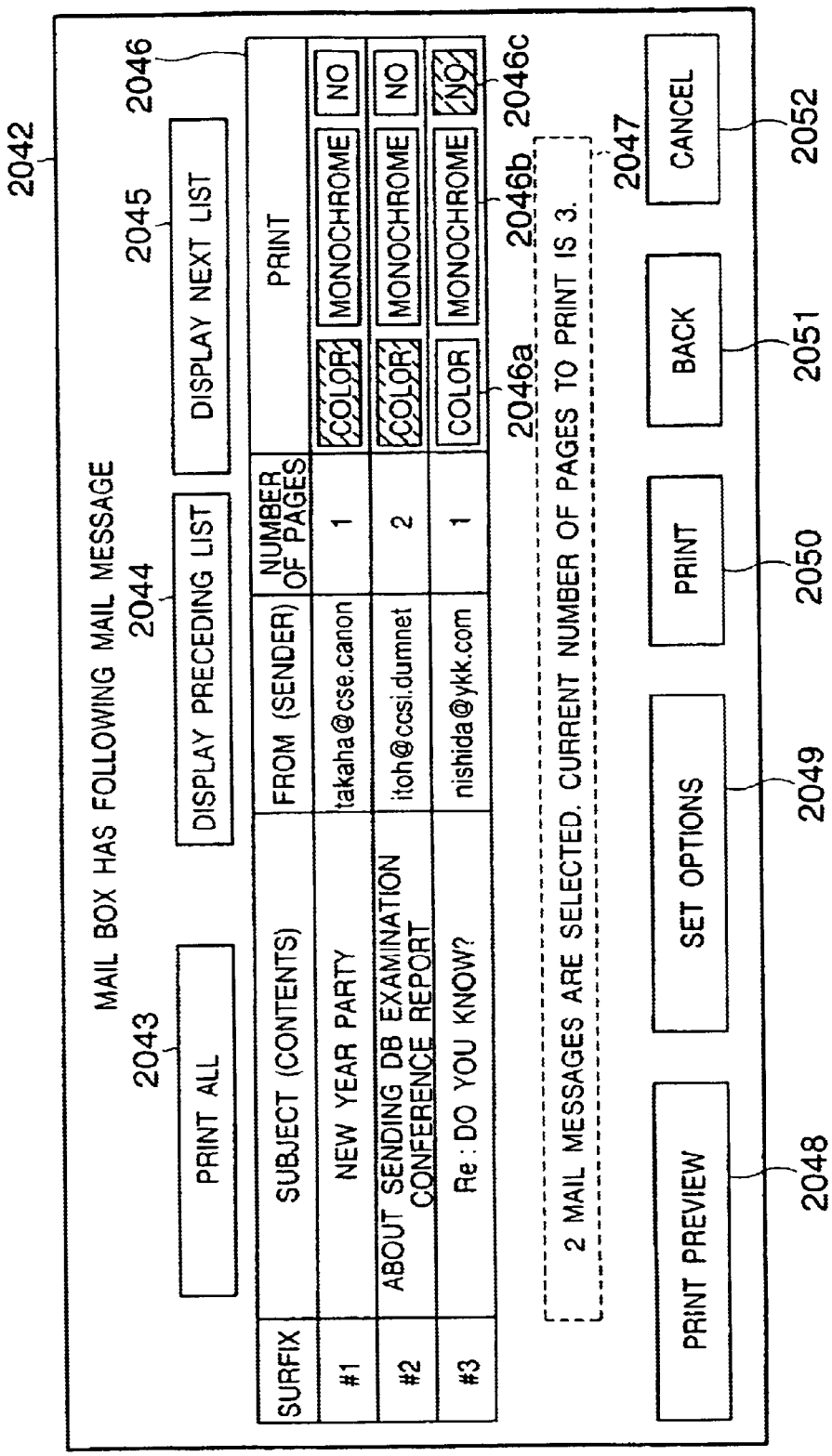
FIG. 83 is a view showing still another example of the display window displayed on the touch panel 104 of the P service terminal 100 of this embodiment.

Next, a window for executing the mail service, which is displayed when the input P-code is "telephone number#Subcode", and a window for executing the distribution service (reception of registered information), which is displayed when the input P-code is "telephone number-Subcode", will be described with reference to FIG. 83.

In this embodiment, it is determined, by identifying a predetermined symbol contained in the P-code, whether the surfix portion attached to the telephone number is "#Subcode", "- Subcode", or "##Subcode", thereby determining the service to be executed: the mail service, distribution service, or personal information service. Instead, the type of service to be executed may be determined by the P service server 200 on the basis of the input personal P-code by directly looking up the P-code table shown in FIGS. 10, 11, and 12, and on the basis of the determination result, a window to be displayed (an operation window associated with the service) may be determined.

A window for executing the mail service will be described with reference to FIG. 83.

A window 2042 is a window for displaying the contents of user's mail corresponding to a personal P-code represented by the input P-code. More specifically, in an area 2046, the surfix (#n, n: 0, 1, 2, . . . ) in an input P-code, the subject of mail corresponding to the P-code, sender, the number of pages, printing conditions (in this embodiment, color or monochrome printing and the presence/absence of printing can be particularly designated as printing conditions, for which buttons 2046a to 2046c are prepared) are displayed.

In an area 2047, the printing contents of mail to be printed in the area 2046 are displayed. In addition to this area, the button 2028a in the window 2025 shown in FIG. 80 may be displayed to allow the user to set insertion of an advertisement to the mail, or an appropriate advertisement for the mail to be printed may be searched by the P service server 200.

Figure 84:
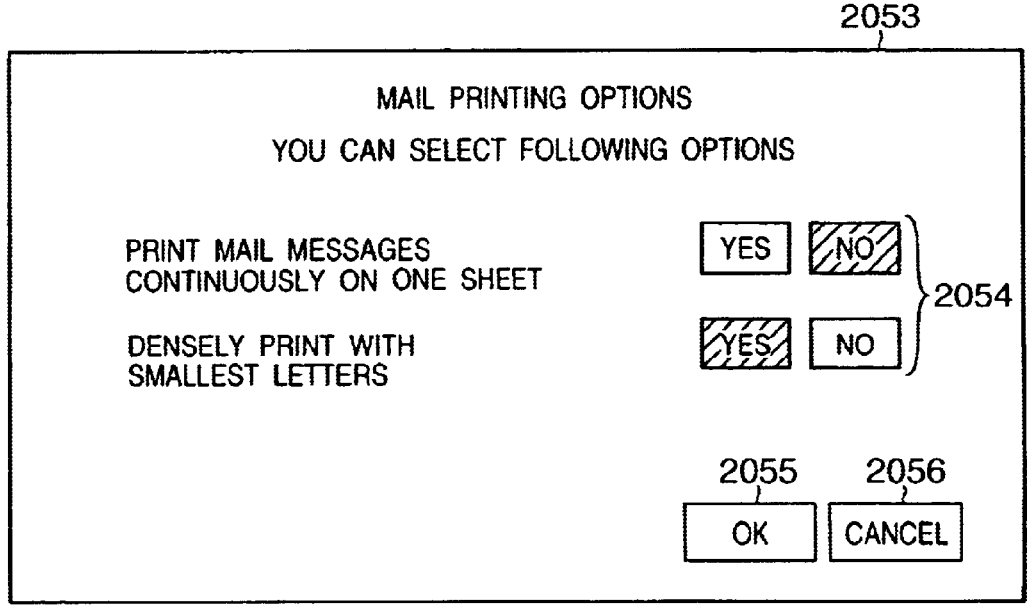
FIG. 84 is a view showing still another example of the display window displayed on the touch panel 104 of the P service terminal 100 of this embodiment.

A button 2048 is pressed to display a print preview of mail to be printed. When the button 2048 is pressed, the window shown in FIG. 81 described above is displayed. A button 2049 is pressed to set print options for mail to be printed. When the button 2049 is pressed, a window shown in FIG. 84 is displayed to set print options. This window will be described later in detail. A button 2050 is pressed to print mail to be printed. A button 2051 is pressed to display the preceding window. A button 2052 is pressed to cancel contents set in the window 2042.

A button 2043 is pressed to print all mail messages managed by the P service server 200. A button 2044 is pressed to display, of mail messages out of the area 2046, the contents of mail messages with smaller surfix numbers. A button 2045 is pressed to display, of mail messages out of the area 2046, the contents of mail messages with larger surfix numbers.

In this embodiment, when the surfix number (#n) attached to the telephone number, i.e., the input P-code, is "0", mail messages corresponding to the surfix number are displayed as many as possible, as shown in the area 2046. If the surfix has a number other than "0", a mail message corresponding to a surfix matching the number is displayed. In a window for executing the distribution service (reception of registered information), which is displayed when the input P-code is "telephone number-Subcode", in the area 2046, display of contents of information registered in the distribution service is controlled in accordance with the surfix number, as in displaying the contents of mail. Although not illustrated, a function of deleting mail without printing the mail information is provided.

The window 2053 is a window for setting print options of mail to be printed. As shown in FIG. 84, an item group settable as print options (in this embodiment, "continuously print mail messages on one paper sheet" and "densely print with smallest letters") are displayed in the window 2053. The presence/absence of execution of each item can be designated by a button group 2054. A button 2055 is pressed to acknowledge the set print options. A button 2056 is pressed to cancel the set print options.

Figure 85:
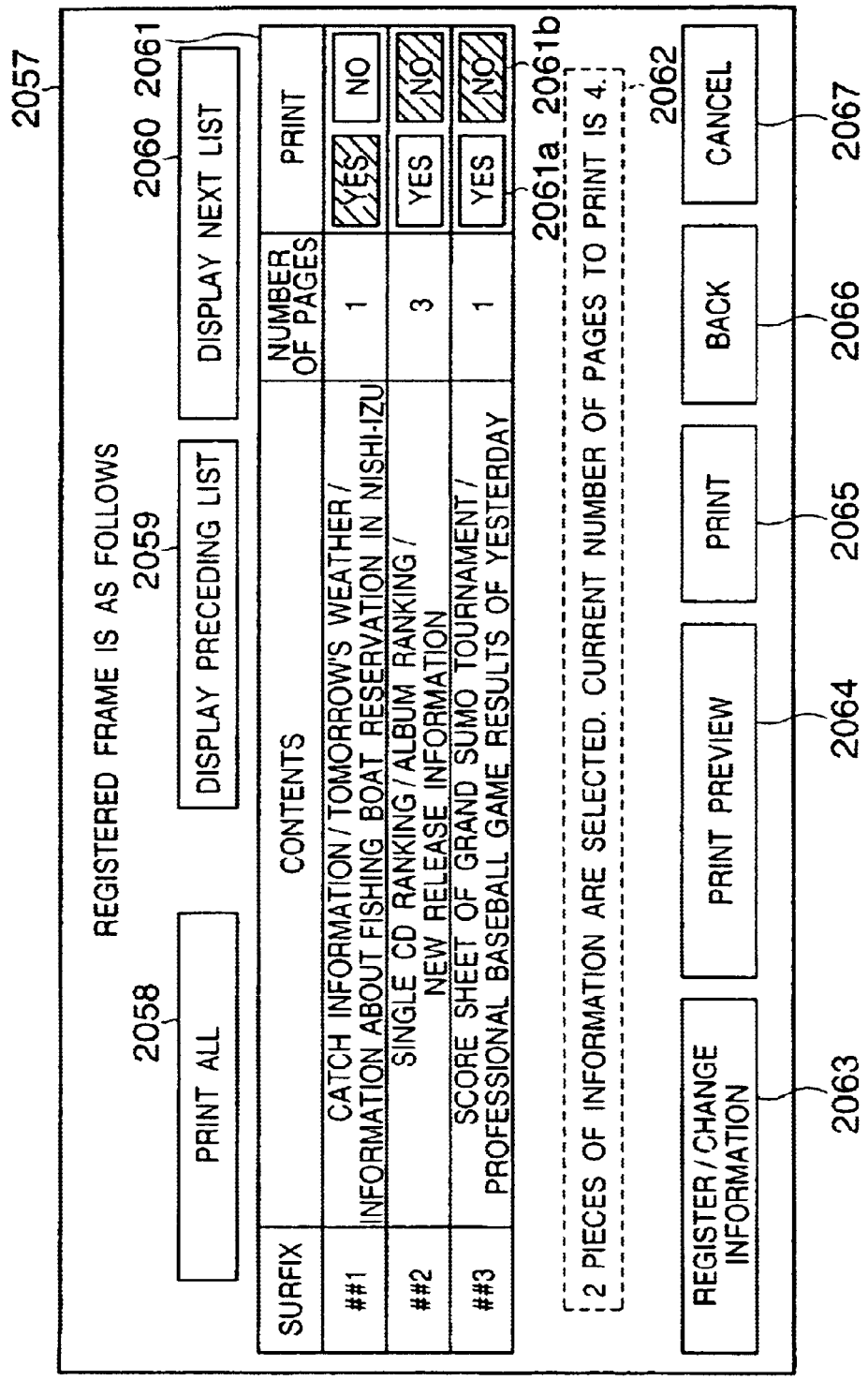
FIG. 85 is a view showing still another example of the display window displayed on the touch panel 104 of the P service terminal 100 of this embodiment.

A window for executing the personal information service, which is displayed when the input P-code is "telephone number##Subcode", will be described next with reference to FIG. 85.

When the input P-code represents the personal information service, the contents of the personal information service are displayed in a window 2057. More specifically, in an area 2061, surfixes (##m, m: 0, 1, 2, ... ) in the input P-codes, contents of information corresponding to the P-codes, the number of pages, and buttons 2061*a* and 2061*b* for setting the presence/absence of printing are displayed.

In an area 2062, the print contents of information to be printed in the area 2061 are displayed.

An information group managed by a surfix (##m) is called a frame.

A button 2063 is pressed to register a new frame or change the contents of a registered frame. When the button 2063 is pressed, a window shown in FIG. 86, which is used to register/change information, is displayed. This window will be described later in detail. A button 2064 is pressed to display a print preview of a frame to be printed. A button 2065 is pressed to print a frame to be printed. A button 2066 is pressed to display the preceding window. A button 2067 is pressed to cancel contents set in the window 2057.

A button 2058 is pressed to print all frames managed by the P service server 200. A button 2059 is pressed to display, of frames out of the area 2061, the contents of frames with smaller surfix numbers. A button 2060 is pressed to display, of frames out of the area 2061, the contents of frames with larger surfix numbers.

In this embodiment, when the surfix number (##m) attached to the telephone number, i.e., the input P-code, is "0", as many frames as possible corresponding to the surfix number are displayed, as shown in the area 2061. If the surfix has a number other than "0", a frame corresponding to a surfix matching the number is displayed.

Figure 86:
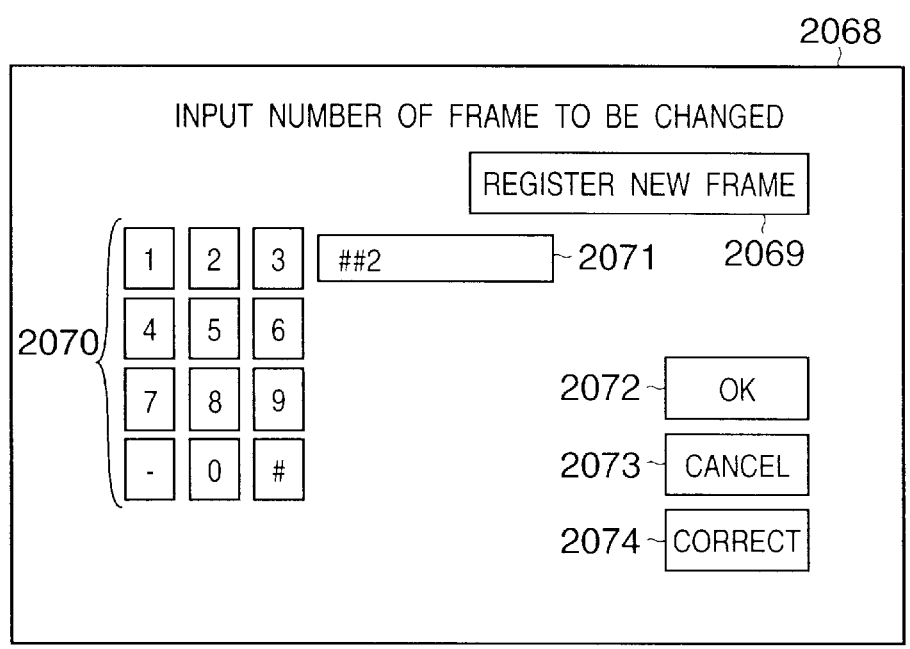
FIG. 86 is a view showing still another example of the display window displayed on the touch panel 104 of the P service terminal 100 of this embodiment.

When the button 2063 is pressed, a window 2068 shown in FIG. 86 is displayed.

The window 2068 has a ten-key group 2070 for designating a surfix (##m) to be registered or changed, and an area 2071 for displaying the input surfix (##m). Especially, to register a new frame, a button 2069 is pressed. A button 2072 is pressed to acknowledge the input surfix (##m) A button 2073 is pressed to cancel the input surfix (##m) A button 2074 is pressed to correct the input surfix (##m)

Figure 87:
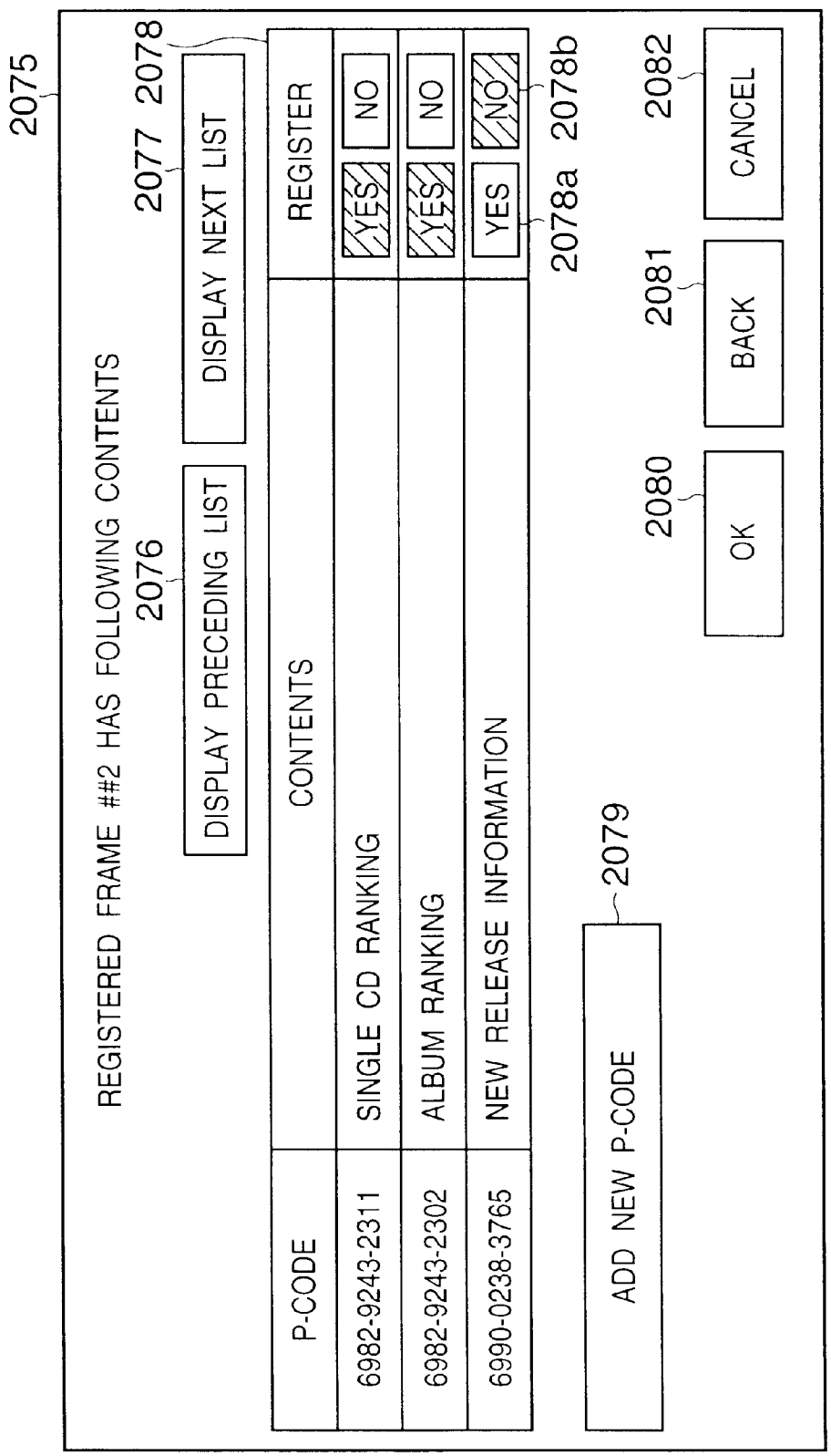
FIG. 87 is a view showing still another example of the display window displayed on the touch panel 104 of the P service terminal 100 of this embodiment.

When the button 2072 or 2069 is pressed, a window 2075 shown in FIG. 87 is displayed.

The window 2075 is a window for displaying the contents of an information group managed by a frame corresponding to the surfix (##m) input to the area 2071. More specifically, P-codes managed by the frame, contents corresponding to the P-codes, and buttons 2078*a* and 2078*b* for setting the presence/absence of registration are displayed in an area 2078.

A button 2079 is pressed to register another information (P-code) in this frame. When the button 2079 is pressed, the above-described window for registering a P-code, shown in FIG. 76, is displayed. When the ten-key group 2069 shown in FIG. 86 is pressed to register a new frame, the area 2078 is blank because no information is managed by the frame corresponding to the input surfix (##m).

A button 2080 is pressed to acknowledge the registered state of information of the frame to be registered. A button 2081 is pressed to display the preceding window. A button 2082 is pressed to cancel contents set in the window 2075.

Figure 88:
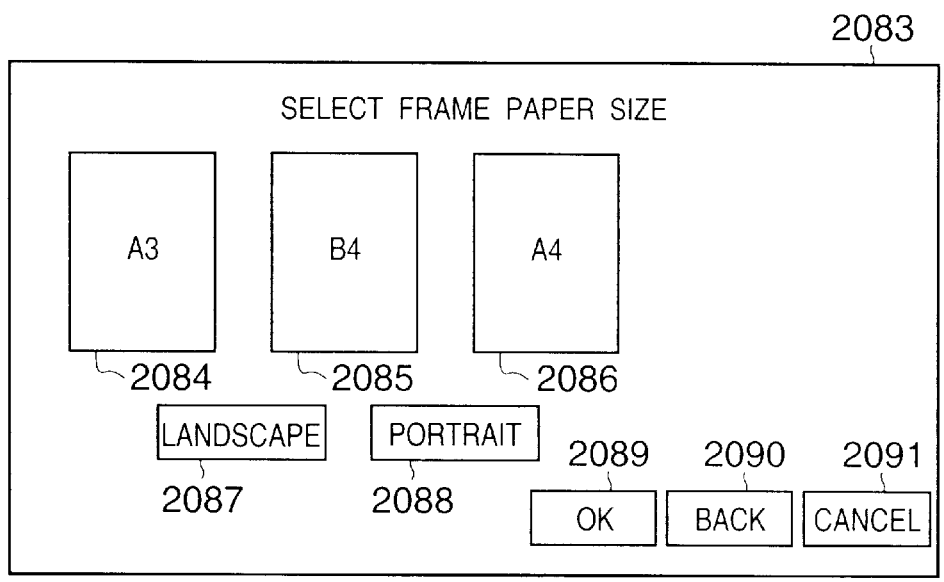
FIG. 88 is a view showing still another example of the display window displayed on the touch panel 104 of the P service terminal 100 of this embodiment.

When the button 2080 is pressed, a window 2083 shown in FIG. 88 is displayed.

The window 2083 is a window for setting the size of a paper sheet used to print a registered frame. In areas 2084, 2085, and 2086, the sizes of paper sheets usable for printing are displayed. When the user presses the area of a desired paper size, display of the pressed area is inverted to notify the user of designation of the paper size. Buttons 2087 and 2088 are used to set the direction (landscape or portrait) of the paper sheet to be used. A button 2089 is pressed to acknowledge the designated size and direction of the paper sheet to be used for printing. A button 2090 is pressed to display the preceding window. A button 2091 is pressed to cancel contents set in the window 2083.

Windows for executing the distribution service (registration of information) which is executed when the button 2004 in the initial window 2000 shown in FIG. 75 is pressed will be described sequentially.

Figure 89:
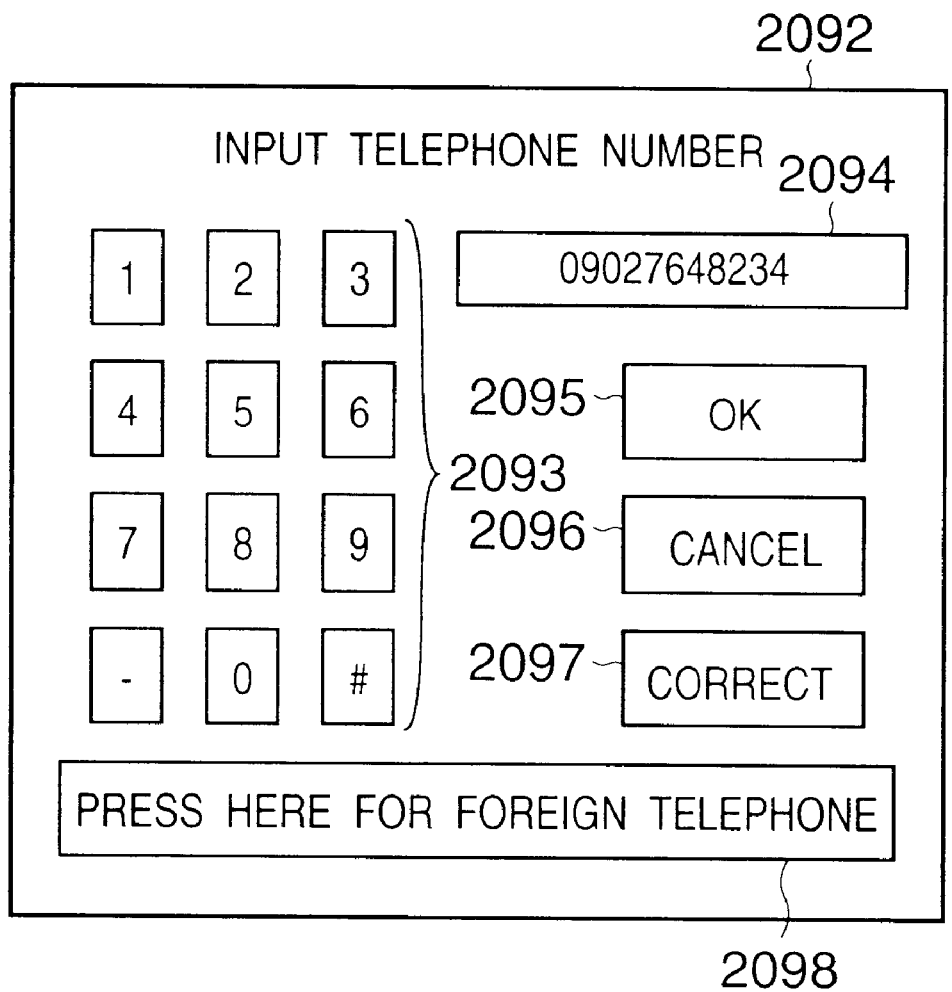
FIG. 89 is a view showing still another example of the display window displayed on the touch panel 104 of the P service terminal 100 of this embodiment.

When the button 2004 in the initial window 2000 is pressed, a window 2092 shown in FIG. 89 is displayed.

The window 2092 is a P-code input window in which a P-code (user's telephone number) for executing the distribution service (registration of information) is input.

The window 2092 has a ten-key group 2093. A P-code is input using the keys of the ten-key group 2093. The input P-code is displayed in an area 2094. To acknowledge the input P-code, a button 2095 is pressed. To cancel the input P-code, a button 2096 is pressed to erase the P-code displayed in the area 2094. To correct the input P-code, a button 2097 is pressed to correct the P-code to be corrected using a cursor (not shown) on the area 2094. A button 2098 is pressed to input a foreign P-code.

Figure 90:
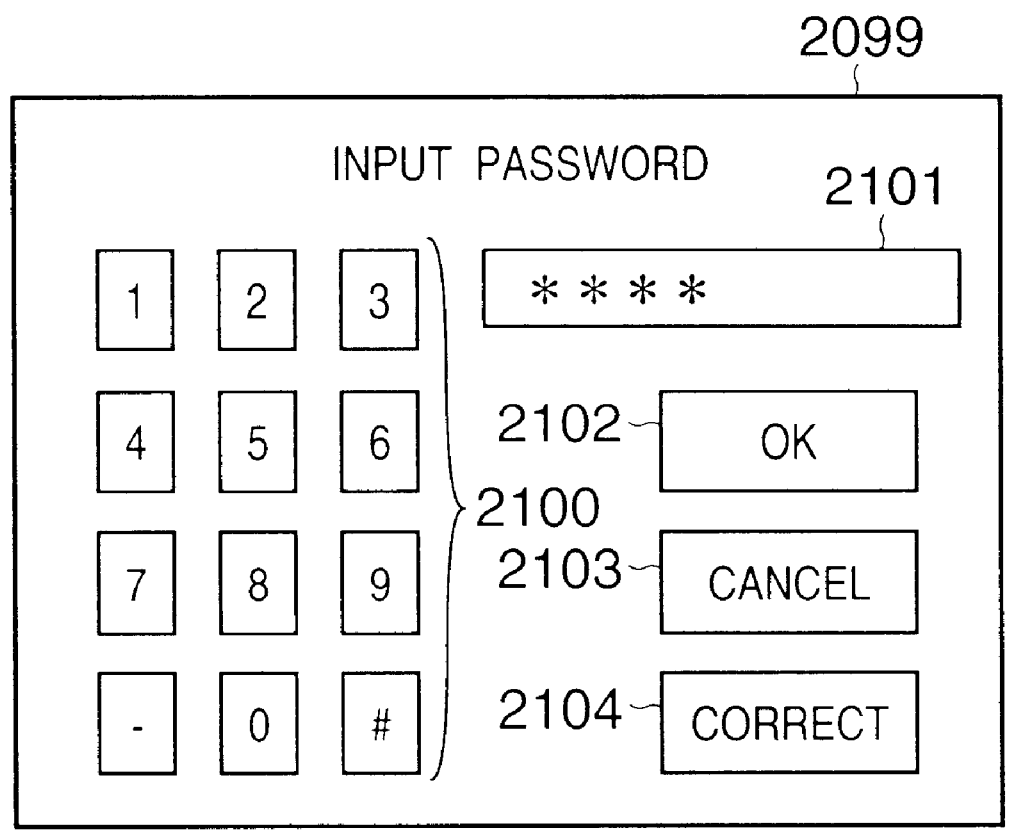
FIG. 90 is a view showing still another example of the display window displayed on the touch panel 104 of the P service terminal 100 of this embodiment.

When the button 2095 is pressed, a window 2099 shown in FIG. 90 is displayed. If the input P-code has expired, a window (not shown) for notifying the user of it is displayed.

Constituent elements 2100 to 2104 in the window 2099 and functions thereof correspond to those of the constituent elements 2013 to 2017 in the window 2012 shown in FIG. 77, respectively, and a detailed description thereof will be omitted.

Figure 91:
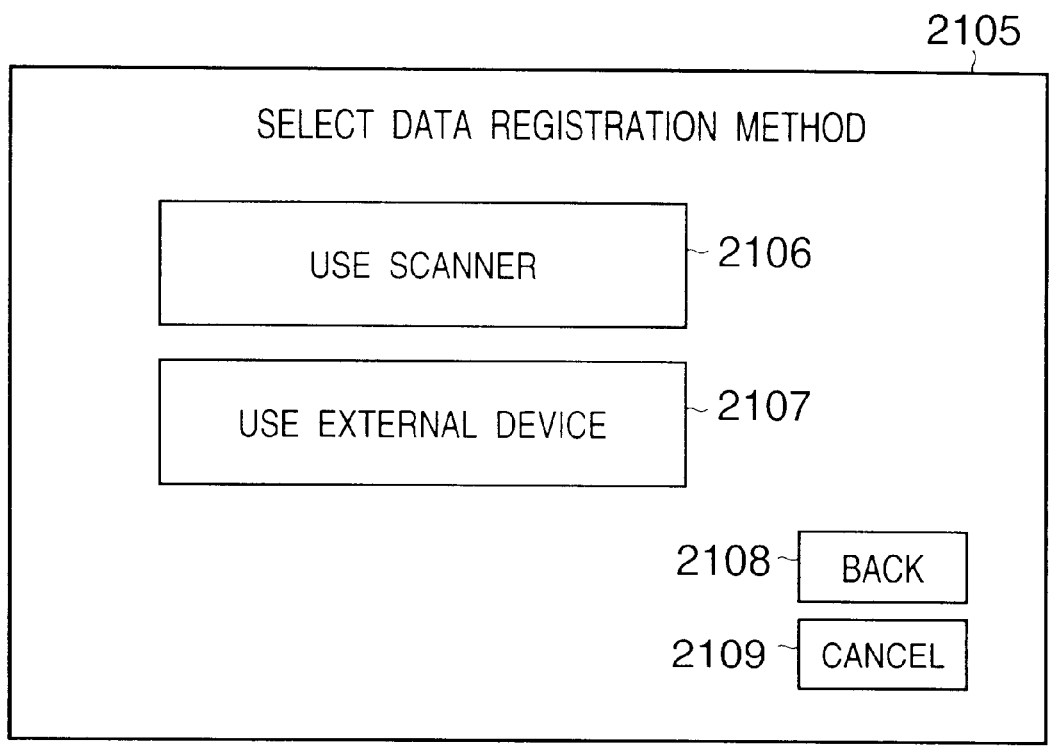
FIG. 91 is a view showing still another example of the display window displayed on the touch panel 104 of the P service terminal 100 of this embodiment.

When the button 2102 in the window 2099 shown in FIG. 90 is pressed, a window 2105 shown in FIG. 91 is displayed.

The window 2105 is a window for selecting an information registration method in the distribution service (registration of information). A button 2106 is pressed to register information using a scanner. A button 2107 is pressed to register information using an external device. When one of the buttons is pressed, a window corresponding to the button is displayed. These windows will be described later in detail. A button 2108 is pressed to display the preceding window. A button 2109 is pressed to cancel registration of information.

When the button 2106 is pressed, a window 2110 shown in FIG. 92 is displayed.

Figure 93:
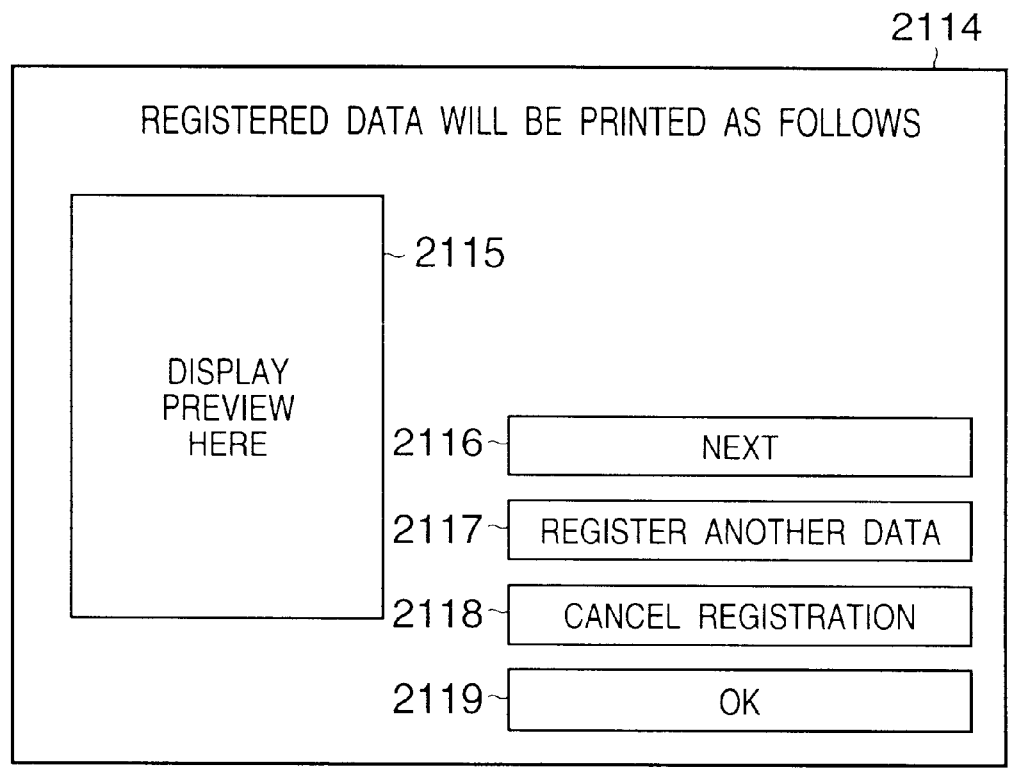
FIG. 93 is a view showing still another example of the display window displayed on the touch panel 104 of the P service terminal 100 of this embodiment.

The window 2110 is a window for instructing the user to set an original to be registered on the scanner 102. A button 2111 is pressed to execute an input operation for the set original. When the button 2111 is pressed, a window 2114 shown in FIG. 93 is displayed. A button 2112 is pressed to display the preceding window. A button 2113 is pressed to cancel the input operation for the set original.

When the button 2107 in the window 2105 shown in FIG. 91 is pressed, the same window as the dialog box shown in FIG. 40 is displayed, so information can be registered using an external device such as the disk unit 108 or infrared communication section 105. When information to be registered is designated, and "next" is selected, the window 2114 shown in FIG. 93 is displayed. The information to be registered can be either an image or character information.

The window 2114 shown in FIG. 93 is a window for displaying a preview of information to be registered. In an area 2115, a preview of information to be registered is displayed. A button 2116 is pressed to display a preview of information next to the information that is currently being displayed. A button 2117 is pressed to register another information. When this button is pressed, the window shown in FIG. 91 is displayed. A button 2118 is pressed to cancel registration of the information displayed in the area 2115. A button 2119 is pressed to register the information displayed in the area 2115.

Figure 94:
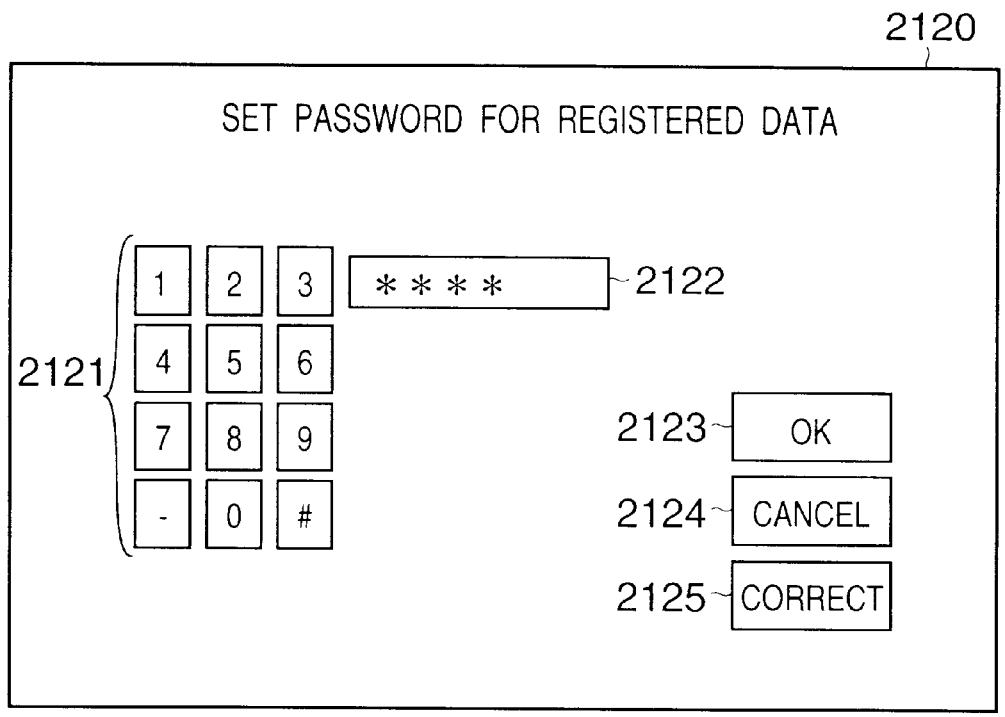
FIG. 94 is a view showing still another example of the display window displayed on the touch panel 104 of the P service terminal 100 of this embodiment.

When the button 2119 is pressed, a window 2120 shown in FIG. 94 is displayed.

The window 2120 is a window for setting a password requested when another user prints the information to be registered. This window has a ten-key group 2121, and a desired password is input using the keys of the ten-key group 2121. As the password is input, the password is displayed in an area 2122. After completion of input, to acknowledge the input password, a button 2123 is pressed. To cancel the input password, a button 2124 is pressed. To correct the input password, a button 2125 is pressed to correct the password to be corrected using a cursor (not shown) on the area 2122.

Figure 95:
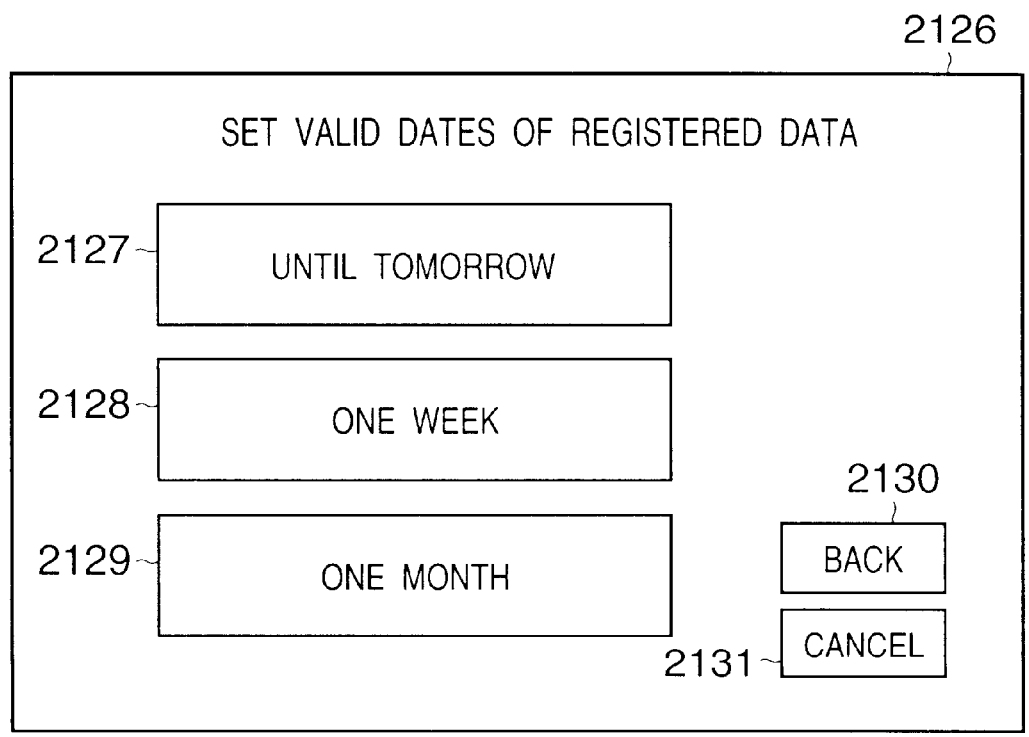
FIG. 95 is a view showing still another example of the display window displayed on the touch panel 104 of the P service terminal 100 of this embodiment.

When the button 2123 is pressed, a window 2126 shown in FIG. 95 is displayed.

The window 2126 is a window for setting the valid dates of the information to be registered. A button 2127 is pressed to validate the information until tomorrow. A button 2128 is pressed to validate the information for one week. A button 2129 is pressed to validate the information for one month. A button 2130 is pressed to display the preceding window. A button 2131 is pressed to cancel setting of the valid dates of the information to be registered.

When one of the buttons 2127, 2128, or 2129 is pressed, a window 2132 shown in FIG. 96 is displayed.

The window 2132 is a window for causing the user to confirm the registered contents of the information to be registered. More specifically, in an area 2133, the P-code, password, data amount, valid dates corresponding to the information to be registered are displayed. A button 2134 is pressed to acknowledge the registered contents of the information to be registered. A button 2135 is pressed to display the preceding window. A button 2136 is pressed to cancel the registered contents of the information to be registered. When the registered contents of the information to be registered are acknowledged, the number of registered data set in the user information table shown in FIG. 9 for the distribution service is incremented by one, and the P-code (P-code in the form of "telephone number-Subcode") attached to the registered information is added to the P-code list of the distribution service information. In addition, the information displayed in the area 2133 is registered in the distribution information P-code table shown in FIG. 11.

Figure 97:
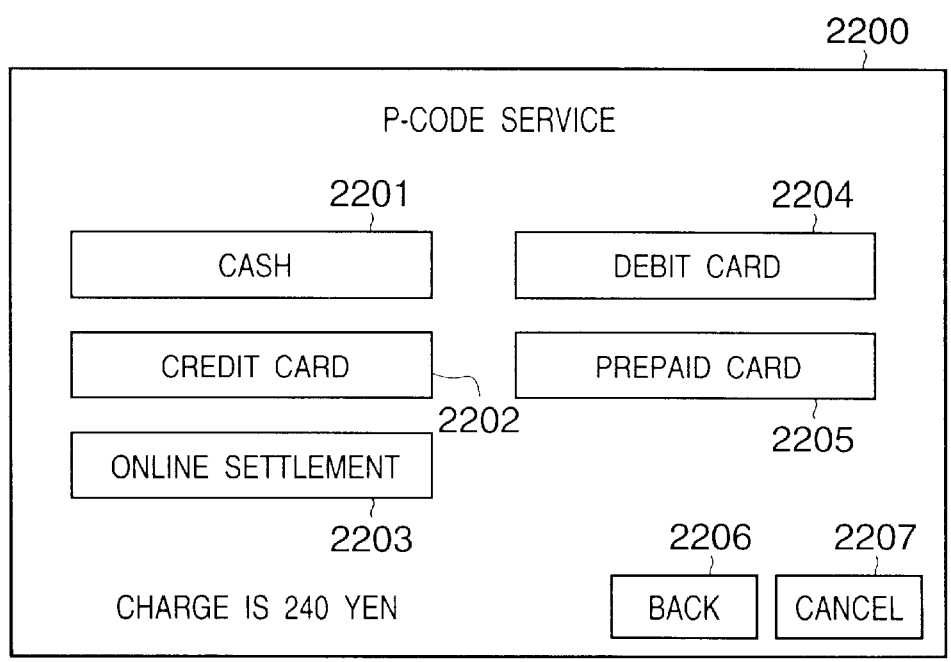
FIG. 97 is a view showing still another example of the display window displayed on the touch panel 104 of the P service terminal 100 of this embodiment.

A window 2200 shown in FIG. 97 is displayed in accordance with the window displayed to execute various services including the information service, mail service, distribution service (reception of registered information), personal information service, and distribution service (registration of information).

The window 2200 is a window for selecting a settlement method for a charge generated when the information service, mail service, distribution service (reception of registered information), personal information service, or distribution service (registration of information) is executed. The charge is displayed at the lower left side of the window. The user presses a button 2201 to pay the charge in cash, a button 2202 to pay using a credit card, a button 2203 to pay by online settlement, a button 2204 to pay using a debit card, or a button 2205 to pay using a prepaid card. A window (not shown) necessary for settlement is displayed as one of the buttons is pressed.

A button 2206 is pressed to display the preceding window. A button 2207 is pressed to cancel execution of selection of the settlement method.

The above-described windows displayed to execute various services including the information service, mail service, distribution service (reception of registered information), personal information service, and distribution service (registration of information) are examples of main windows displayed in executing operation. In the process of operation, various windows including a window for causing the user to confirm displayed contents and a window for input are appropriately displayed.

Next, processing flows for executing various services including the information service, mail service, distribution service (reception of registered information), personal information service, and distribution service (registration of information) will be described sequentially.

In the following processing flows, the P service server 200 looks up the tables shown in FIGS. 7 to 15 and transmits information corresponding to a P-code received from the P service terminal 100 or data (property data or preview image) necessary for the information to the P service terminal 100. In addition, in accordance with data such as a print instruction for information corresponding to a P-code transmitted from the P service terminal 100, the contents of the tables shown in FIGS. 7 to 15 are updated.

A processing flow for executing the information service will be described first with reference to FIGS. 98A and 98B.

Figure 98A:
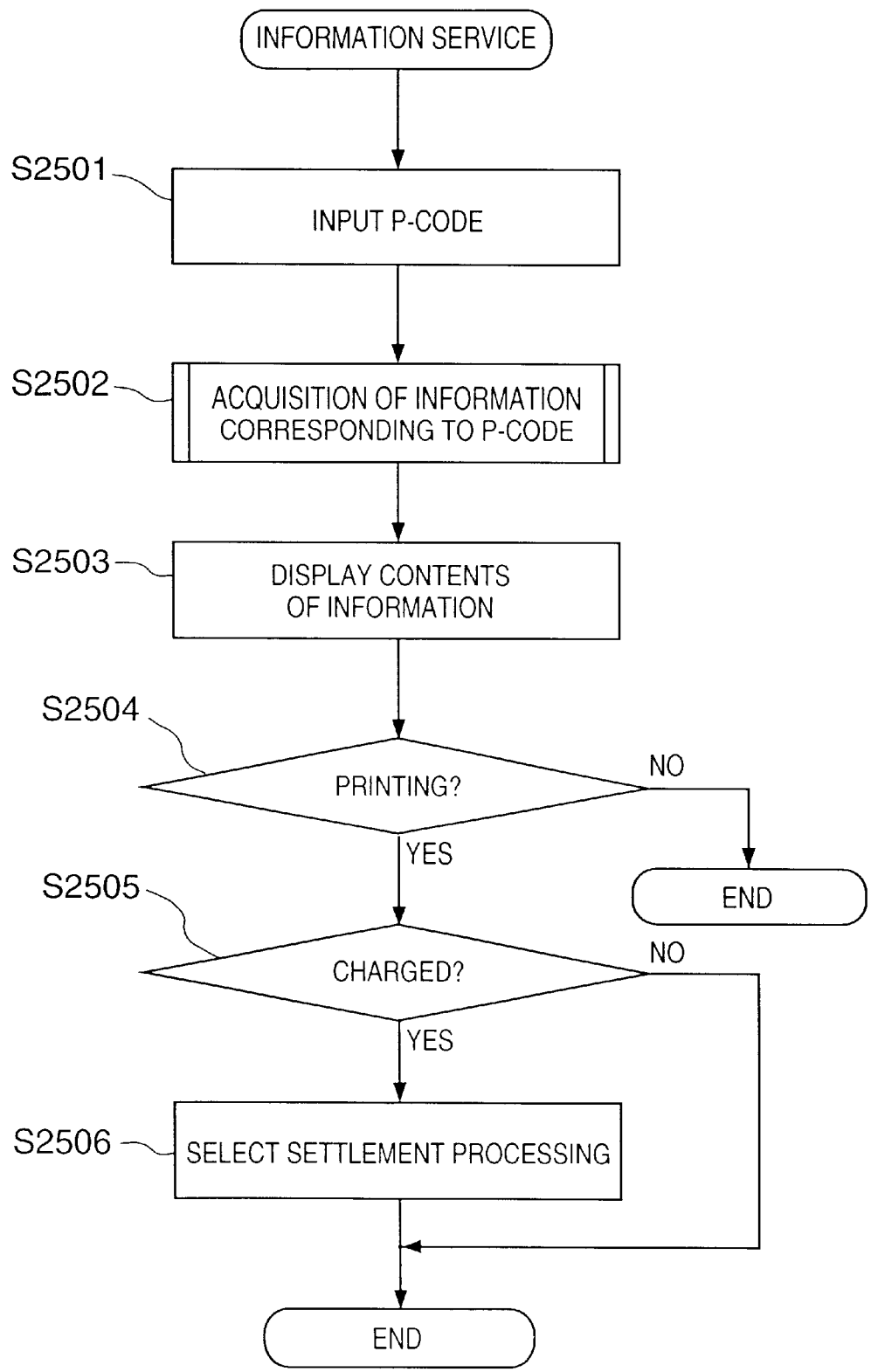
FIG. 98A is a flow chart showing a processing flow for executing the information service of this embodiment.
Figure 98B:
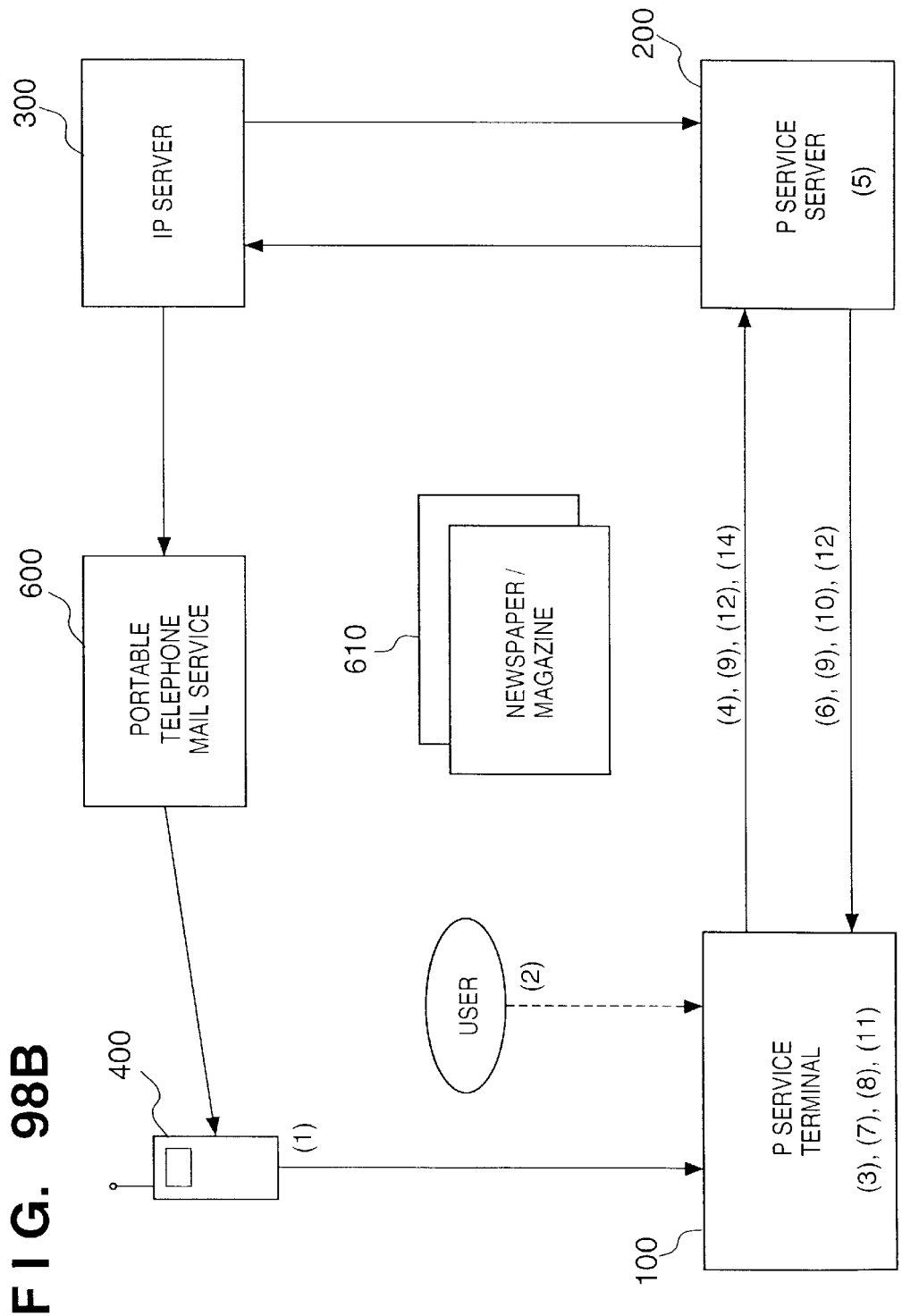
FIG. 98B is a view showing the processing sequence in a service system for executing the information service of this embodiment.

FIG. 98A is a flow chart showing a processing flow for executing the information service of this embodiment. FIG. 98B is a view showing the processing sequence in the service system for executing the information service of this embodiment.

In step S2501, (1) the user acquires a P-code by the portable terminal 400. (2) The user moves to the P service terminal 100 while keeping the P-code stored in the portable terminal 400. (3) The P-code is input to the P service terminal 100 (FIGS. 75, 76, 78, and 79). (4) P service terminal 100 transmits the input P-code and the terminal properties (e.g., location of installation and printer performance) of the P service terminal 100 itself to the P service server 200.

In step S2502, (5) the P service server 200 acquires information corresponding to the received P service server 200. In step S2503, (6) the P service server 200 transmits the contents of the information, including the property data such as the service type, preview image, and the number of pages, to the P service terminal 100. (7) The P service terminal 100 displays the received contents of the information, including the property data, preview image, and the number of pages, on the touch panel 104 (FIG. 80). If a print preview or setting for advertisements is instructed, corresponding windows (FIGS. 81 and 82) are appropriately displayed to receive inputs from the user.

In step S2504, (8) it is determined whether printing of the displayed information is instructed. (9) If cancel of printing is instructed (NO in step S2504), the P service terminal 100 transmits a message representing that cancel is instructed to the P service server 200, and processing is ended. On the other hand, (9) when printing is instructed (YES in step S2504), the P service terminal 100 requests the P service server 200 to prepare print data of the information corresponding to the P-code, and the flow advances to step S2505.

In step S2505, it is determined whether the information to be printed is charged for. (10) If the information is free (NO in step S2505), the flow advances to the next processing. (11) If the information is charged for (YES in step S2505), the flow advances to step S2506 to receive the settlement method for settlement processing in printing from the user. (12) In accordance with the settlement method, the P service terminal 100 and P service server 200 exchange necessary data (FIG. 97). The P service terminal 100 receives the print data of the information to be printed from the P service server 200 and prints the data.

A processing flow for executing the mail service will be described next with reference to FIG. 99A.

Figure 99A:
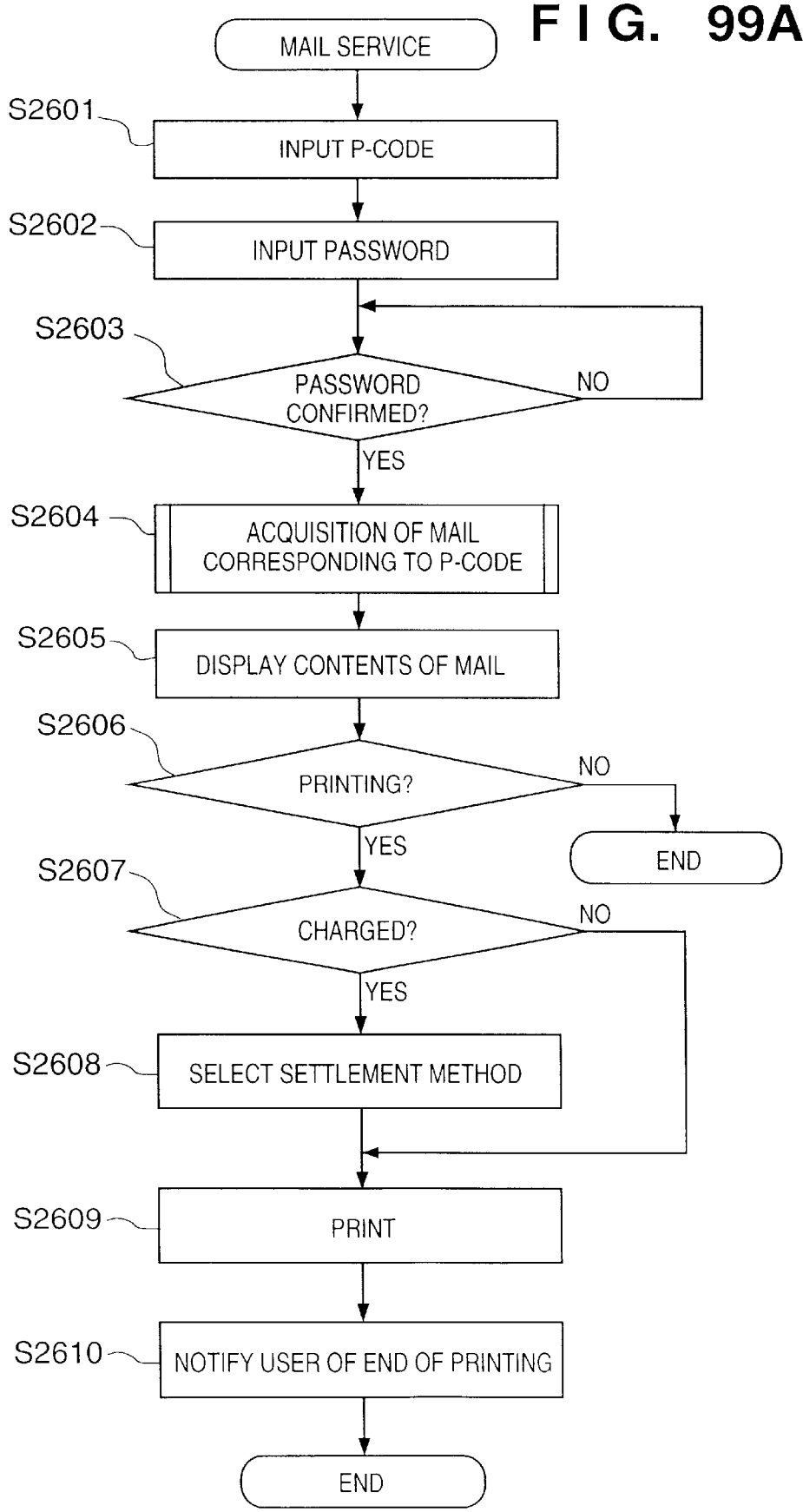
FIG. 99A is a flow chart showing a processing flow for executing the mail service of this embodiment.
Figure 99B:
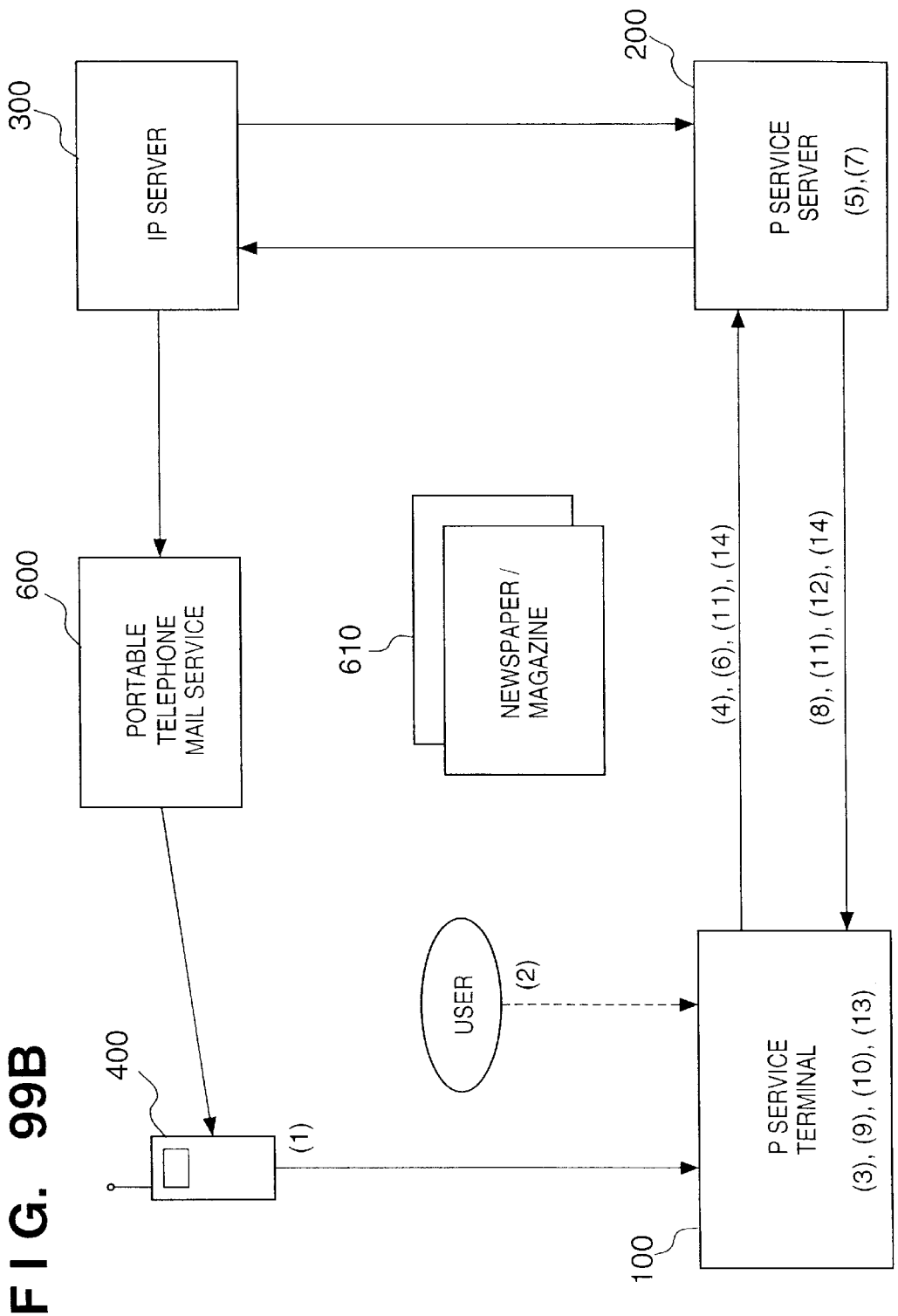
FIG. 99B is a view showing the processing sequence in the service system for executing the mail service of this embodiment.

FIG. 99A is a flow chart showing a processing flow for executing the mail service of this embodiment. FIG. 99B is a view showing the processing sequence in the service system for executing the mail service of this embodiment. Assume that mail information to be output is transferred from the IP server (mail server) to the P service server in advance.

In step S2601, (1) the user acquires a P-code by the portable terminal 400. (2) The user moves to the P service terminal 100 while keeping the P-code stored in the portable terminal 400. (3) The user inputs the P-code to the P service terminal 100 (FIGS. 75, 76, 78, and 79). (4) The P service terminal 100 transmits the input P-code and the terminal properties (e.g., location of installation and printer performance) of the P service terminal 100 itself to the P service server 200.

In step S2602, (5) when the P service server 200 recognizes that the received P-code is a P-code for the mail service, (6) the P service terminal 100 requests the user to input the password (FIG. 77). In step S2603, (7) the password is confirmed. If the password is not correct (NO instep S2603), the user is requested to re-input the password. However, if an incorrect password is input a plurality of number of times, processing is ended. If the password is correct (YES in step S2603), the flow advances to step S2604.

In step S2604, (8) the P service server 200 acquires mail corresponding to the received P-code. In step S2605, the P service server 200 transmits contents of the acquired mail, including property data (sender and subject), to the P service terminal 100. (9) The P service terminal 100 displays the received contents of mail including the property data on the touch panel 104 (FIG. 83). If a print preview or option setting is instructed, corresponding windows (FIG. 81 and 84) are appropriately displayed to receive inputs from the user.

In step S2606, it is determined whether printing of the displayed mail is instructed. (11) If cancel of printing is instructed (NO in step S2606), the P service terminal 100 transmits a message representing that cancel is instructed to the P service server 200, and processing is ended. On the other hand, (11) when printing is instructed (YES in step S2606), the P service terminal 100 requests the P service server 200 to prepare print data of the mail corresponding to the P-code, and the flow advances to step S2607.

In step S2607, it is determined whether the mail to be printed is charged for. (12) If the mail is free (NO in step S2607), the flow advances to the next processing. (13) If the mail is charged for (YES in step S2607), the flow advances to step S2608 to receive the settlement method for settlement processing in printing from the user. (14) In accordance with the settlement method, the P service terminal 100 and P service server 200 exchange necessary data (FIG. 97). In step S2609, the P service terminal 100 receives the print data of the mail to be printed from the P service server 200 and prints the data. When printing is ended in step S2610, the printed mail information is automatically deleted from the P service server upon transmitting a print end notification to the P service server.

A processing flow for executing the distribution service (reception of registered information) will be described with reference to FIG. 10A.

Figure 100A:
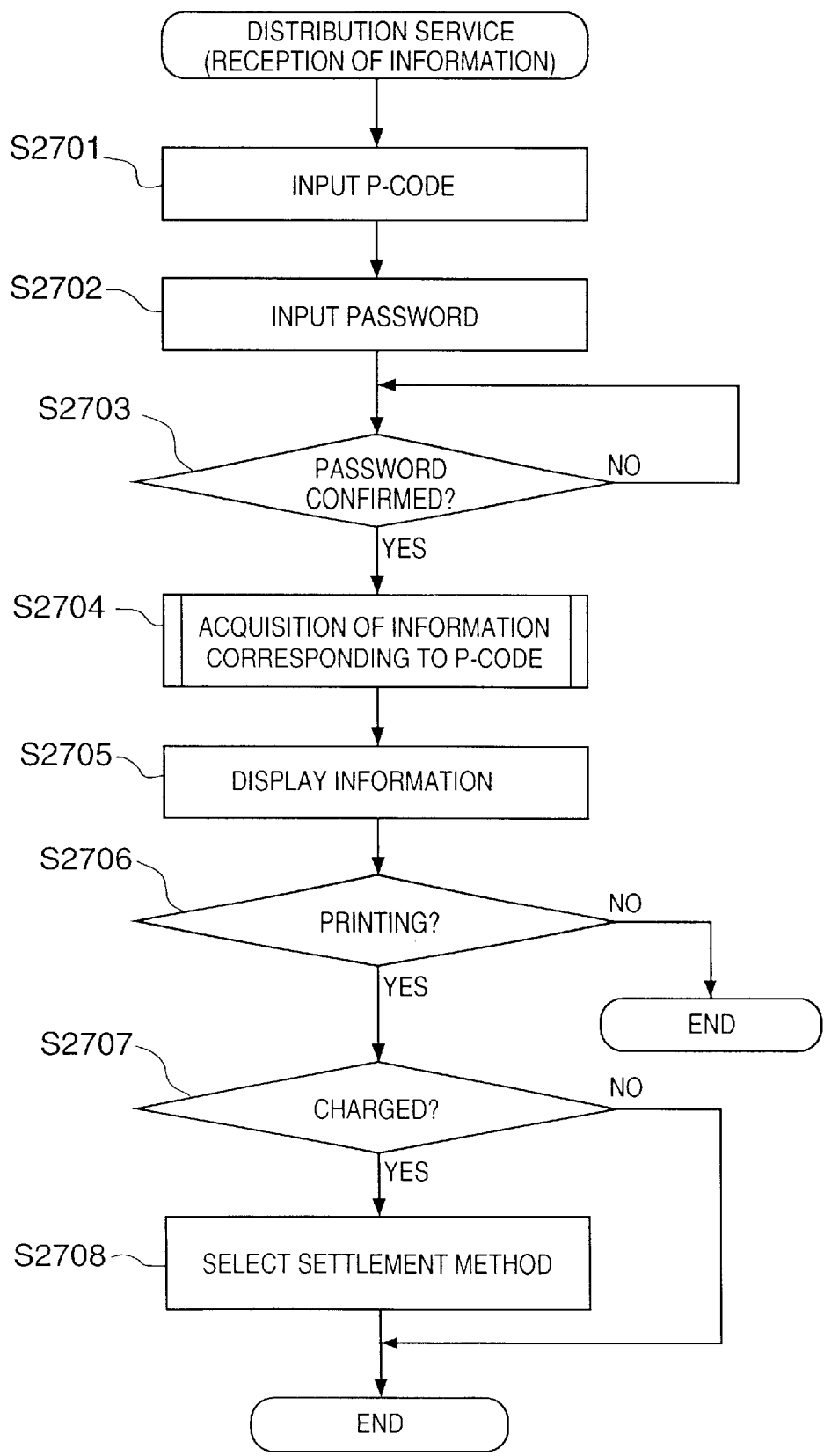
FIG. 100A is a flow chart showing a processing flow for executing the distribution service (reception of registered information) of this embodiment.

FIG. 100A is a flow chart showing a processing flow for executing the distribution service (reception of registered information) of this embodiment. FIG. 100B is a view showing the processing sequence in the service system for executing the distribution service of this embodiment.

In step S2701, (1) the user acquires a P-code by the portable terminal 400. (2) The user moves to the P service terminal 100 while keeping the P-code stored in the portable terminal 400. (3) The P-code is input to the P service terminal 100 (FIGS. 75 and 77 to 79). (4) The P service terminal 100 transmits the input P-code and the terminal properties (e.g., location and installation and printer performance) of the P service terminal 100 itself to the P service server 200.

In step S2702, (5) when the P service server 200 recognizes that the received P-code is a P-code for the distribution service (reception of registered information), (6) the P service terminal 100 requests the user to input the password (FIG. 77). In step S2703, the password is confirmed. The password to be confirmed herein is a password set for individual distribution information. If the password is not correct (NO in step S2703), the user is requested to re-input the password. However, if an incorrect password is input a plurality of number of times, processing is ended. If the password is correct (YES in step S2703), the flow advances to step S2704.

In step S2704, (7) the P service server 200 acquires information corresponding to the received P-code. In step S2705, the P service server 200 transmits contents of the acquired information, including property data (information provider and subject), to the P service terminal 100. (8) The P service terminal 100 displays the received contents of information including the property data on the touch panel 104.

In step S2706, (9) it is determined whether printing of the displayed information is instructed. (10) If cancel of printing is instructed (NO in step S2706), the P service terminal 100 transmits a message representing that cancel is instructed to the P service server 200, and processing is ended. On the other hand, (10) when printing is instructed (YES in step S2706), the P service terminal 100 requests the P service server 200 to prepare print data of the information corresponding to the P-code, and the flow advances to step S2707.

In step S2707, it is determined whether the information to be printed is charged for. (11) If the information is free (NO in step S2707), the flow advances to the next processing. (12) If the information is charged for (YES in step S2707), the flow advances to step S2708 to receive the settlement method for settlement processing in printing from the user. (13) In accordance with the settlement method, the P service terminal 100 and P service server 200 exchange necessary data (FIG. 97). The P service terminal 100 receives the print data of the information to be printed from the P service server 200 and prints the data.

A processing flow for executing the personal information service will be described with reference to FIG. 101A.

Figure 101A:
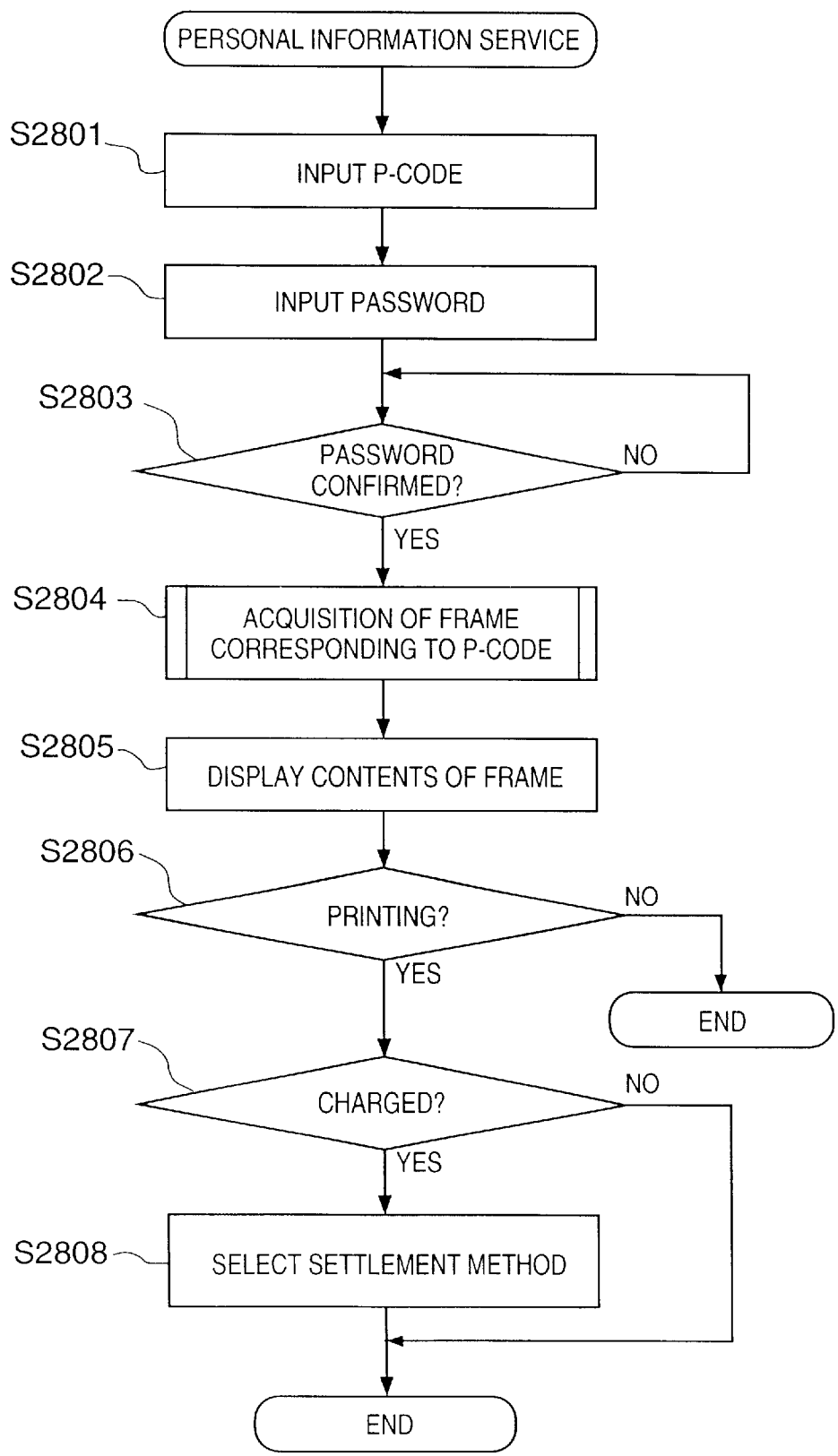
FIG. 101A is a flow chart showing a processing flow for executing the personal information service of this embodiment.
Figure 101B:
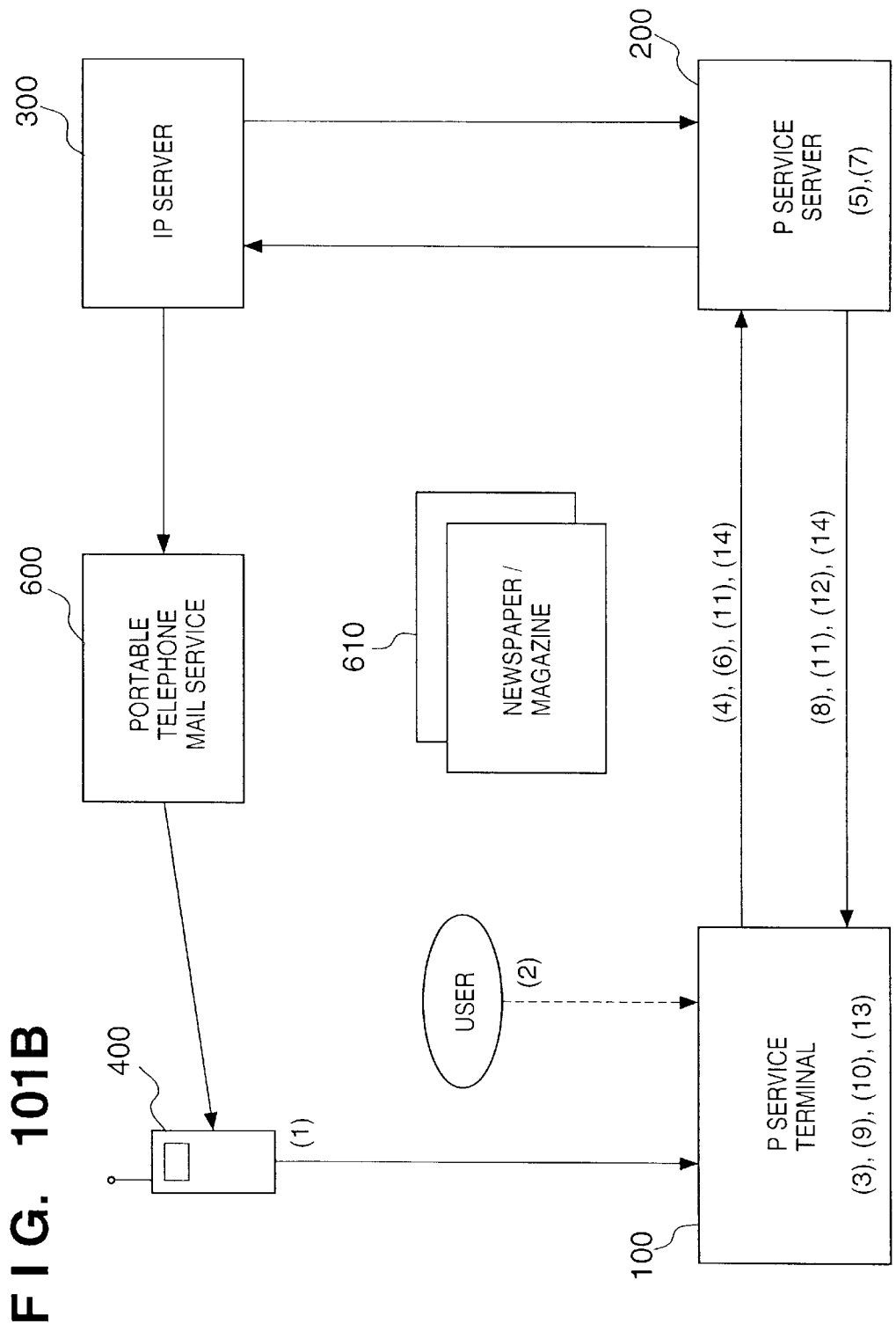
FIG. 101B is a view showing the processing sequence in the service system for executing the personal information service of this embodiment.

FIG. 101A is a flow chart showing a processing flow for executing the personal information service of this embodiment. FIG. 101B is a view showing the processing sequence in the service system for executing the personal information service of this embodiment.

In step S2801, (1) the user acquires a P-code by the portable terminal 400. (2) The user moves to the P service terminal 100 while keeping the P-code stored in the portable terminal 400. (3) The P-code is input to the P service terminal 100 (FIGS. 75 and 77 to 79). (4) The P service terminal 100 transmits the input P-code and the terminal properties (e.g., location of installation and printer performance) of the P service terminal 100 itself to the P service server 200.

In step S2802, (5) when the P service server 200 recognizes that the received P-code is a P-code for the personal information service, (6) the P service terminal 100 requests the user to input the password (FIG. 77). In step S2803, the password is confirmed. If the password is not correct (NO in step S2803), the user is requested to re-input the password. However, if an incorrect password is input a plurality of number of times, processing is ended. If the password is correct (YES in step S2803), the flow advances to step S2804.

In step S2804, (7) the P service server 200 acquires a frame corresponding to the received P-code. In step S2805, (8) the P service server 200 transmits contents of the acquired frame, including property data (information provider and subject), to the P service terminal 100, and (9) the P service terminal 100 displays the received contents of the frame including the property data on the touch panel 104 (FIG. 85). When registration of new information or a change in registered information is instructed, corresponding windows (FIGS. 86 to 88) are appropriately displayed to receive inputs from the user.

In step S2806, (10) it is determined whether printing of the displayed frame is instructed. (11) If cancel of printing is instructed (NO in step S2806), the P service terminal 100 transmits a message representing that cancel is instructed to the P service server 200, and processing is ended. On the other hand, (11) when printing is instructed (YES in step S2806), the P service terminal 100 requests the P service server 200 to prepare print data of the frame corresponding to the P-code, and the flow advances to step S2807. The print data of the frame is generated from the registered P-code list registered in the personal information service P-code table shown in FIG. 12. Each P-code registered in the registered P-code has been subjected to group setting in this embodiment. For each P-code subjected to group setting, P-code information having a maximum subcode of the attached section is acquired from the IP information table shown in FIG. 7. All the acquired P-code information have link information to another P-code. Hence, information to be printed can be acquired by searching for the P-code set as link information again. If the date of registration of the acquired information to be printed is before the final date of printing set in the personal information service P-code table shown in FIG. 12, it is regarded that this information has been printed in the past, and therefore the information is not printed. If all dates of registration of individual information acquired from the P-code list registered in the personal information service P-code table are before the final date of printing, a message (not shown) representing that no information to be printed is present is displayed, and processing is ended.

In step S2807, it is determined whether the frame to be printed is charged for. (12) If the frame is free (NO in step S2807), the flow advances to the next processing. (13) If the frame is charged for (YES in step S2807), the flow advances to step S2808 to receive the settlement method for settlement processing in printing from the user. (14) In accordance with the settlement method, the P service terminal 100 and P service server 200 exchange necessary data (FIG. 97). The P service terminal 100 receives the print data of the frame to be printed from the P service server 200 and prints the data.

A processing flow for executing the distribution service (registration of information) will be described next with reference to FIG. 102A.

Figure 102A:
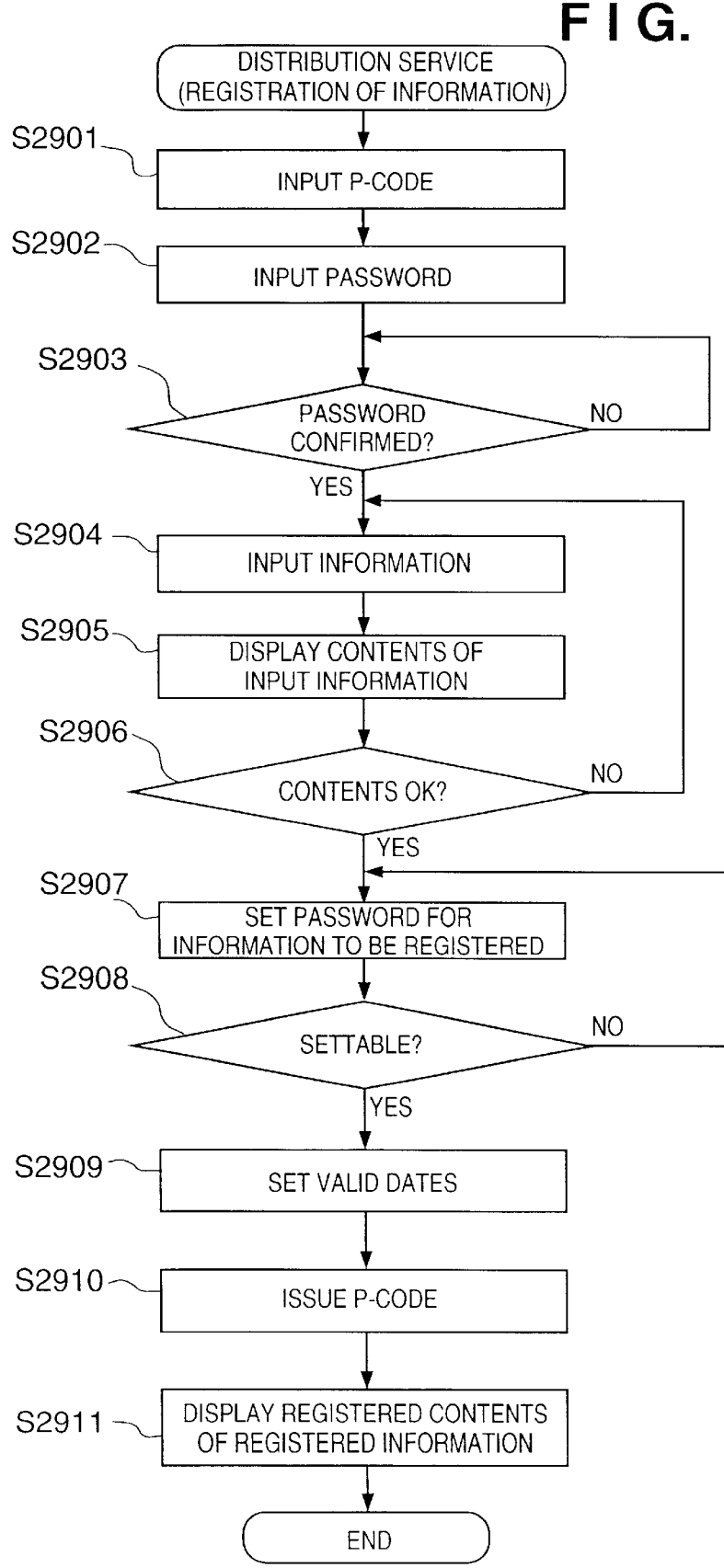
FIG. 102A is a flow chart showing a processing flow for executing the distribution service (registration of information) of this embodiment.
Figure 102B:
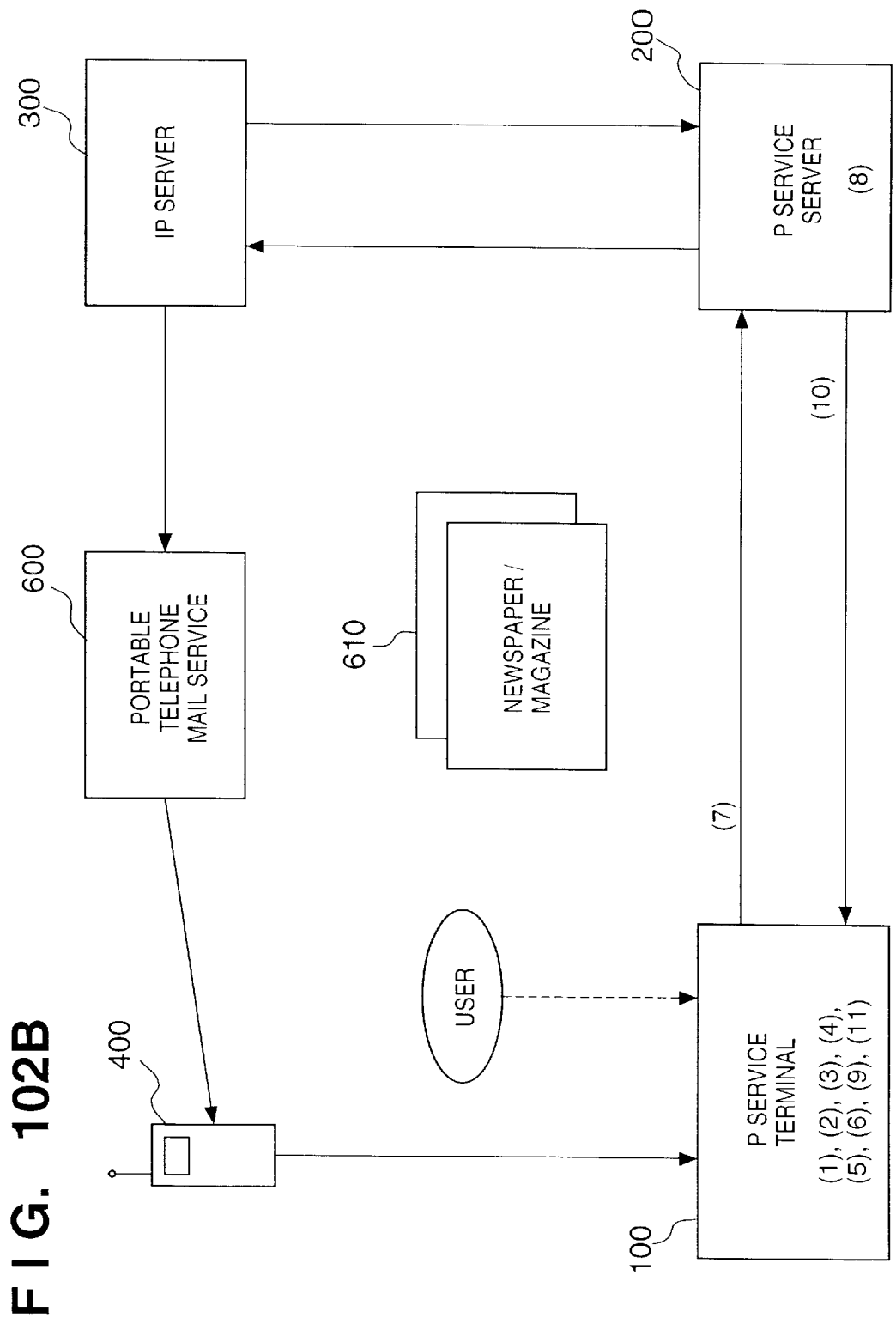
FIG. 102B is a view showing the processing sequence in the service system for executing the distribution service (registration of information) of this embodiment.

FIG. 102A is a flow chart showing a processing flow for executing the distribution service (registration of information) of this embodiment. FIG. 102B is a view showing the processing sequence in the service system for executing the distribution service (registration of information) of this embodiment.

In step S2901, (1) the user selects the distribution service (FIG. 75). (2) In accordance with the selection, a window for requesting the user to input a P-code is displayed (FIG. 89). The P-code is input to the P service terminal 100. The P service terminal 100 transmits the input P-code and the terminal properties (e.g., location of installation and printer performance) of the P service terminal 100 itself to the P service server 200.

In step S2902, (3) when the P service server 200 recognizes that the received P-code is a P-code for the distribution service (registration of information), the P service terminal 100 requests the user to input the password (FIG. 90). If the input P-code is unregistered, password input is not requested. In step S2903, the password is confirmed. If the password is not correct (NO instep S2903), the user is requested to re-input the password. However, if an incorrect password is input a plurality of number of times, processing is ended. If the password is correct (YES in step S2903), the flow advances to step S2904.

In step S2904, (4) the user inputs information to be registered (FIGS. 91 and 92). In step S2905, (5) the P service terminal 100 displays contents of the input information on the touch panel 104 (FIG. 93).

In step S2906, it is determined whether the displayed contents are acknowledged. If the contents are not acknowledged (NO in step S2906), the flow returns to step S2904 to request the user to re-input the information. If the contents are acknowledged (YES in step S2906), (7) the P service terminal 100 transmits the input information and the property data of the information, including the data type and the number of pages, to the P service server 200 and requests the P service server to issue a P-code. (8) In accordance with this request, the P service server 200 starts making a P-code correspond to the received information and the property data of the information, including the data type and the number of pages. The user is requested to input a password to be set for the input information (FIG. 94).

In step S2908, (9) it is determined whether the input password can be set. If the password cannot be set (NO in step S2908), the flow returns to step S2907 to request the user to re-input the password. If the password can be set (YES in step S2908), the flow advances to step S2909 to input the valid dates of the input information (FIG. 95). In step S2910, (10) the P service server registers the input information and the password and valid dates therefor and issues a P-code corresponding to the information. The P-code to be issued has a combination of a numerical value representing a "telephone number" and a numerical value representing an "attached number (subcode)" and also has a form of a number sequence, "telephone number-attached number", with a predetermined symbol ("-" in this case) inserted between the two numerical value sequences. The attached number is 1 when the number of distribution service information in the user information table shown in FIG. 9 is 0. When the number of distribution service information is not 0, pieces of registered distribution service information searched are searched from the P-code list, and the minimum attached number of a P-code that has expired is used as an attached number. If a registered distribution service information that has expired is not present, "the number of distribution service information+1" is used as an attached number. In step S2911, (11) the P service terminal 100 displays the registered contents (P-code, password, data amount, and valid dates) of the registered information on the touch panel 104 (FIG. 96).

Details of processing in step S2502 in FIG. 98A, step S2604 in FIG. 99A, step S2704 in FIG. 100A, and step S2804 in FIG. 101A will be described with reference to FIGS. 103A and 103B.

<Procedure of Acquiring Information>

Figure 103A:
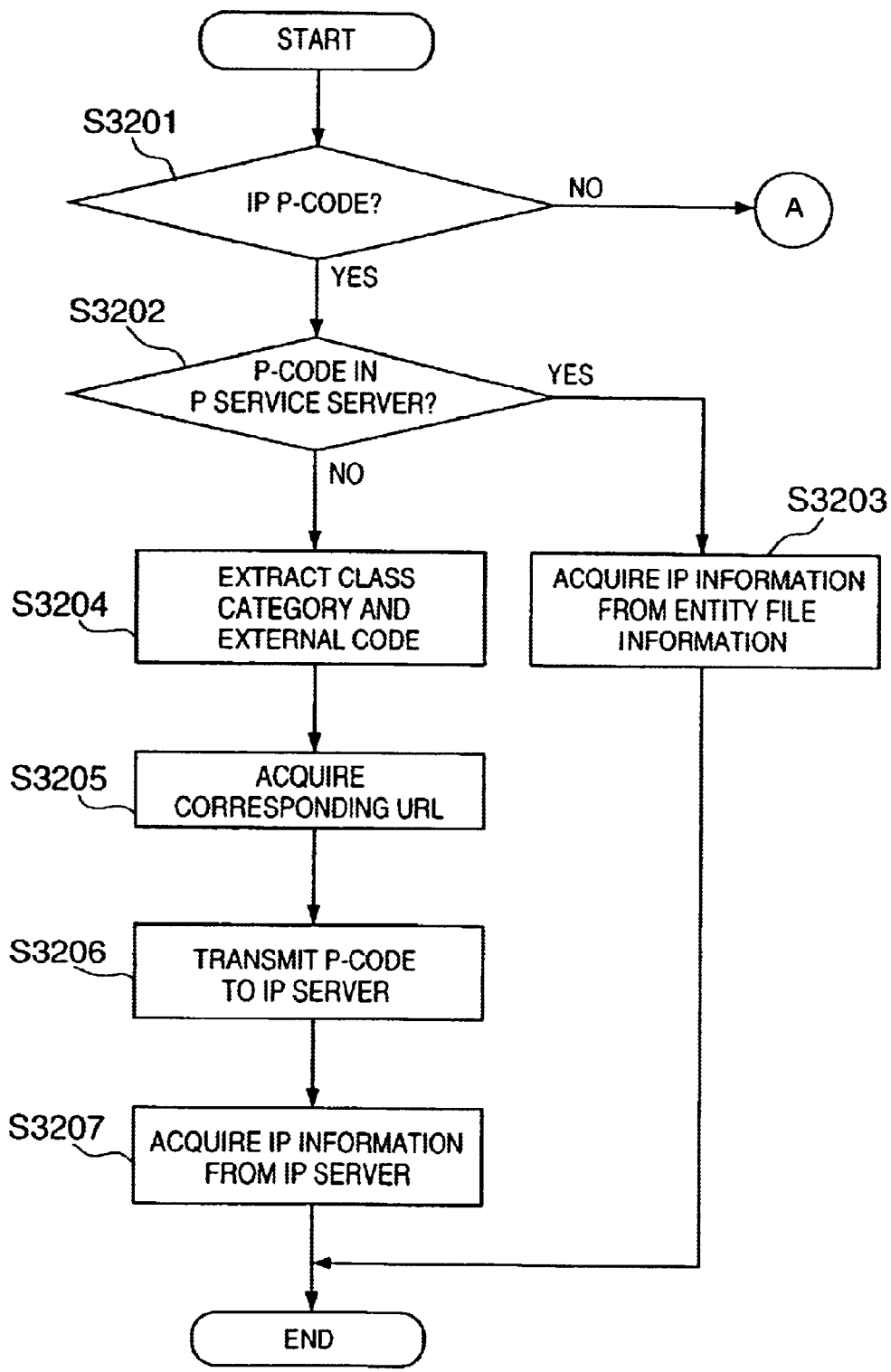
FIG. 103A is a flow chart for explaining another form of P-code transmission processing by the portable terminal of this embodiment.
Figure 103B:
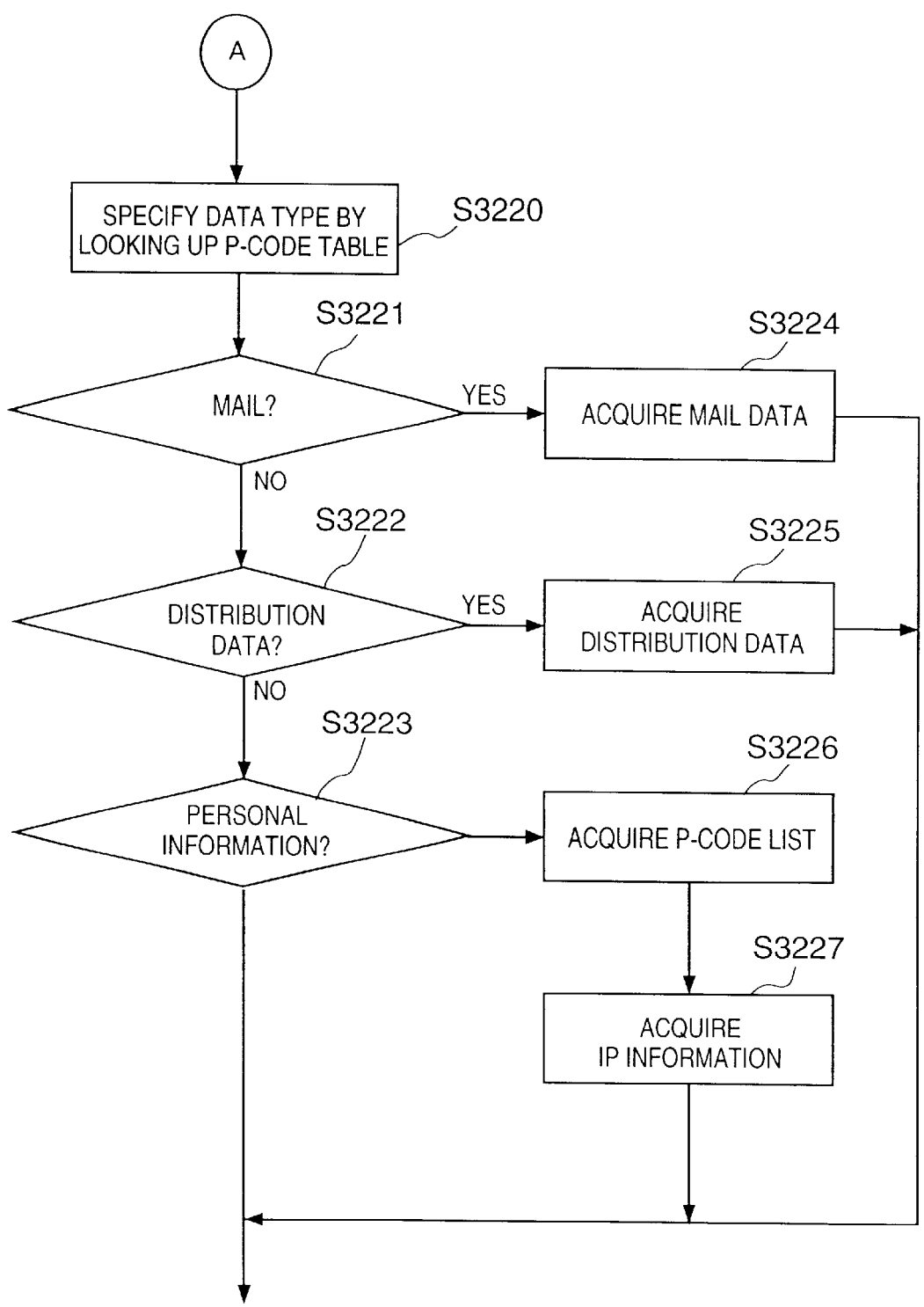
FIG. 103B is a flow chart for explaining a procedure of acquiring IP information, mail data, and distribution data in the P service server 200 of this embodiment.

FIGS. 103A and 103B are flow charts for explaining the procedure of acquiring IP information, mail data, and distribution data in the P service server 200 of this embodiment. First in step S3201, it is determined that the P-code input in the P service terminal 100 is an IP P-code. This can be determined on the basis of the state of the first bit of the P-code, as described above with reference to FIGS. 17 and 18. When the P-code is an IP P-code, the flow advances to step S3202 to determine whether contents corresponding to the P-code are present in the P service server 200. This determination can be done by checking the state of the 17th bit, as shown in FIG. 18.

When the P service server 200 has the contents of the IP information represented by the P-code, the flow advances from step S3202 to step S3203 to acquire the IP information and its properties in accordance with entity file information registered in the IP information registration table shown in FIG. 7.

If it is determined in step S3202 that the contents of the IP information are not present in the P service server 200 (i.e., the IP information has its contents on the IP server side), the flow advances to step S3204. In step S3204, the class category value and external code are extracted from the input P-code. In this processing, the values of the 18th to 20th bits are extracted to obtain a class category value, and the external code section is extracted on the basis of the class category value. For example, when the class category value is 3 (medium scale), the values of the 21st to 36th bits correspond to the external code, as shown in FIG. 18.

When the class category and external code are obtained in the above manner, a corresponding URL is acquired by looking up the P-code use table (to be described later) shown in FIG. 72 in step S3205. The URL acquired at this time is the address of the IP server having the contents of the P-code. Hence, in step S3206, the IP server is accessed according to the URL obtained in step S3205 to transmit the P-code. The IP server obtains contents and properties corresponding to the transmitted P-code by looking up the P-code registration table and transmits them to the P service server 200.

In step S3207, the contents and properties transmitted from the IP server in the above-described way are received, so the IP information is acquired.

When the input P-code is a personal P-code, the flow advances from step S3201 to step S3220. In step S3220, contents specified by the P-code are acquired by looking up the P-code table shown in FIGS. 10 to 12. If the attached section is "#Subcode", the flow advances from step S3221 to step S3224 to obtain corresponding mail data and its properties.

When the data attached section is "-Subcode", the flow advances from step S3222 to step S3225 to acquire distribution data upon authentication by a password.

When the attached section is "##Subcode", the flow advances from step S3223 to step S3226 to obtain a P-code list (frame) in the personal information service. In step S3227, acquisition of IP information (the above-described processing in steps S3202 to S3207) is executed using the P-code registered in the P-code list.

<Advertisement Search Processing>

In the P service system, when a user obtains a print output from the P service terminal 100, predetermined advertisement information is automatically attached to the print unless the user or information provider rejects it. Processing of searching for advertisement information to be attached will be described below.

FIG. 104 is a flow chart of advertisement search processing.

In step S3001, a keyword list of information of the information service or personal information service, mail of the mail service, or information of the distribution service is prepared for printing. This keyword list is prepared in the following way in accordance with the contents of each service.

For the information service or personal information service, keywords are extracted by looking up the properties of IP information, properties of user registration of the user, and properties of the P service terminal 100 for printing.

For the mail service, keywords are extracted by looking up the properties of user registration of the user and properties of the P service terminal 100 for printing.

For the distribution service, keywords are extracted by looking up the properties of the P service terminal 100 for printing, and also the properties of user registration of the user when the user has done user registration.

In any service, the keyword list can be prepared in units of information. For example, for the information service, the keyword list of the properties of IP information, the keyword list of the properties of user registration, and the keyword list of the properties of the P service terminal 100 can be individually prepared. This will be described below in more detail by exemplifying the information service.

FIGS. 105A to 105E are views showing examples of keyword lists for IP information.

For example, FIG. 105A shows a keyword list of IP information requested by the user in the information service. As a keyword, "marriage" is extracted. In FIG. 105B, keywords are extracted from the registered matters of user registration. In FIG. 105C, a keyword is extracted from the properties (e.g., location of installation) of the P service terminal.

Each keyword has a numerical value of "weight". This numerical value is given to each keyword in consideration of universally accepted idea on the basis of the contents and used to define priority of advertisement information in advertisement search processing. A numerical value with "+" means that IP information or the like including the keyword has positive contents when viewed from the universally accepted idea. A numerical value with "−" means that the information has negative contents. The magnitude of the numerical value can be proportional to the degree of importance.

In the P service system, in addition to these keyword lists, a highest priority keyword list and lowest priority keyword list set on the system side can be prepared.

The highest priority keyword list is a list of keywords corresponding to an advertisement that informs, e.g., a special campaign held on the P service system. An example of this keyword list is shown in FIG. 105D.

The lowest priority keyword list is a list of keywords with which at least one advertisement information can be searched for and is prepared to prevent advertisement search processing from searching no advertisement information. Hence, as a lowest priority keyword, a keyword having wide meaning is used.

In step S3002, using each keyword as a search key on the basis of the keyword lists prepared in step S3001, advertisement information having a keyword matching the search keyword is searched for. In step S3003, the search result list is prepared.

FIGS. 106A to 106E are examples of search result lists.

The search result lists are prepared in units of the above-described five keyword lists.

FIG. 106A shows a search result list corresponding to the keyword list of IP information (FIG. 105A), in which five pieces of advertisement information are searched for by the keyword "marriage". In this list, "weight" is a numerical value given to the keyword in each advertisement information and has the same meaning as the above-described "weight". The "degree of matching" is a numeral value obtained by multiplying the numerical value of "weight" of one keyword by that of the other keyword. More specifically, in the keyword list of IP information, since the weight of "marriage" is "+10", the columns of "degree of matching" in FIG. 106A are filled with results obtained by multiplying "+10" by each of weights "+10", "−5", "+3", "−4", and "+7"of the keywords of advertisement information.

In this advertisement search processing, an advertisement having a larger value of "degree of matching" has a higher priority of insertion. As the value becomes small, the priority becomes low.

As shown in FIGS. 106A and 106B, a single keyword has many weights. This is because advertisement information including the keyword "marriage" may be an advertisement of a wedding ceremony hall or an advertisement of divorce consultation. If they are regarded to be equivalent, inappropriate advertisement information maybe inserted into contents of information to be printed.

In processing of this embodiment, if negative advertisement information is searched for in correspondence with positive IP information, values with signs "+" and "−" are multiplied. The degree of matching has a negative value, and the priority can be made low. If negative advertisement information is searched for in correspondence with negative IP information (e.g., an advertisement of funeral and an advertisement of a hospital), values with signs "−" and "−" are multiplied. The degree of matching has a positive value, and the priority becomes high.

In step S3004, the pieces of advertisement information in the search result list are rearranged by looking up the properties of advertisement information.

In rearranging the pieces of information, on the basis of the properties of each advertisement information, a value is added to or subtracted from the degree of matching calculated in advance. For example, an advertisement whose term of insertion has expired or charge exceeds the maximum charge must not be inserted, and a predetermined numerical value can be subtracted from the calculated degree of matching. On the other hand, for an advertisement whose limitations on printing (designated in the dialog box shown in FIG. 65 or 66) are lenient, a predetermined numerical value can be added to the calculated degree of matching for evaluation. This is because such advertisement information can cope with an arbitrary layout and has a higher degree of freedom for printing.

To evenly give opportunities for insertion while giving priority to an advertisement with low insertion frequency, a numerical value corresponding to the insertion frequency may be added to the degree of matching.

In addition, a predetermined numerical value may be added to the degree of matching with priority given to an advertisement for which a large charge is paid from the advertisement provider to the operator of the P service. An advertisement provider who pays a large charge should be treated favorably. This also easily excuses the user compensation for the received service.

With priority given to an advertisement directly associated with information desired by the user, a predetermined numerical value may be added to the degree of matching for the purpose of increasing the business chance of the advertisement provider.

In this way, values are added to or subtracted from the degrees of matching to calculate final numerical values. FIGS. 107A to 107E show lists of advertisement information rearranged in descending order of the magnitudes of values. As is apparent from FIGS. 107A to 107E, the degree of matching is not always proportional to the numerical value of "weight".

In step S3005, a layout example of advertisement information is prepared. A plurality of layout examples are prepared by picking up pieces of advertisement information from the search result lists shown in FIGS. 107A to 107E in descending order of priority.

Priorities may be defined in units of search result lists shown in FIGS. 107A to 107E. For example, first advertisement information may be picked up from the search result list of the highest priority list (FIG. 107D), and then pieces of advertisement information may be sequentially picked up from the search result list of IP information (FIG. 107A), the search result list of user registration (FIG. 107B), the search result list of the P service terminal (FIG. 107C), and the search result list of the lowest priority list (FIG. 107E).

In step S3006, one layout example that is supposed to be most appropriate is selected from the layout examples of advertisement information in consideration of the user's desire, print size, and total charge. The P-code and layout conditions of the advertisement information are specified and temporarily stored, and advertisement search processing is ended.

<Operation of Portable Terminal>

The P-code extraction function and P-code transmission function of the portable terminal 400 according to this embodiment will be described next.

FIG. 108 is a flow chart for explaining P-code extraction processing of the portable terminal of this embodiment. This processing is executed when the contents of mail received are being displayed on the portable terminal 400.

In steps S3101 to S3103, it is determined whether the cursor keys 401 and 402 of the portable terminal 400 are operated, the block designation key 404 is operated, and the P-code key 403 is operated.

When the cursor key is operated in the mail displayed state, the flow advances from step S3101 to step S3105 to determine whether block designation is progressing. The block designation mode is set in step S3109 (to be described later) by operating the block designation key. If the block designation mode is not set, the flow advances to step S3106 to move the cursor in units of characters in the display of mail contents. If the block designation mode is set, a region where the cursor has moved is set as a selected region, and display of that portion is inverted. The flow advances to step S3104. If mail display continues, the flow returns to step S3101. If mail display is ended, this processing is ended.

When the block designation key 404 is operated, the flow advances from step S3102 to step S3108 to determine whether the block designation mode has already been set. If NO in step S3108, the flow advances to step S3109 to switch the operation mode to the block designation mode. If YES in step S3108, the flow advances to step S3110 to cancel the block designation mode. That is, the block designation key functions as an ON/OFF switch for the block designation mode. After that, the flow advances to step S3104. If mail display continues, the flow returns to step S3101. If mail display is ended, this processing is ended.

When the P-code key 403 is operated, the flow advances from step S3101 to step S3111 to determine whether a selected region in inverted display is present in the currently displayed character string. If YES in step S3111, the flow advances to step S3112 to store the selected region in the P-code storage area 422c. If NO in step S3111, the flow advances to step S3113 to automatically select a P-code. After that, the flow advances to step S3104. If mail display continues, the flow returns to step S3101. If mail display is ended, this processing is ended.

Figure 109:
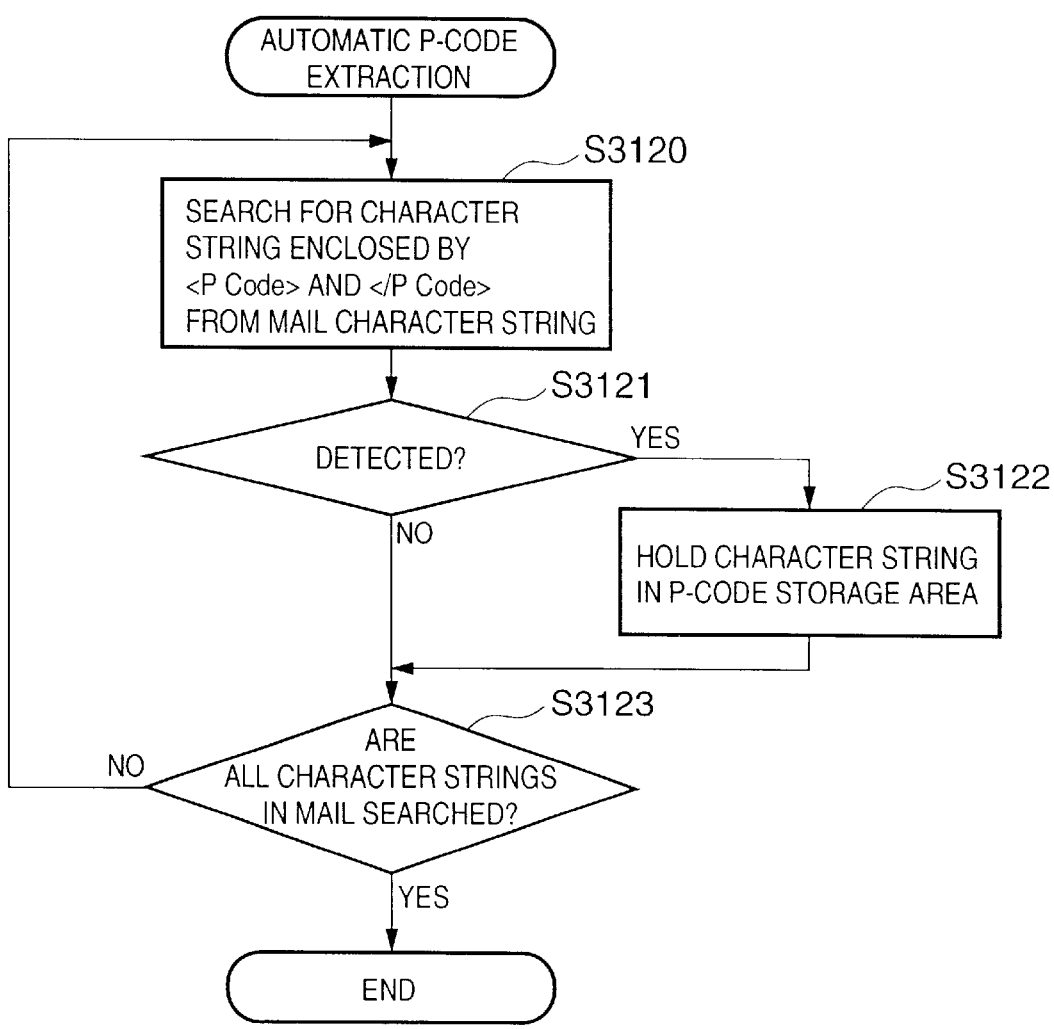

Automatic P-code extraction in step S3113 will be described. FIG. 109 is a flow chart for explaining automatic P-code extraction processing in step S3113.

In step S3120, a character string enclosed by two tags <Pcode> and </Pcode> is searched for. When a character string enclosed by the two tags <Pcode> and </Pcode> is searched for, the flow advances from step S3121 to step S3122 to store the detected character string in the P-code storage area 422c. This processing is executed for the entire mail that is being displayed currently (step S3123).

An operation mode for executing the above processing for all mail data held in the memory of the portable terminal 400 at once may be provided.

In the above way, the portable terminal 400 of this embodiment can store a P-code sent as mail in the P-code storage area 422c. Even when the user is notified of a P-code not by electronic data such as mail but by a magazine or newspaper, the P-code may be input using the P-code key and dial keys and held in the P-code storage area 422c. According to the portable terminal 400 of this embodiment, the P-code stored in the P-code storage area 422c can be input to the P service terminal 100 by communication with the P service terminal 100.

Figure 110:
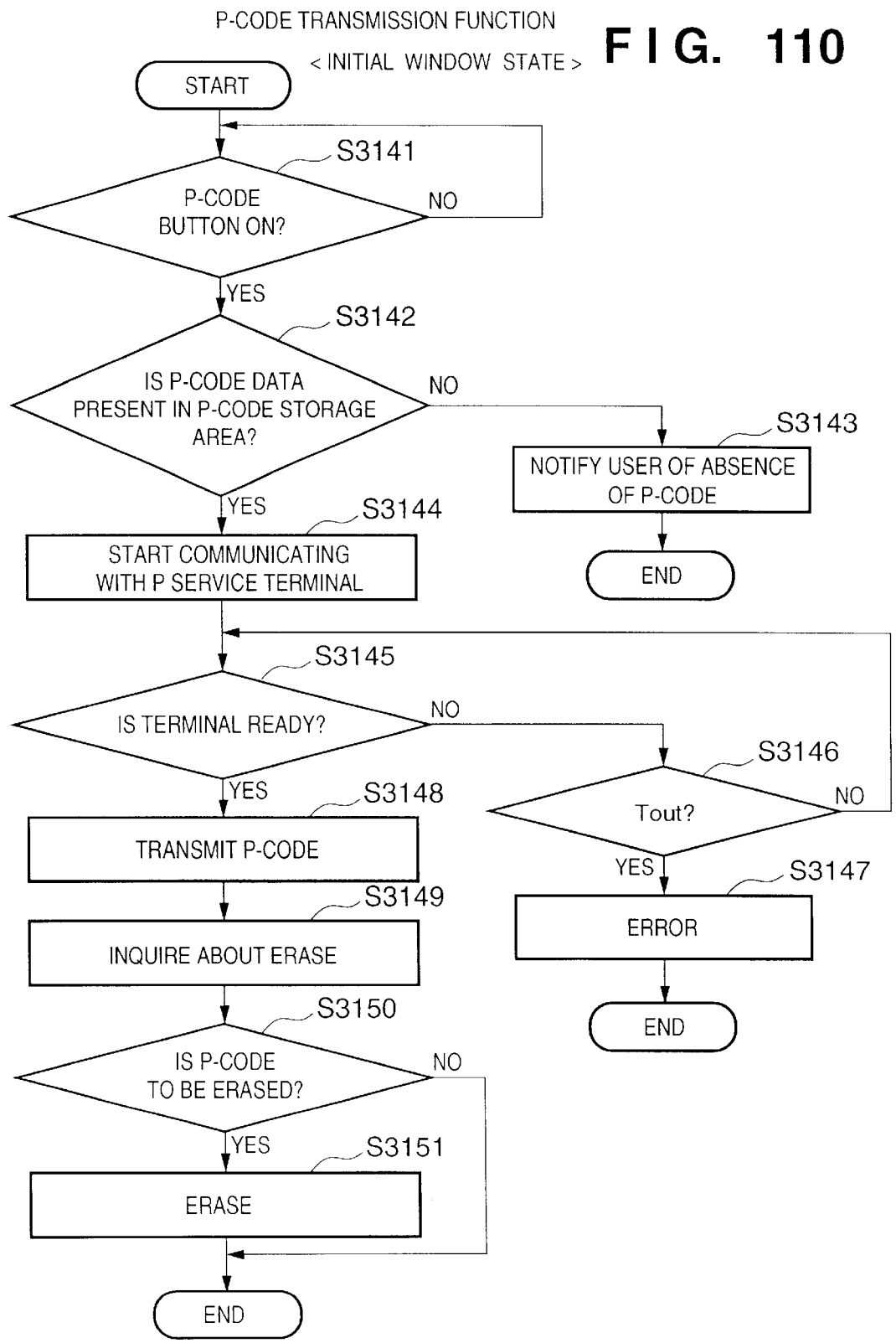

FIG. 110 is a flow chart for explaining P-code transmission processing by the portable terminal of this embodiment. This processing is executed when the displayed contents of the portable terminal 400 are in the initial state.

In step S3141, when operation of the P-code key 403 is detected, the flow advances to step S3142 to determine whether a P-code is stored in the P-code storage area 422c. If no P-code is stored in the P-code storage area 422c, the flow advances to step S3143 to display a message representing that no P-code is present on the display 410, and this processing is ended.

If YES in step S3142, the flow advances to step S3144 to start communication processing with the P service terminal 100 using the infrared communication section 405. It is determined in step S3145 whether the P service terminal 100 is ready, and processing waits until the P service terminal 100 is ready. If the wait time exceeds a predetermined time, it is determined that time is out. The flow advances from step S3146 to step S3147 to display a message representing a communication error on the display 410, and processing is ended.

When it is confirmed that the P service terminal 100 is ready, the P-code stored in the P-code storage area 422c is transmitted to the P service terminal 100 in step S3148.

When transmission is ended, it is inquired on the display 410 whether the P-code currently stored in the P-code storage area 422c is to be erased. If the user instructs to erase the P-code, the P-code is erased in step S3151.

The above processing can also be applied to a case wherein the portable terminal 400 is connected to the portable terminal connector 106 of the P service terminal 100.

Figure 111:
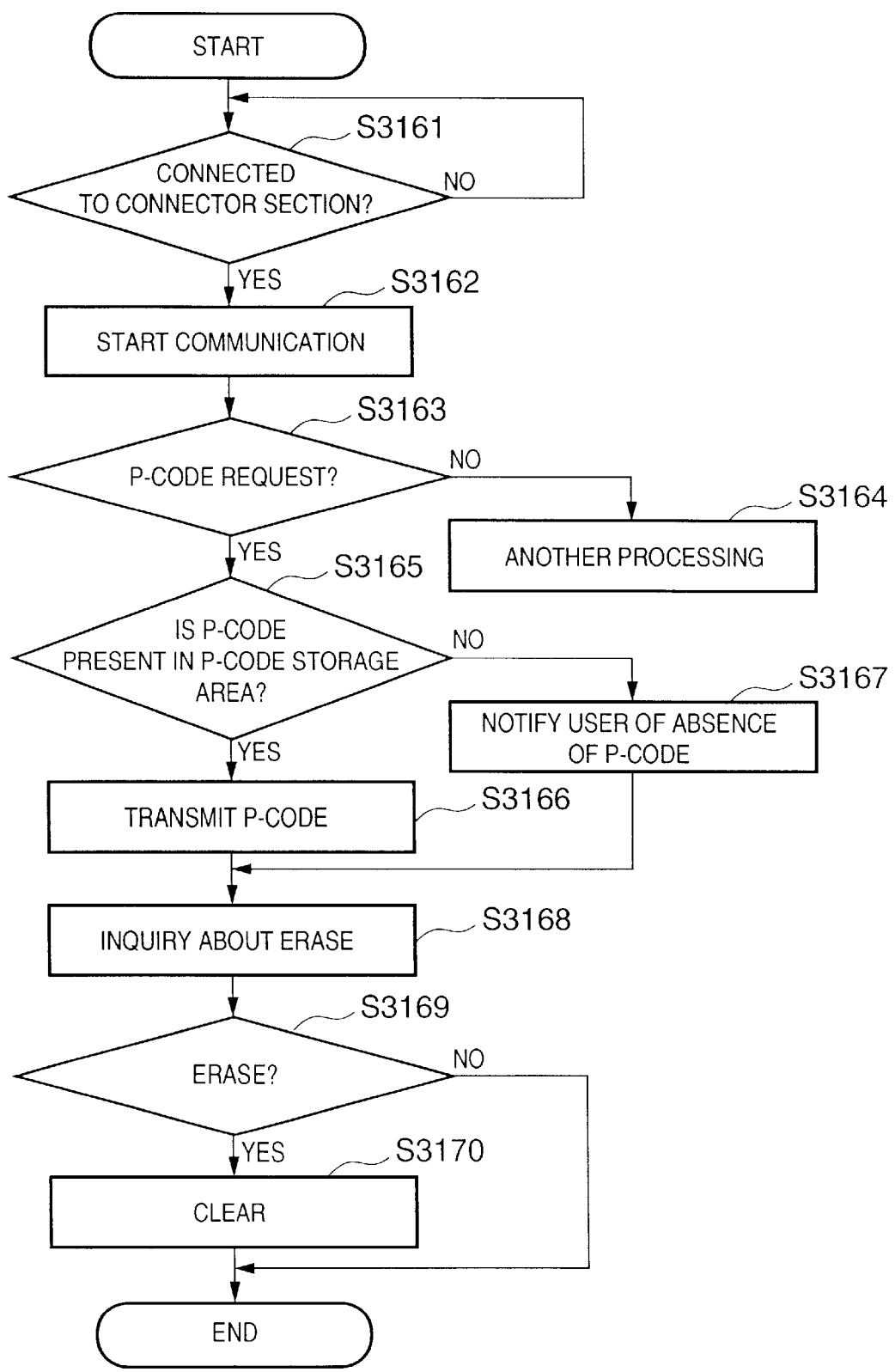

In the above processing, transmission is started by the key operation of the portable terminal 400. Instead, a P-code may be automatically input to the P service terminal 100 under the control of the P service terminal 100 without operating any keys on the portable terminal side. FIG. 111 is a flow chart for explaining another form of P-code transmission processing by the portable terminal of this embodiment.

In step S3161, when it is detected that the portable terminal is connected to the portable terminal connector 106 (or when a predetermined signal is sent to the P service terminal through the infrared communication section by operating the P-code key), communication between the P service terminal and the portable terminal starts in step S3162.

When a P-code request is input from the P service terminal 100 by communication, the flow advances from step S3163 to step S3165 to determine whether a P-code is stored in the P-code storage area 422c. If no P-code is stored, the flow advances to step S3167 to notify the P service terminal 100 that no P-code is present. If a P-code is present in the P-code storage area 422c, the flow advances to step S3166 to transmit the stored P-code to the P service terminal 100.

The subsequent processing in steps S3168 to S3170 is the same as the above-described processing in steps S3149 to S3151.

As described above, according to the portable terminal of this embodiment, a P-code can be extracted from mail, held in the memory, and transmitted to the P service terminal. Hence, any input error in operation of the P service terminal 100 can be prevented, and the operability is largely improved.

<Other Embodiment>

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiment to a system or apparatus, and causing the computer (or a CPU or an MPU) of the system or apparatus to read out and execute the program codes stored in the storage medium.

In this case, the program codes read out from the storage medium realize the functions of the above-described embodiment by themselves, and the storage medium storing the program codes constitutes the present invention.

As a storage medium for supplying the program codes, a floppy disk, a hard disk, an optical disk, a magneto optical disk, a CD-ROM, a CD-R, a magnetic tape, a nonvolatile memory card, a ROM, or the like can be used.

The functions of the above-described embodiment are realized not only when the readout program codes are executed by the computer but also when the OS (Operating System) running on the computer performs part or all of the actual processing on the basis of the instructions of the program codes.

The functions of the above-described embodiment are also realized when the program codes readout from the storage medium are written in the memory of a function expansion board inserted into the computer or a function expansion unit connected to the computer, and the CPU of the function expansion board or function expansion unit performs part or all of the actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A code processing method of processing a code for identifying information, said method comprising the steps of:
    determining, when a predetermined first code portion of the code for identifying information has been input through a predetermined input unit, a type of inputted first code portion based on a predetermined identifier included in the inputted first code portion;
    attaching a predetermined second code portion including a code indicating the type of the first code portion to the first code portion so as to generate an integrated code; and
    externally outputting the integrated code for acquiring information corresponding to the integrated code.

2. The method according to claim 1, further comprising the steps of:
    acquiring information corresponding to the integrated code; and
    printing the acquired information.

3. The method according to claim 1, wherein the integrated code is externally output through a network.

4. The method according to claim 1, wherein the type of the first code portion is a personal user code or an information provider code.

5. The method according to claim 4, wherein the personal user code includes a subscriber telephone number of the user.

6. The method according to claim 1, wherein the first code portion comprises a number section and an attached section.

7. The method according to claim 6, wherein the attached section includes a predetermined symbol representing a type of a service.

8. The method according to claim 7, wherein the predetermined symbol representing the type of service is a symbol representing mail service.

9. The method according to claim 7, wherein the predetermined symbol representing the type of service is a symbol representing data input/output service for the user.

10. The method according to claim 7, wherein the predetermined symbol representing the type of service is a symbol representing a service using a frame; and
    in the service using a frame, one or a plurality of other codes selected by the user is registered in a frame and when a code corresponding to the frame has been input, a service corresponding to the one or the plurality of other codes registered in the frame is executed.

11. The method according to claim 10, wherein, in the service using a frame, the user can register, change, and delete one or a plurality of codes in the frame.

12. The method according to claim 1, wherein, when the outputted code is linked from another code, information corresponding to the other code is acquired from an external apparatus receiving the outputted code.

13. The method according to claim 1, wherein the second code portion includes at least one of either version information or country identification information.

14. A terminal apparatus for processing a code for identifying information, said apparatus comprising:
    an input unit for inputting a predetermined first code portion of the code for identification information;
    a determination unit for determining a type of the inputted first code portion based on a predetermined identifier included in the inputted first code portion;
    a generation unit for attaching a predetermined second code portion including a code indicating the determined type of the first code portion to the first code portion and generating an integrated code; and
    an output unit for externally outputting the integrated code for acquiring information corresponding to the integrated code.

15. An issuing apparatus for issuing a code for identifying information, said apparatus comprising:
    an assignment unit for assigning a main code portion for identifying a user associated with information to be registered; and
    an issuing unit for attaching a subcode portion associated with the information to be registered to the main code portion and issuing a code that includes the main code portion and the subcode portion and that identifies the information.

16. The apparatus according to claim 15, further comprising:
    an input unit for inputting the information to be registered; and
    a registration unit for registering the information together with a code that includes the main code portion and the subcode portion, which are integrated.

17. The apparatus according to claim 15, wherein the information to be registered is advertisement information.

18. The apparatus according to claim 15, wherein the information to be registered is non-advertisement information.

19. The apparatus according to claim 15, wherein the information to be registered is information sent from the user.

20. The apparatus according to claim 15, wherein the information to be registered is mail addressed to the user.

21. The apparatus according to claim 15, wherein the information to be registered is frame information.

22. The apparatus according to claim 21, wherein
the frame information can be used to register one or a plurality of other codes, the frame information corresponding to a frame, and when printing of the frame is designated, information corresponding to the one or the plurality of other information can be printed.

23. The apparatus according to claim 15, further comprising a designation unit for designating the code for identifying the information.

24. The apparatus according to claim 23, wherein, when a main code portion of a code to be linked is designated by said designation unit, said issue unit attaches a subcode portion, which is unused in a subcode portion corresponding to the main code portion, to the main code portion and issues the code for identifying the information.

25. The apparatus according to claim 23, wherein
said issue unit, when the user corresponding to an assigned main code portion can designate a subcode portion corresponding to the main code portion, issues the code that includes the main code portion for identifying the user and the designated subcode portion and that identifies the information.

26. The apparatus according to claim 23, further comprising a deletion control unit for instructing to delete the code, wherein a code whose deletion is instructed by said deletion control unit is deleted together with information corresponding to the code to be deleted.

27. The apparatus according to claim 15, wherein the main code portion includes an identification code representing a registration designation.

28. The apparatus according to claim 15, wherein the main code portion includes a user identification code.

29. An issuing method of issuing a code for identifying information, said method comprising:

an assignment step of assigning a main code portion for identifying a user associated with information to be registered; and an issuing step of attaching a subcode portion associated with the information to be registered to the main code portion and issuing a code that includes the main code portion and the subcode portion and that identifies the information.

30. A computer-readable storage medium storing a program for implementing a code processing method of processing a code for identifying information, the program comprising:

program code for a determination step of determining, when a predetermined first code portion of the code for identifying information has been input through a predetermined input unit, a type of inputted first code portion based on a predetermined identifier included in the inputted first code portion;

program code for an attachment step of attaching a predetermined second code portion including a code indicating the determined type of the first code portion to the first code portion to generate an integrated code; and program code for an output step of externally outputting the integrated code for acquiring information corresponding to the integrated code.

31. A computer-readable storage medium storing a program for implementing an issuing method of issuing a code for identifying information, the program comprising:

program code for an assignment step of assigning a main code portion for identifying a user associated with information to be registered; and program code for an issuing step of attaching a subcode portion associated with the information to be registered to the main code portion and issuing a code that includes the main code portion and the subcode portion and that identifies the information.

32. The method according to claim 6, further comprising the steps of:

displaying, when only the number section has been input, a selection list of content corresponding to the inputted number section; and outputting a code, corresponding to the content selected by the user from the selection list, to acquire the information.

* * * * *

UNITED STATES PATENT AND TRADEMARK OFFICE
CERTIFICATE OF CORRECTION

PATENT NO. : 6,747,755 B1
APPLICATION NO. : 09/547399
DATED : June 8, 2004
INVENTOR(S) : Hiroshi Satomi et al.

It is certified that error appears in the above-identified patent and that said Letters Patent is hereby corrected as shown below:

ON THE TITLE PAGE [30]:

Foreign Application Priority Data, "Apr. 10, 1999 (JP) . . . . 11-283461" should read --Oct. 4, 1999 (JP) . . . . 11-283461--.

[56] REFERENCES CITED

U.S. Patent Documents
Insert: --5,588,009    12/1996   Will ............ 371/33--.
Insert: --6,604,085 B1   08/2003   Kolls ...... 705/14--.
Insert: --5,838,458    11/1998   Tsai ........... 358/402--.
Insert: --6,427,140 B1   07/2002   Ginter et al. ..... 705/80--.
Insert: --5,579,087    11/1996   Salgado ........ 355/202--.
Insert: --5,781,901    07/1998   Kuzma ......... 707/10--.
Insert: --5,855,007    12/1998  Jovicic et al. ........ 705/14--.
Insert: --5,911,146    06/1999  Johari et al. .......... 707/525--.
Insert: --5,761,496    06/1998  Hattori ................. 395/605--.
Insert: --6,088,710    07/2000  Dreyer et al. .......... 707/517--.
Insert: --6,014,672    01/2000  Satoh et al. .............. 707/102--.
Insert: --5,020,019    05/1991  Ogawa ..................... 364/900--.
Insert: --6,085,201    07/2000  Tso ................ 707/505--.
Insert: --6,602,300 B2   08/2003   Ushioda et al. ....... 715/536--.
Insert: --6,212,517 B1   04/2001   Sato et al. ....... 707/5--.
Insert: --5,247,575 09/1993   Sprague et al. ......... 380/9--.
Insert: --5,646,992 07/1997   Subler et al. ....... 380/4--.
Insert: --5,708,960 01/1998  Kamisaka et al. ........ 455/3.2--.
Insert: --5,717,923 02/1998   Dedrick ................. 395/613--.
Insert: --5,819,032 10/1998   de Vries et al. ........ 395/200.8--.
Insert: --5,845,302 12/1998   Cyman, Jr. et al. ... 707/517--.
Insert: --5,850,520 12/1998   Griebenow et al. ..... 395/200.36--.
Insert: --5,870,605 02/1999   Bracho et al. ............ 395/682--.
Insert: --5,970,231 10/1999  Crandall ................. 395/200.68--.
Insert: --6,460,036 B1 10/2002   Herz ................ 707/10--.
Insert: --6,557,756 B1   05/2003   Smith ............... 235/379--.

UNITED STATES PATENT AND TRADEMARK OFFICE
CERTIFICATE OF CORRECTION

PATENT NO. : 6,747,755 B1
APPLICATION NO. : 09/547399
DATED : June 8, 2004
INVENTOR(S) : Hiroshi Satomi et al.

It is certified that error appears in the above-identified patent and that said Letters Patent is hereby corrected as shown below:

TITLE PAGE ITEM [56]

Foreign Patent Documents
    Insert: --EPO   0 822 535 A2   02/1998--.
    Insert: --EOP 0 778 534 A1    06/1997--.
    Insert: --GB 2 246 102 A 01/1992--.
    Insert: --WO 01/67361 A1 09/2001--.

TITLE PAGE ITEM [56]

Other Publications
    Insert:   --Samar, V., "Single Sign-On Using Cookies For Web Applications", Enabling Technologies: Infrastructure For Collaborative Enterprises, 1999, Proceedings IEEE 8th International Workshop On *, Stanford, CA, USA, June 16-18, 1999, Los Alamitos, CA, USA, IEEE Comput. Soc., pp. 158-163--.
    Insert:   --Gray, T., "Comparing Two Approaches to Remote Mailbox Access: IMAP vs. POP", The IMAP Connection, November 5, 1993, retrieved from <URL:http://www.imap.org/imap.vs.pop.brief.htm>--.
    Insert:   --K. Maddox et al., "Making Money on the Web," Information Week, no. 543, p. 30+, September 4, 1995.--.
    Insert:   --J.G. Kimball, "Mad Dash to Online: Publishers Taking Stabs in Dark at New Media," Business Marketing, p. 11, March 1994.--.
    Insert:   --"The Changing Face of Publishing In the Era of the World Wide Web," Chemical Marketing Reporter, v. 251, no. 21, p. 18, May 26, 1997.--.
    Insert:   --R. Karpinski, "The Web Delivers All the News That's Fit - and Then Some," InternetWeek, p. 31, October 6, 1997.--.

UNITED STATES PATENT AND TRADEMARK OFFICE
CERTIFICATE OF CORRECTION

PATENT NO.         : 6,747,755 B1
APPLICATION NO. : 09/547399
DATED                : June 8, 2004
INVENTOR(S)       : Hiroshi Satomi et al.

It is certified that error appears in the above-identified patent and that said Letters Patent is hereby corrected as shown below:

<u>COLUMN 10</u>:

Line 4, "processing" should read --the process--.

<u>COLUMN 31</u>:

Line 63, "(##m)" should read --(##m).--;
Line 64, "(##m)" should read --(##m).--; and
Line 65, "(##m)" should read --(##m).--.

Signed and Sealed this

Twenty-fifth Day of November, 2008

JON W. DUDAS
*Director of the United States Patent and Trademark Office*